Dec. 12, 1967 B. L. CREW ETAL 3,358,270

INFORMATION STORAGE AND RETRIEVAL SYSTEM

Filed Nov. 5, 1962 32 Sheets-Sheet 1

INVENTORS:
BEVERLY L. CREW,
MORRIS N. GUNZBURG,

BY Allen E. Angotti
THEIR ATTORNEY.

Dec. 12, 1967 B. L. CREW ETAL 3,358,270

INFORMATION STORAGE AND RETRIEVAL SYSTEM

Filed Nov. 5, 1962 33 Sheets-Sheet 2

INVENTORS:
BEVERLY L. CREW,
MORRIS N. GUNZBURG,

BY [signature]
THEIR ATTORNEY.

INVENTORS:
BEVERLY L. CREW,
MORRIS L. GUNZBURG,

BY [signature]
THEIR ATTORNEY.

INFORMATION STORAGE AND RETRIEVAL SYSTEM

Filed Nov. 5, 1962

32 Sheets-Sheet 4

INVENTORS:
BEVERLY L. CREW,
MORRIS N. GUNZBURG,

BY Alan E. Angstadt
THEIR ATTORNEY.

Dec. 12, 1967 B. L. CREW ETAL 3,358,270

INFORMATION STORAGE AND RETRIEVAL SYSTEM

Filed Nov. 5, 1962

32 Sheets-Sheet 5

INVENTORS:
BEVERLY L. CREW,
MORRIS N. GUNZBURG,

BY [signature]
THEIR ATTORNEY.

INFORMATION STORAGE AND RETRIEVAL SYSTEM

Filed Nov. 5, 1962

INVENTORS:
BEVERLY L. CREW,
MORRIS N. GUNZBURG,

BY [signature]

THEIR ATTORNEY.

CARD READER AND LOGIC MATRIX
COLUMN I

INVENTORS:
BEVERLY L. CREW,
MORRIS N. GUNZBURG,

BY [signature]
THEIR ATTORNEY.

INFORMATION STORAGE AND RETRIEVAL SYSTEM

Filed Nov. 5, 1962 32 Sheets-Sheet 8

INVENTORS:
BEVERLY L. CREW,
MORRIS N. GUNZBURG,

BY [signature]
THEIR ATTORNEY.

INVENTORS:
BEVERLY L. CREW,
MORRIS N. GUNZBURG,

BY [signature]
THEIR ATTORNEY.

INFORMATION STORAGE AND RETRIEVAL SYSTEM

Filed Nov. 5, 1962 32 Sheets-Sheet 10

INVENTORS:
BEVERLY L. CREW,
MORRIS N. GUNZBURG,

BY Alan E. [signature]
THEIR ATTORNEY.

INVENTORS:
BEVERLY L. CREW,
MORRIS N. GUNZBURG,
BY [signature]
THEIR ATTORNEY.

INFORMATION STORAGE AND RETRIEVAL SYSTEM

Filed Nov. 5, 1962 32 Sheets-Sheet 12

INVENTORS:
BEVERLY L. CREW,
MORRIS N. GUNZBURG,
BY Allen E. Amgott
THEIR ATTORNEY.

INVENTORS:
BEVERLY L. CREW,
MORRIS N. GUNZBURG,

BY *[signature]*

THEIR ATTORNEY.

INVENTORS:
BEVERLY L. CREW,
MORRIS N. GUNZBURG,
BY [signature]
THEIR ATTORNEY

INFORMATION STORAGE AND RETRIEVAL SYSTEM

Filed Nov. 5, 1962 32 Sheets-Sheet 15

INVENTORS:
BEVERLY L. CREW,
MORRIS N. GUNZBURG,
BY [signature]
THEIR ATTORNEY.

INFORMATION STORAGE AND RETRIEVAL SYSTEM

Filed Nov. 5, 1962 52 Sheets-Sheet 16

INVENTORS:
BEVERLY L. CREW,
MORRIS N. GUNZBURG,
BY Allen E. Amgott
THEIR ATTORNEY.

INVENTORS:
BEVERLY L. CREW,
MORRIS N. GUNZBURG,
BY
THEIR ATTORNEY.

INVENTORS:
BEVERLY L. CREW,
MORRIS N. GUNZBURG,

BY [signature]
THEIR ATTORNEY.

INFORMATION STORAGE AND RETRIEVAL SYSTEM

Filed Nov. 8, 1962 32 Sheets-Sheet 19

INVENTORS:
BEVERLY L. CREW,
MORRIS N. GUNZBURG,
BY Allen E. Angotti
THEIR ATTORNEY.

INVENTORS:
BEVERLY L. CREW,
MORRIS N. GUNZBURG,
BY Allen E. Amgott
THEIR ATTORNEY.

INVENTORS:
BEVERLY L. CREW,
MORRIS N. GUNZBURG,
BY
Allen E. Amgott
THEIR ATTORNEY.

INVENTORS:
BEVERLY L. CREW,
MORRIS N. GUNZBURG,
BY [signature]
THEIR ATTORNEY.

INVENTORS:
BEVERLY L. CREW,
MORRIS N. GUNZBURG,

BY Allen E. Angstadt
THEIR ATTORNEY.

INVENTORS:
BEVERLY L. CREW,
MORRIS N. GUNZBURG,
BY [signature]
THEIR ATTORNEY.

INFORMATION STORAGE AND RETRIEVAL SYSTEM

Filed Nov. 8, 1962 32 Sheets-Sheet 25

INVENTORS:
BEVERLY L. CREW,
MORRIS N. GUNZBURG,
BY
[signature]
THEIR ATTORNEY.

INVENTORS:
BEVERLY L. CREW,
MORRIS N. GUNZBURG,
BY [signature]
THEIR ATTORNEY.

INVENTORS:
BEVERLY L. CREW,
MORRIS N. GUNZBURG,
BY [signature]
THEIR ATTORNEY.

INVENTORS:
BEVERLY L. CREW,
MORRIS N. GUNZBURG,

BY [signature]
THEIR ATTORNEY.

INVENTORS:
BEVERLY L. CREW,
MORRIS N. GUNZBURG,

BY [signature]
THEIR ATTORNEY.

INFORMATION STORAGE AND RETRIEVAL SYSTEM

Filed Nov. 3, 1962 32 Sheets-Sheet 30

INVENTORS:
BEVERLY L. CREW,
MORRIS N. GUNZBURG,

BY [signature]

THEIR ATTORNEY.

INVENTORS:
BEVERLY L. CREW,
MORRIS N. GUNZBURG,
BY Allen E. Weingatt
THEIR ATTORNEY.

INVENTORS:
BEVERLY L. CREW,
MORRIS N. GUNZBURG,

BY Allen E. Angott
THEIR ATTORNEY.

United States Patent Office 3,358,270
Patented Dec. 12, 1967

3,358,270

INFORMATION STORAGE AND RETRIEVAL SYSTEM

Beverly L. Crew, Rockville, Md., and Morris N. Gunzburg, Washington, D.C., assignors to General Electric Company, a corporation of New York Filed Nov. 5, 1962, Ser. No. 235,303
6 Claims. (Cl. 340—172.5)

This invention relates to data handling systems, and more particularly, to an information storage and retrieval system adapted to the location and retrieval of identification characters which correspond to information stored in an information file unit record.

The need for specialized storage and retrieval systems to handle information conventionally found in abstracts, texts, documents, patent descriptions and claims, etc. has resulted in various systems and techniques for gaining rapid access to this information. Analysis and comparison of current storage and retrieval techniques indicate the primary reasons for using computers in such systems are (a) the availability of large memories for storage and manipulation, and (b) the capability of performing high-speed comparisons.

For the purpose of simplification, existing search and retrieval techniques may be separated into two distinct types: (a) the location and retrieval of specific items of information contained within a document or abstract, and (b) the location and retrieval of identifying characters or information, such as accession numbers, assigned to documents within a storage unit. Herein is described an invention which performs the latter type of information search and retrieval.

In the prior art data storage and retrieval systems there are disclosed information search and retrieval arrangements wherein the comparison of stored information data or an interrogation request is accomplished by means of data cards utilizing card-to-card comparison. The information cards and the interrogation cards are punched in a complementary fashion, and a light source or other suitable means is used to scan the data cards. A comparison match of information data and request data is indicated by a black-out condition, and the matching data records are then sorted from the non-matching data records by suitable mechanical means. An inherent shortcoming of this type of information retrieval system is the need for mechanical sorting apparatus which necessarily restricts the information retrieval speed of the machine, and thus increases the cost of operation.

Another shortcoming of prior art data storage and retrieval arrangements resides in the means for comparison of alpha-numeric characters in the stored information and the interrogation request. When punched cards, coded in a Hollerith or variable number elements code, are used for the interrogation request, ambiguities or errors are introduced in the information retrieved. For example, such ambiguities are introduced when punch cards are coded to contain alpha-numeric characters, and an output may be recorded when the alphabetic character of the punched card request is compared to the numeric character of the stored information. In some instances, special arrangements are utilized to convert the Hollerith code to a fixed number element code prior to the comparison of the stored information and the interrogation request. The unique circuits incorporated in the subject invention to be described avoid the aforementioned ambiguities arising from the use of a Hollerith or variable number element code and obviate the necessity of code conversion.

An additional inadequacy of prior art data retrieval systems resides in the fact that after the information comparison is completed, cards bearing the selected information must be sorted. In addition, the selected cards must be decoded or translated from the machine language to render the information usable.

Another shortcoming of prior art information search and retrieval systems of the card comparison type is their inability to recognize blanks between words of the stored information, and consequently their inability to efficiently handle natural language. Thus, in prior art devices, a comparison match would be indicated when the request corresponds to the last characters of a word and the first characters of a subsequent word resulting in the retrieval of excessive amounts of unrelated information. The inability to utilize natural language in the automation of information storage and retrieval is a problem that has long confronted the information handling industry.

Still another inadequacy of prior art systems is in the use of special codes for interrogation request information. This necessitates extensive programming by the use of plug-board wiring when it is desired to operate the system in different modes.

In the present invention, natural language search and retrieval is provided and neither machine media nor machine language need be interposed between the user and the storage information and retrieval system itself. Requests or queries are formulated in the same language as the information which is stored in the information storage unit.

The principal object of the invention is to provide an improved information search and retrieval system for comparison of request data and stored information data and the retrieval of information identifiers.

Another object of the invention is to provide an improved information search and retrieval system capable of information comparisons at higher speeds than prior art systems.

A further object of the invention is to provide a search comparator system wherein the retrieval of information identifiers occurs when the comparison of the interrogation request to the information stored falls within a preselected comparison range.

In the operation of a data storage and retrieval system, it is highly desirable to provide the capability within the system to conduct various types of searches. This can be accomplished by providing a search comparator system which executes the comparative processes between the interrogation request and the information file as well as performs the logical functions specified by the request criteria. Consequently, it is a further object of this invention to provide an improved information search and retrieval system which is capable of conducting various types of searches, including conjunction, disjunction, negation, variable suffix, partial request satisfaction, word order, information dissemination and multiple searches.

Still another object of the invention is to provide an information search and retrieval system wherein the information file may consist of complete texts, abstracts or indexed information stored in natural language and the requests are formulated in exactly the same language as the information files.

An additional object of the information storage and retrieval system of the invention described herein is to provide a search comparator wherein access to predetermined portions of the information file can be readily prevented.

Another object of the invention is to provide a data comparator for comparison of stored information data and request data coded in a variable number element code.

Still another object of the invention is to provide an information search and retrieval system wherein the information file unit record of the information storage unit may be searched in either direction.

In accordance with one form of the invention, the complete text, abstract or indexed information is assigned identifying characters or accession numbers and the information together with its identifying characters is stored on a suitable media. The system is queried or interrogated for the desired information by a request of logically connected search words written in the same language as the stored information. Upon a successful match or comparison of the request information and the stored information, the identifying characters are printed out whereby the information relating to the request may be identified.

In accordance with another feature of the invention, the interrogation request may comprise a punched card, and the information to be searched is stored on a continuously movable media. Upon insertion of the card into a card reader, the comparison process is automatically initiated, and an output printer lists the accession numbers corresponding to the stored information, which either completely or partially, depending on a preselected setting, satisfies the request requirements.

In accordance with another feature of the invention, the interrogation request may comprise a direct input, such as from a typewriter. The request is presented and stored within the system, and compared to library information stored in an information storage unit. An output printer lists the accession numbers identifying the stored information, which either completely or partially, depending on a preselected setting, satisfies the request criteria.

In accordance with another feature of the invention, each document, text, abstract, etc. is stored on a continuously movable media in the information storage unit together with associated identifying characters, such as accession numbers, and a special symbol or character, utilized as an accession number identifier, immediately precedes the accession number. A reversed order, hereinafter referred to as a mirror image, of the accession number and its identifier is recorded at the end of each document on the movable media. The request data or interrogation request serves as an input to the system and starts the comparison process by conditioning a data comparator to give an output indication whenever a comparison match of a character coming into the system from the information storage unit is matched to a character of the interrogation request. The movable media, which may be a magnetic tape, is adapted to be driven in either direction thereby eliminating rewind, and by virtue of the mirror image recording of the accession number, the movable media may be searched while it is driven in the reverse direction. In the case where a punched card is used for the request data, the punched card is placed in a card reader printed side up when the movable media is searched in the forward direction, and printed side down when a search is to be conducted moving the movable media in the reverse direction. In the case of a direct input, such as from a typewriter, control signals are automatically initiated upon switching to reverse reading to condition the circuits to the changed condition.

In accordance with another feature of the invention, multiple register buffering is provided to store any document accession numbers which may occur during the printing time for a preceding comparison match of the request data and the stored information. In accordance with this last aspect, a visual indicator is provided to signal the operator when the machine overload conditions exist, that is, when more comparison matches of the request information data and the stored information data have occurred than there are registers to store the accession numbers corresponding to the matches. A count is maintained of the number of comparison matches which are not printed out due to overload conditions, and the accession numbers corresponding to said matches may be retrieved by a second comparison run or by searching the tape in reverse. In addition, means are provided upon overload to interlock the information storage unit transport mechanism of the invention, and a manual control switch must be actuated in order to return the system to its original state and permit another search to be conducted.

Another feature of the invention includes a data comparator for comparison of the interrogation request and the stored information. The interrogation request serves to condition or preset a diode matrix of the data comparator in such manner that it will give a positive indication every time a character coming into the system from the information storage unit is matched to a character of the information request. The interrogation request is coded in a variable number element code and represents one input to the data comparator, while the stored information data represents a second input. A numerical discriminator conditions the diode matrix to be inhibited or enabled, in that it prevents an output indication from occurring when an alphabetic character is being compared to a numerical character and permits an output indication only upon a correct comparison of alphabetical or numerical characters.

While the specification concludes with claims particularly pointing out and distinctly claiming the subject matter of the invention, it is believed the invention will be more easily comprehended from the following description taken in connection with the accompanying drawings in which:

Figures 5, 6:
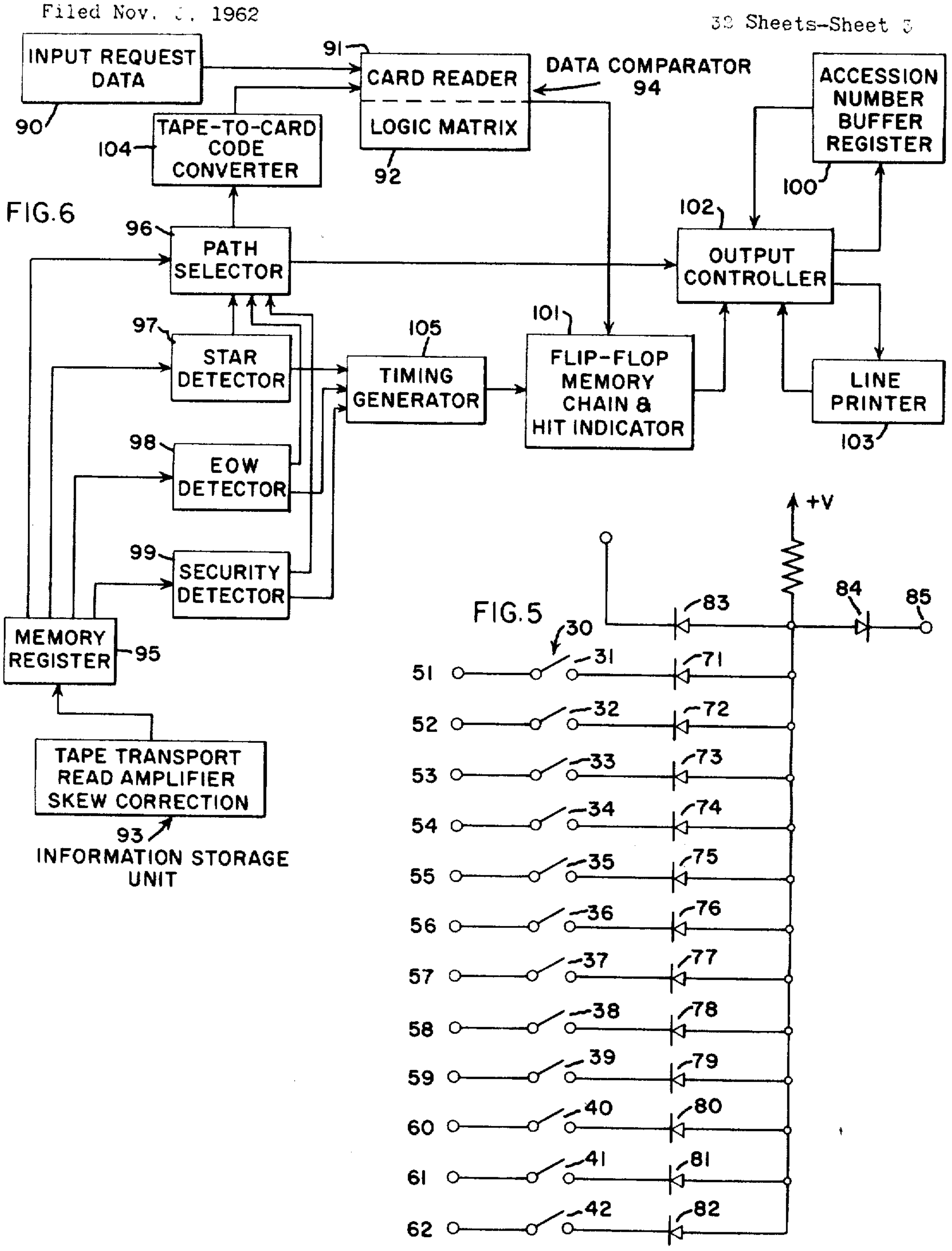
FIG. 5 is a circuit representation of one column of the data comparator comprising the card reader and logic matrix.
FIG. 6 is a general block diagram of the overall information search and retrieval system.
Figure 7:
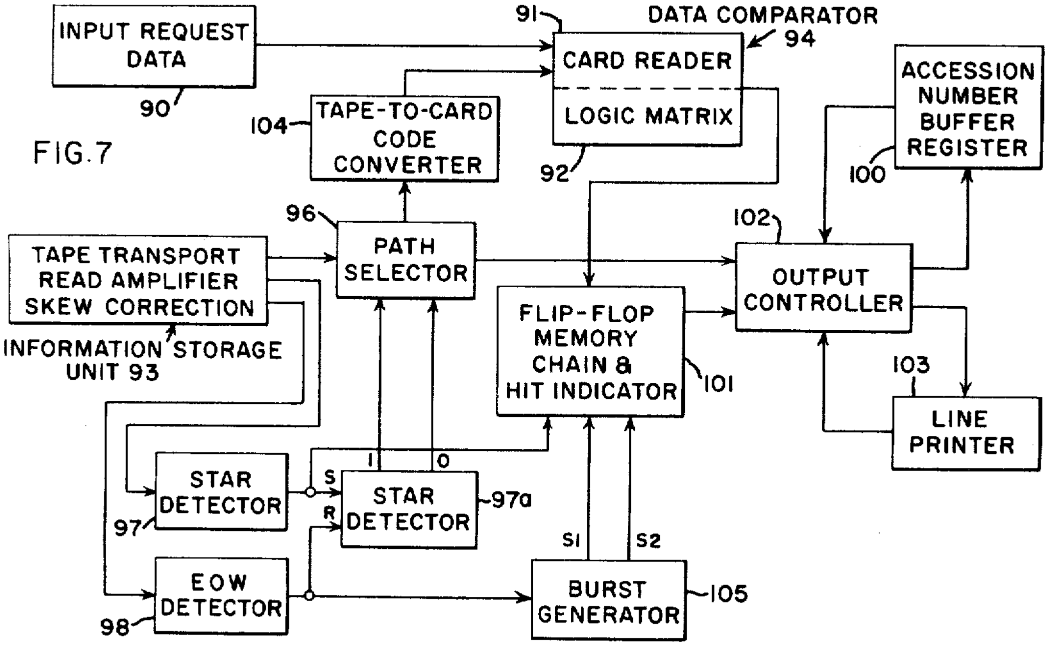
FIG. 7 is a block diagram similar to FIG. 6 showing a modified form of the information search and retrieval system utilizing a burst generator for timing synchronization.
Figure 12:
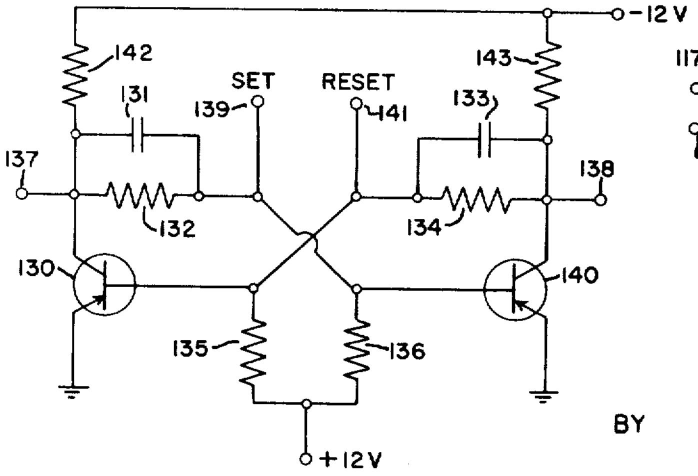
FIG. 12 is a schematic representation of a flip-flop circuit.
Figure 13A:
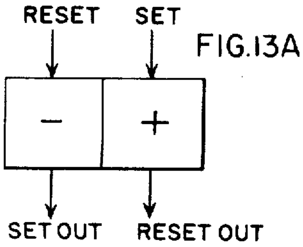
Figure 13B:
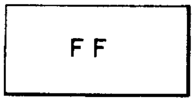
Figure 15:
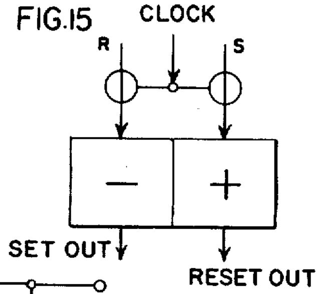
Figure 14:
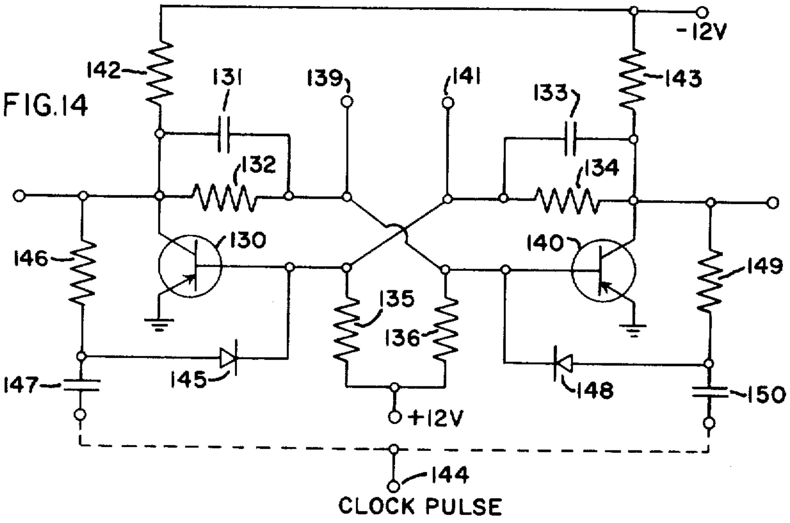
Figure 17:
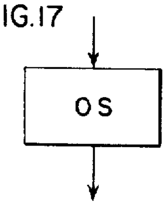
Figure 19:
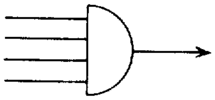
Figure 20:
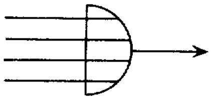
Figure 18:
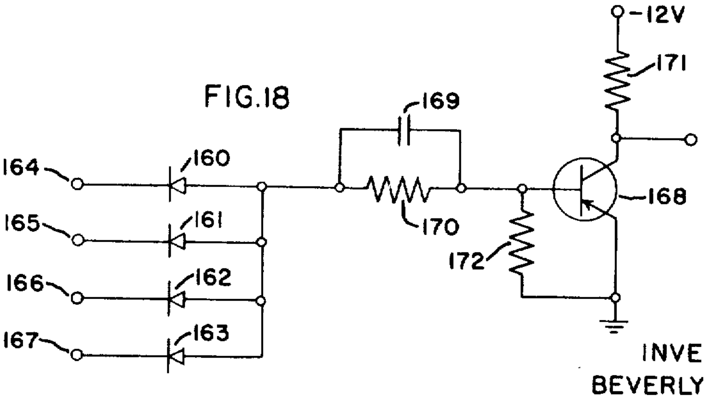
Figure 16:
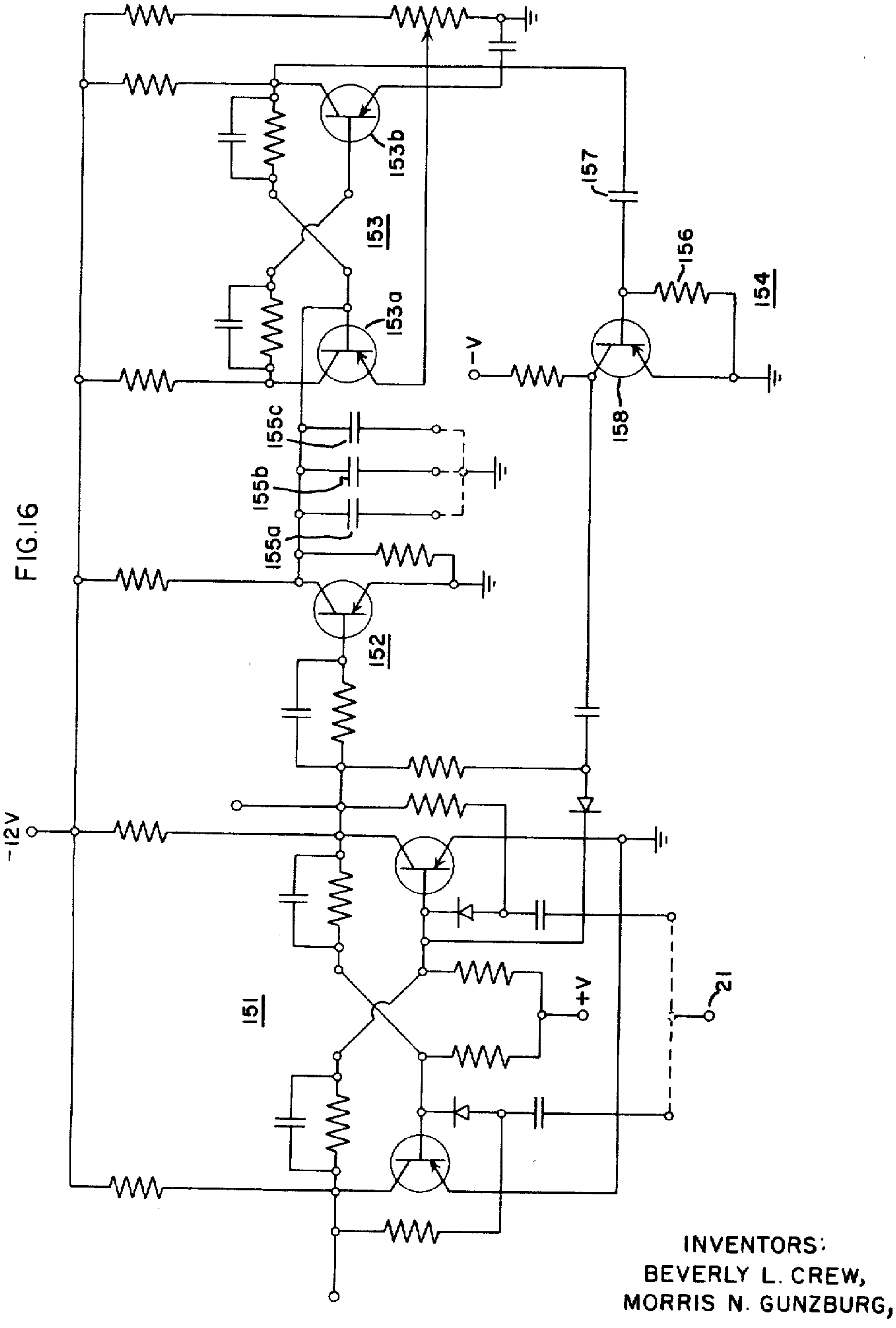
Figure 21:
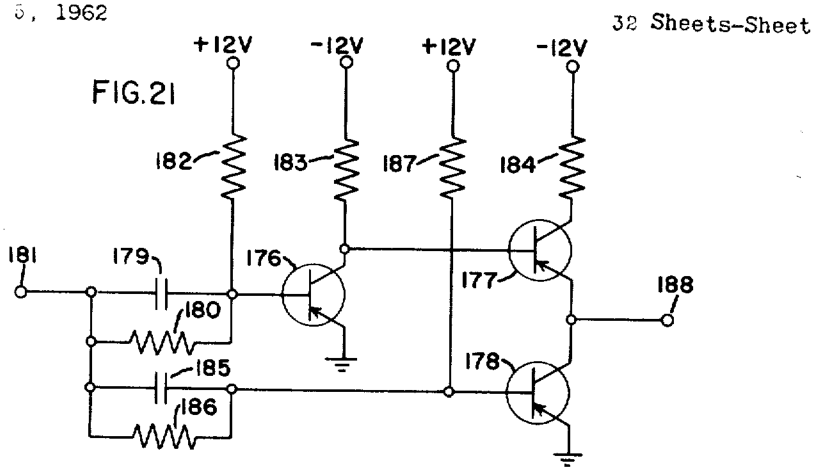
Figure 22:
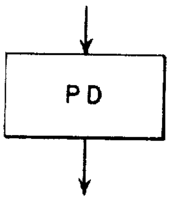
Figure 23:
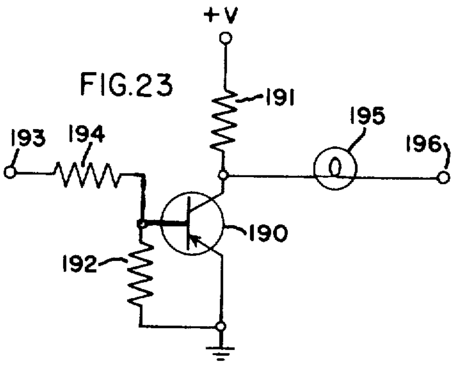
Figure 24:
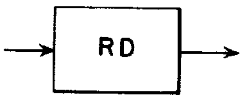
Figure 26:
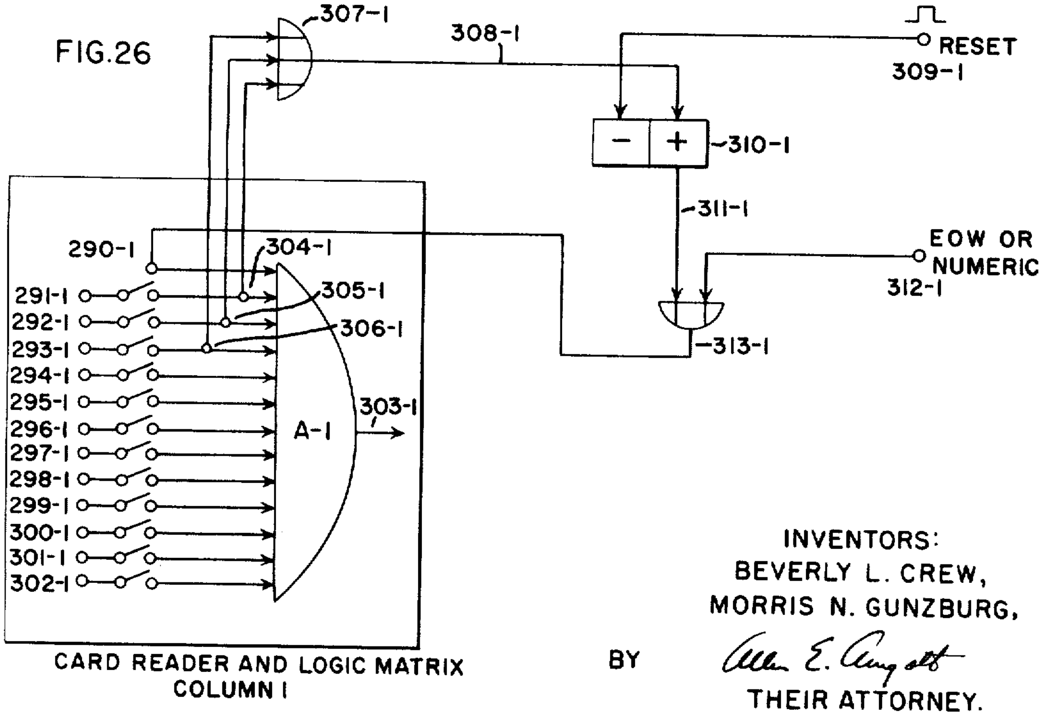
Figure 25:
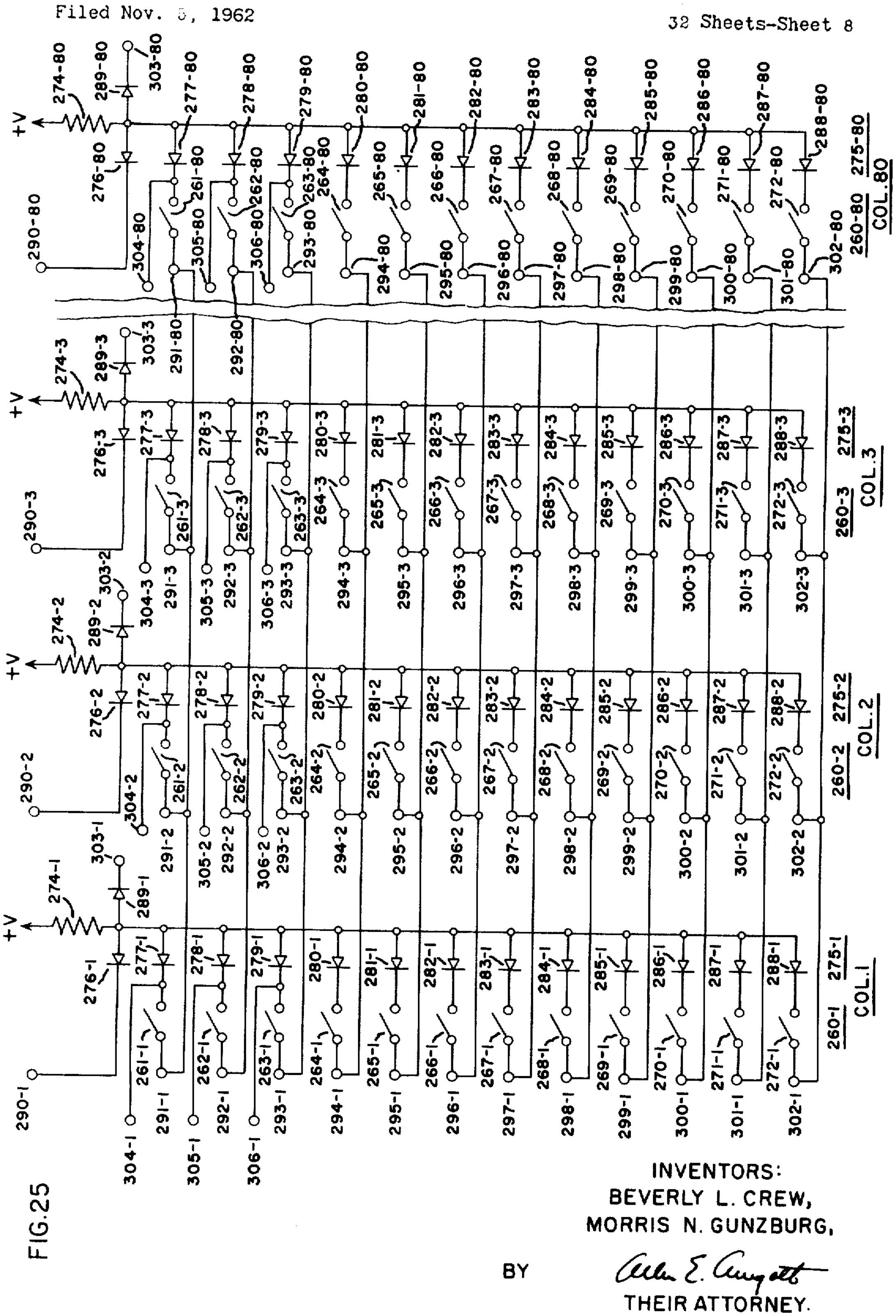
Figure 26A:
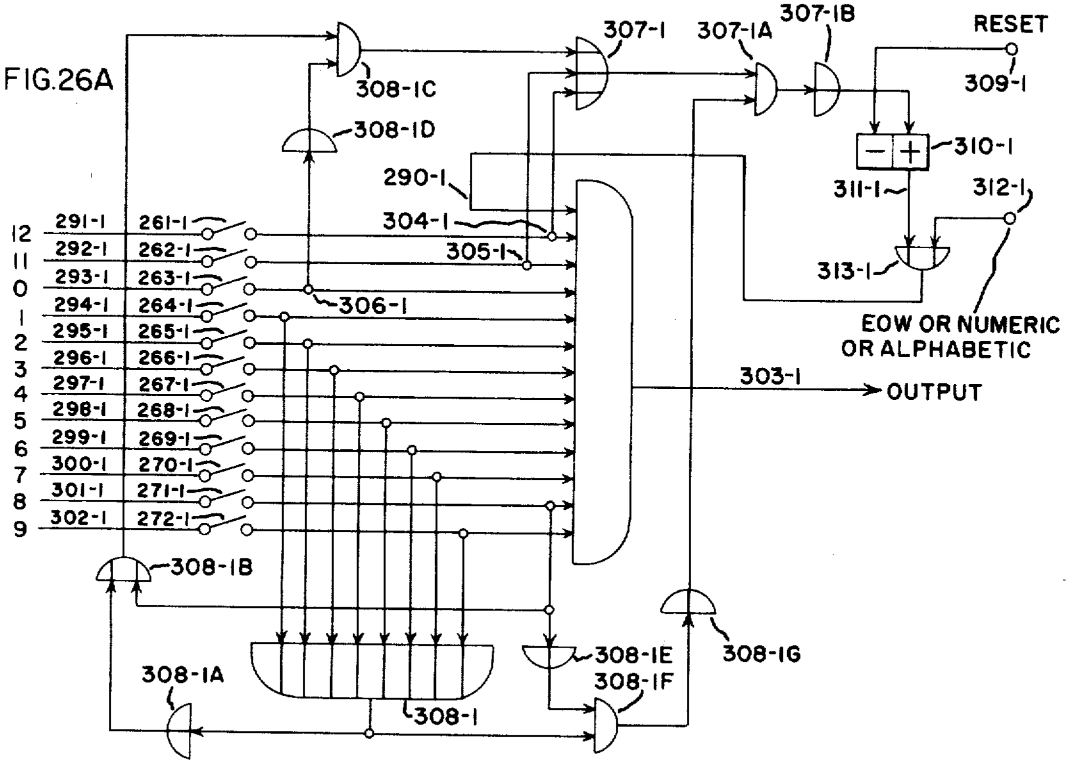
Figure 27:
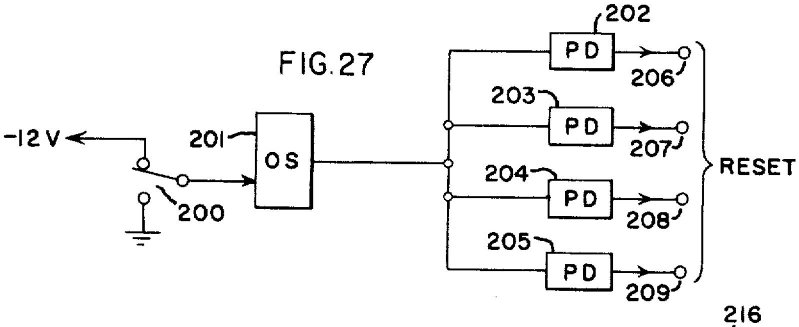
Figure 28:
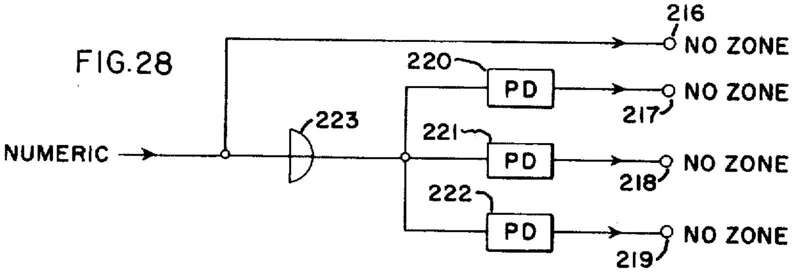
Figure 29:
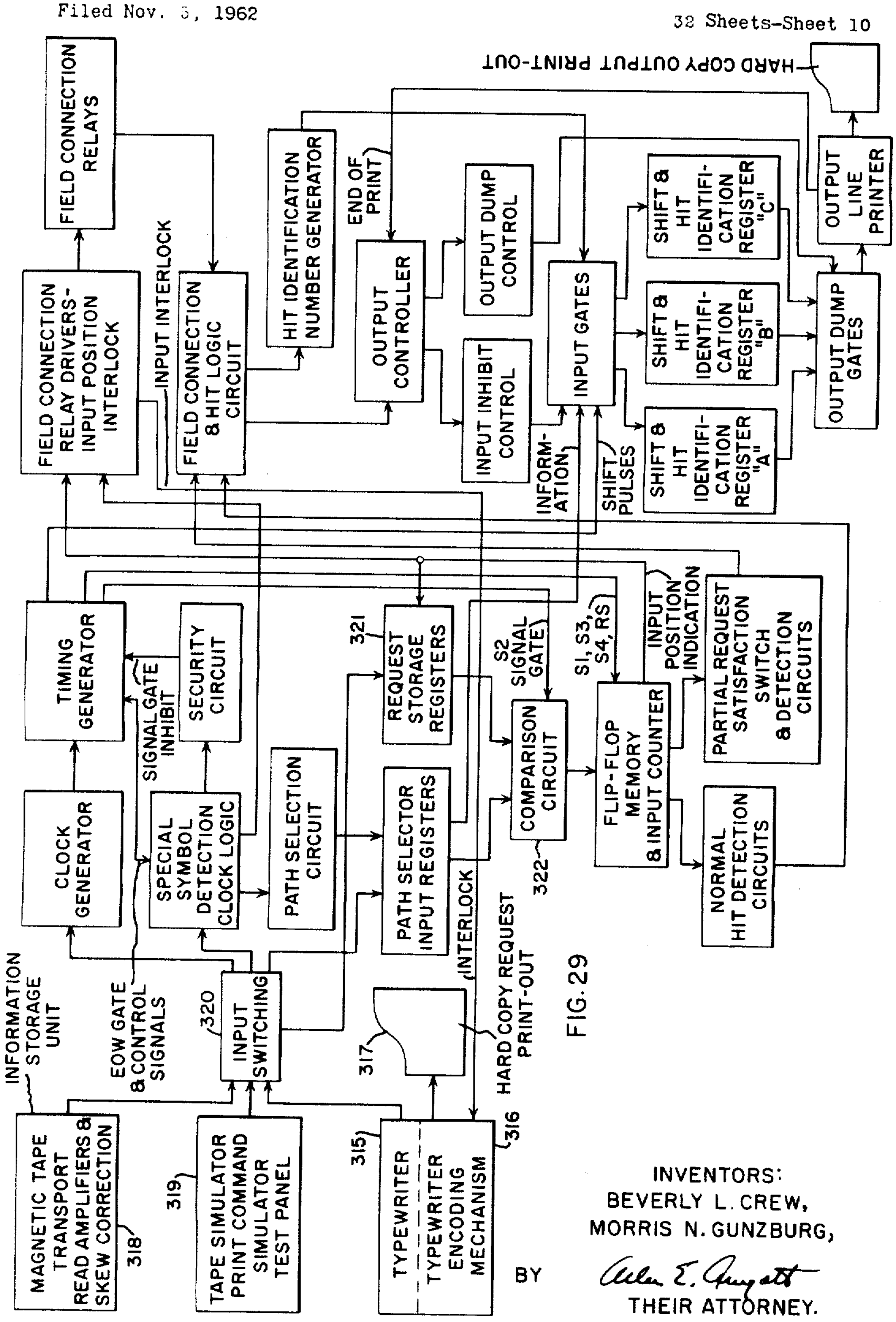
Figure 29A:
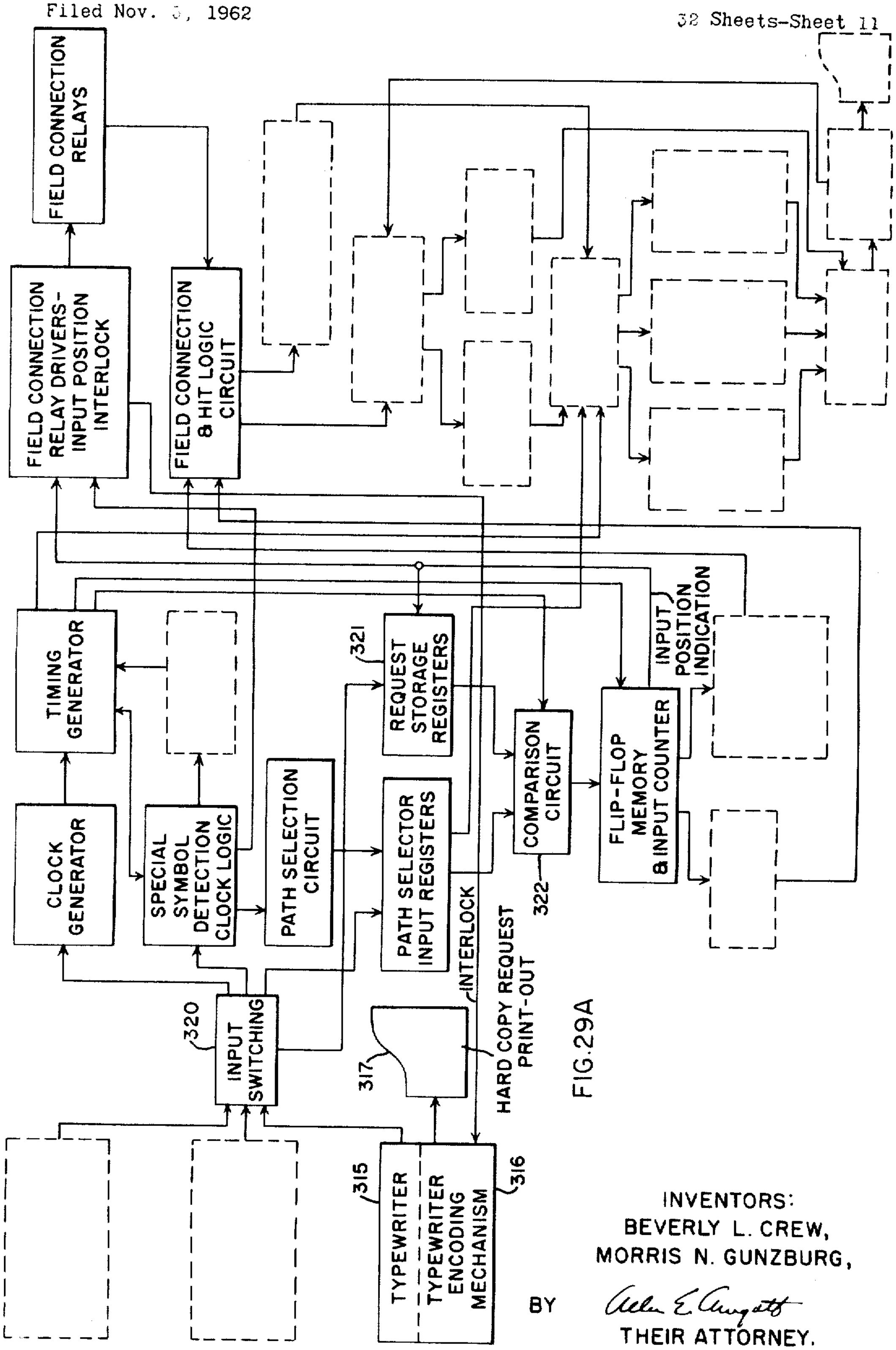
Figure 29B:
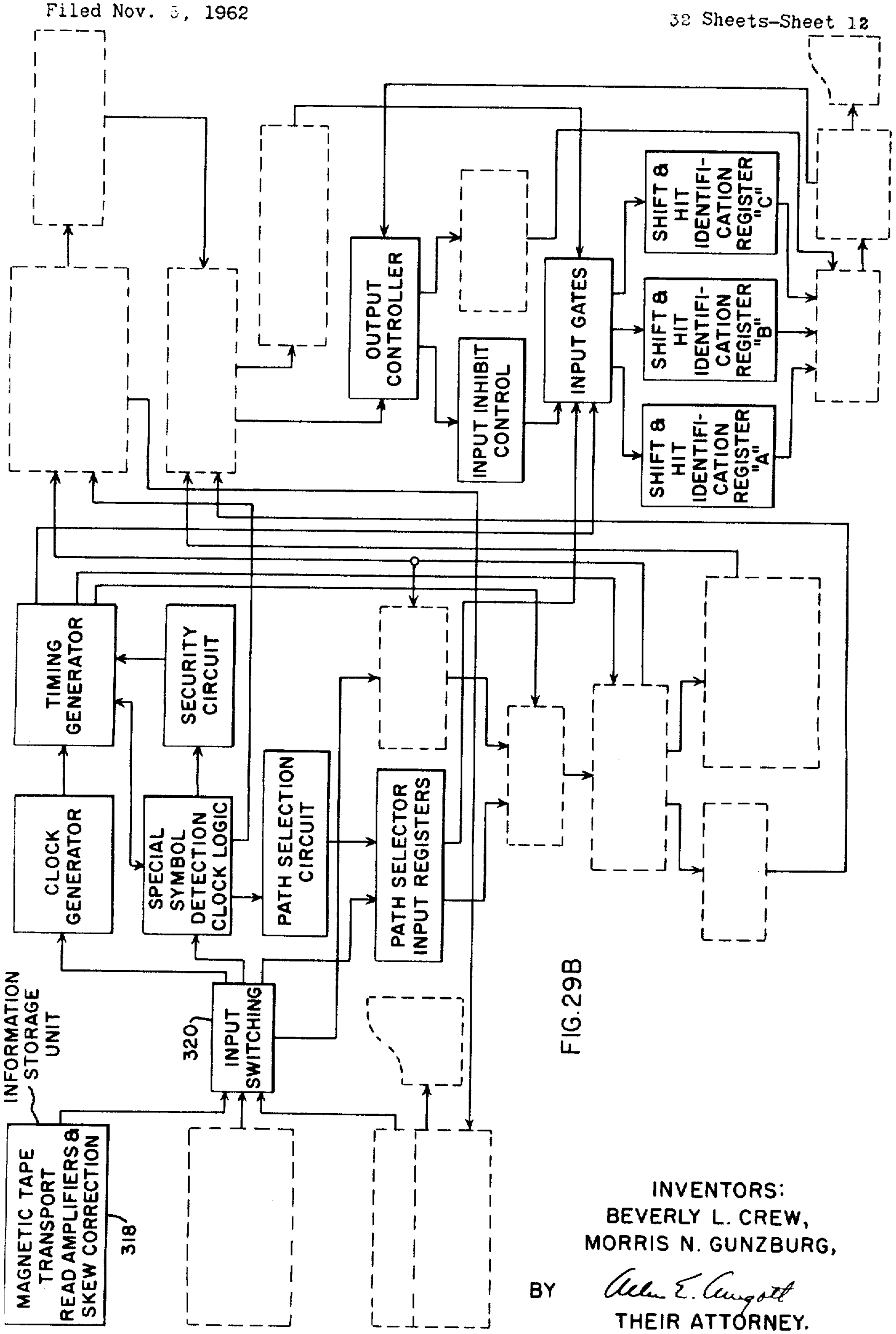
Figure 29C:
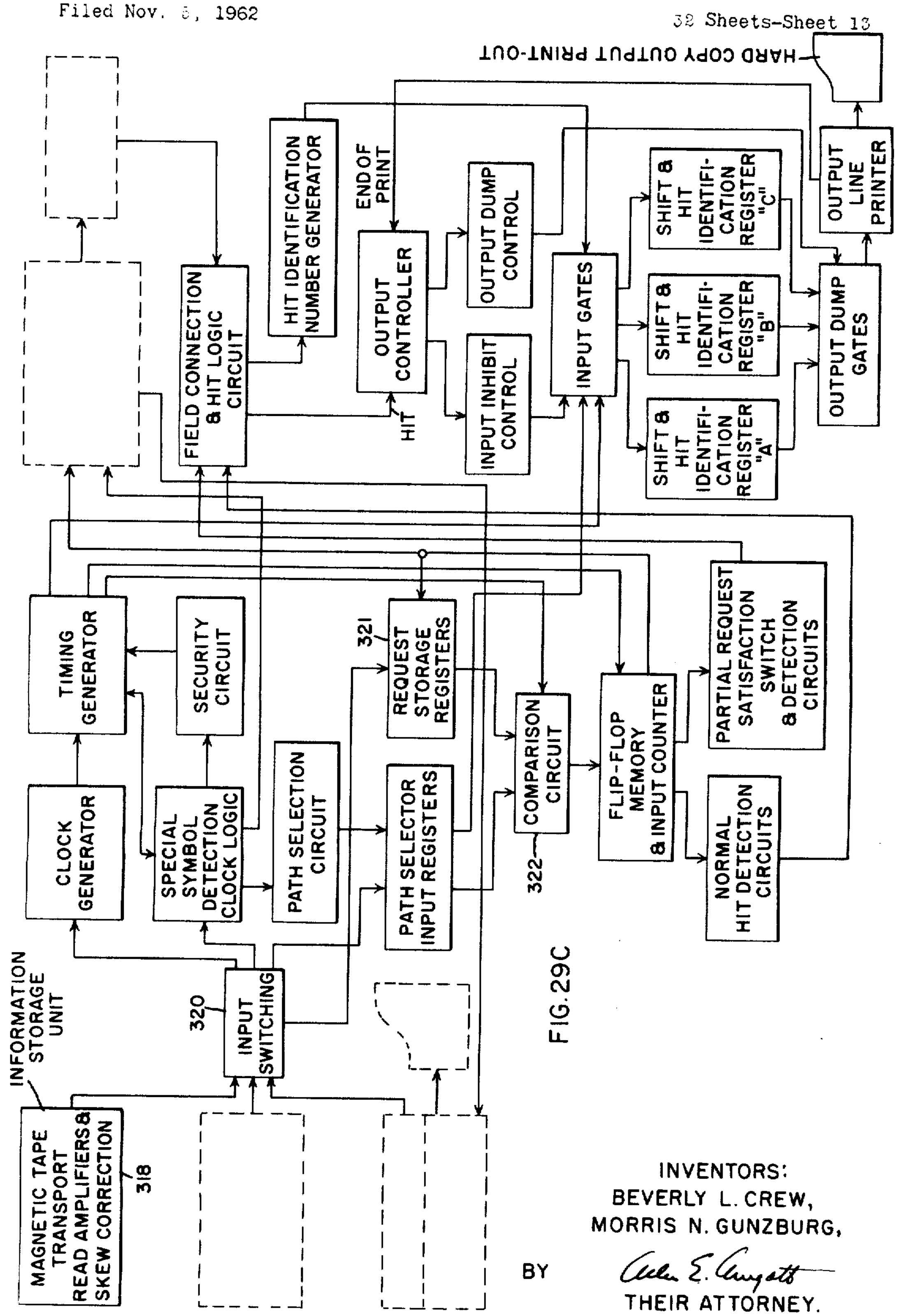
Figure 30A:
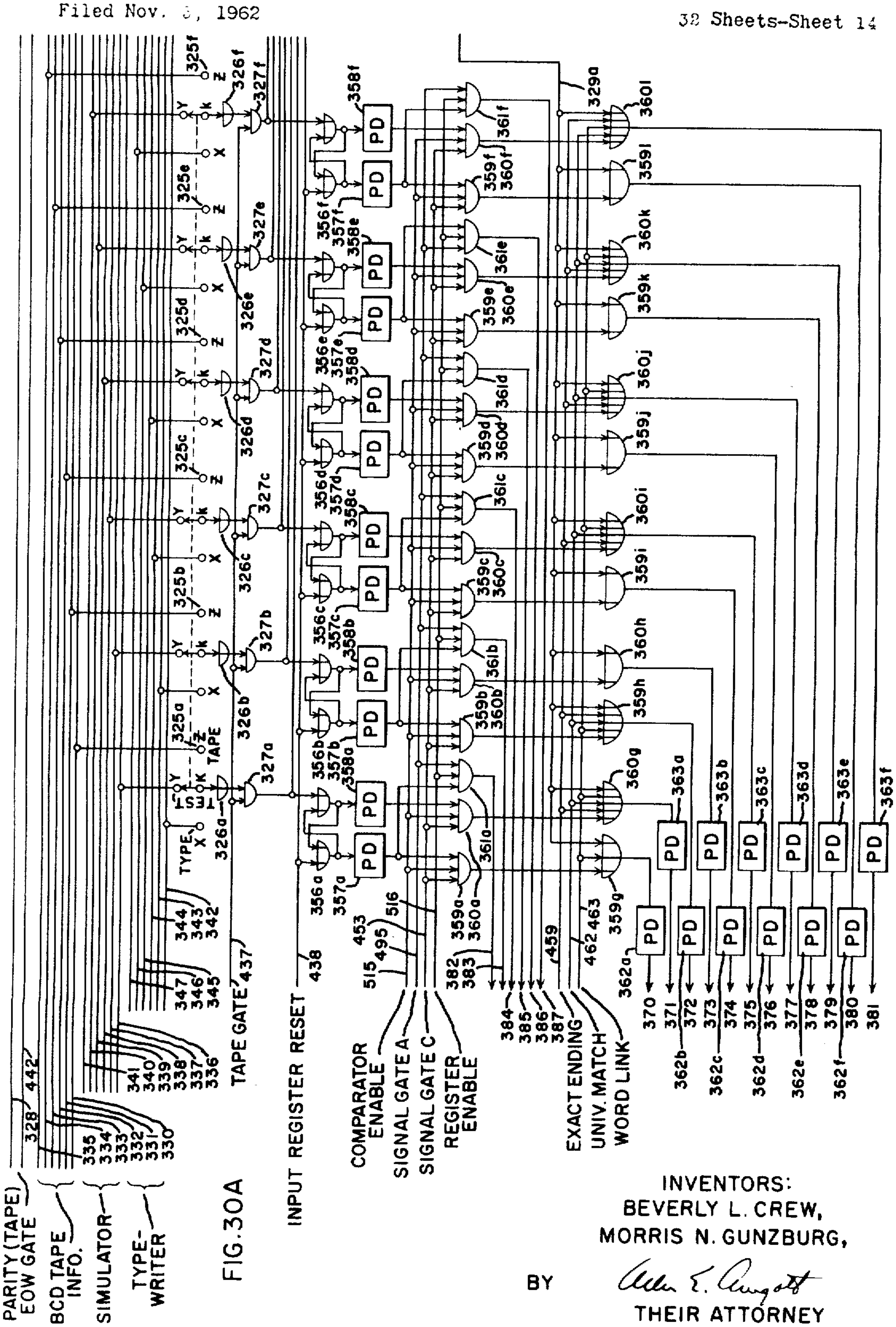
Figure 31:
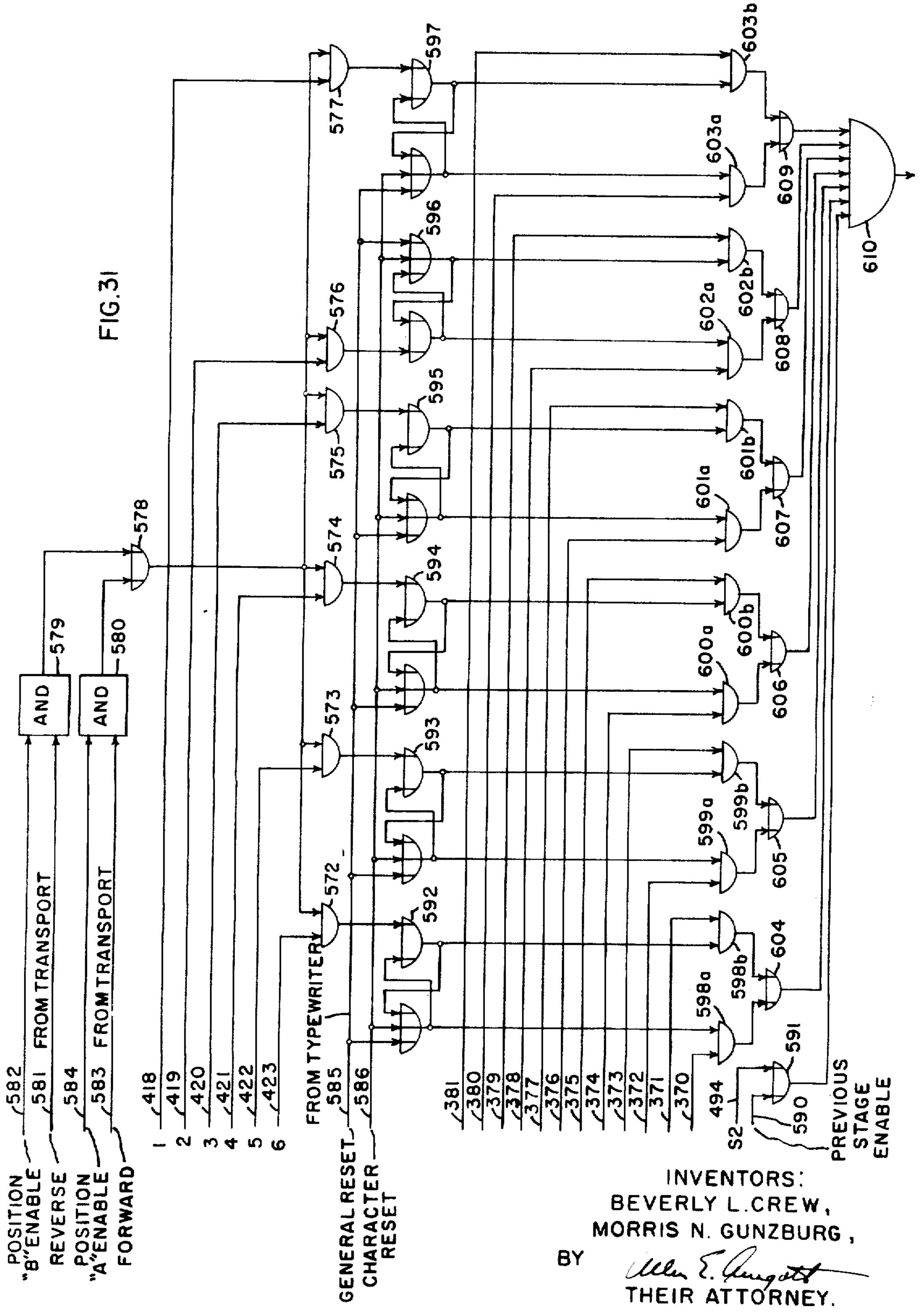
Figure 32:
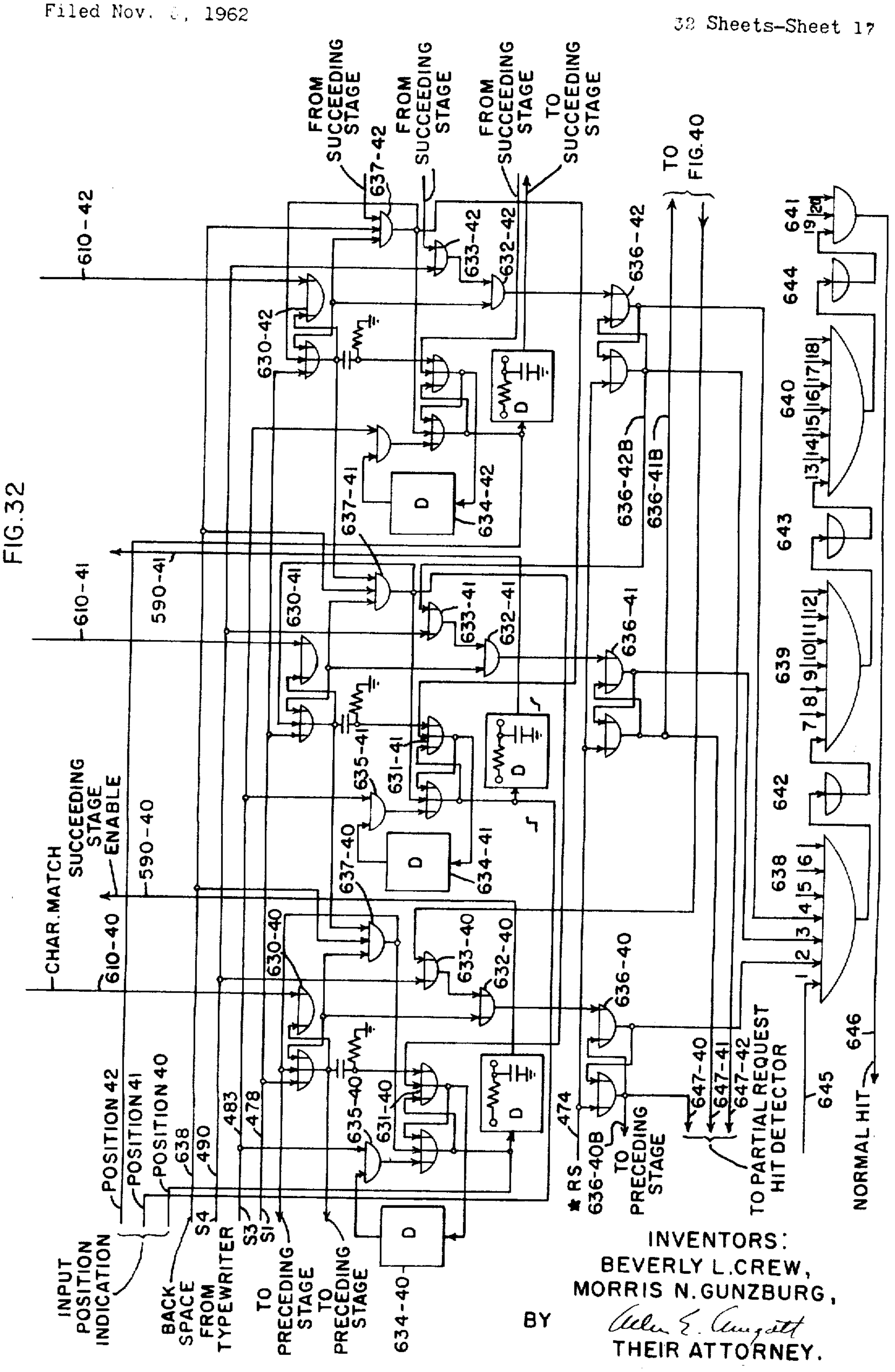
Figure 33A:
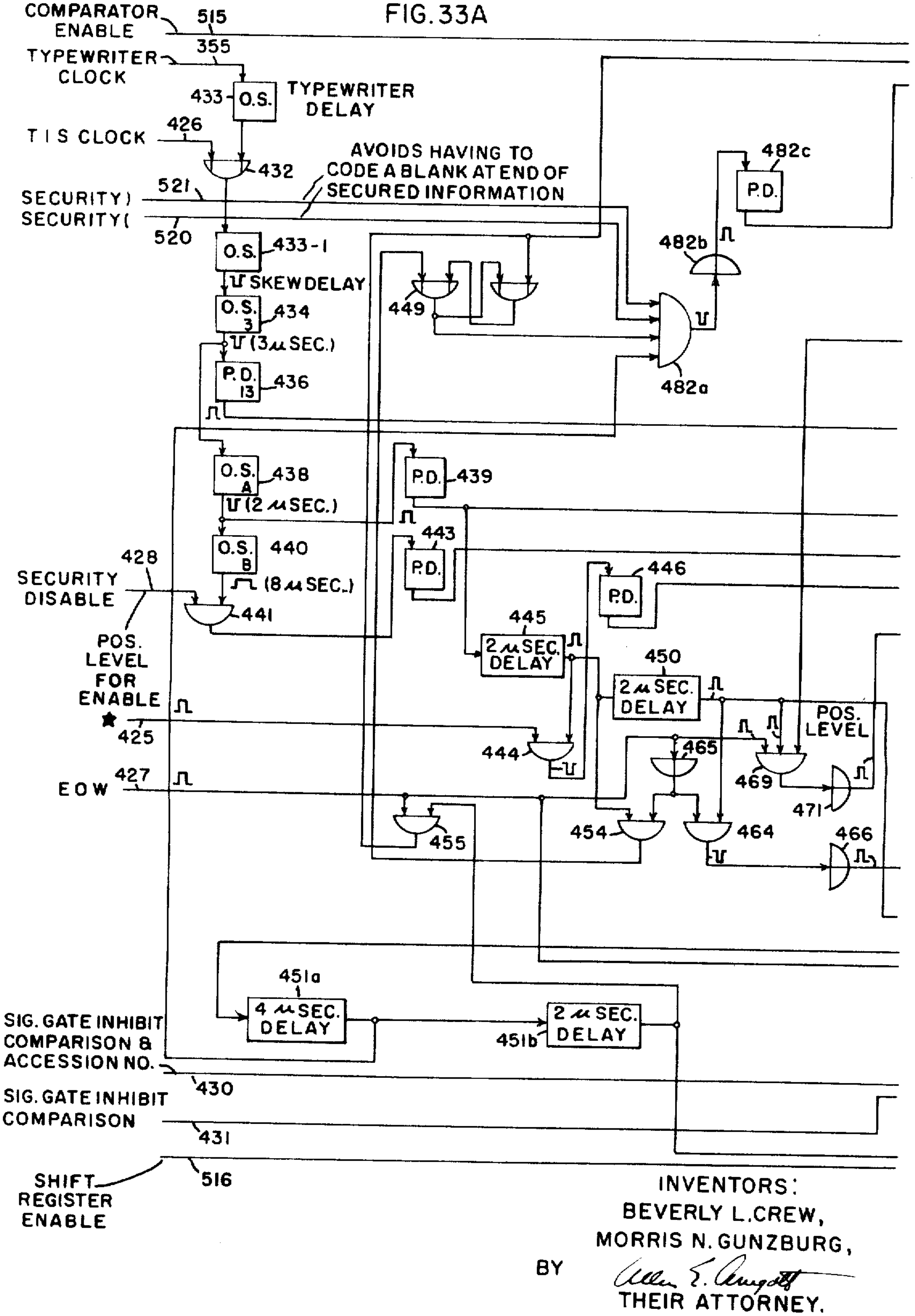
Figure 34:
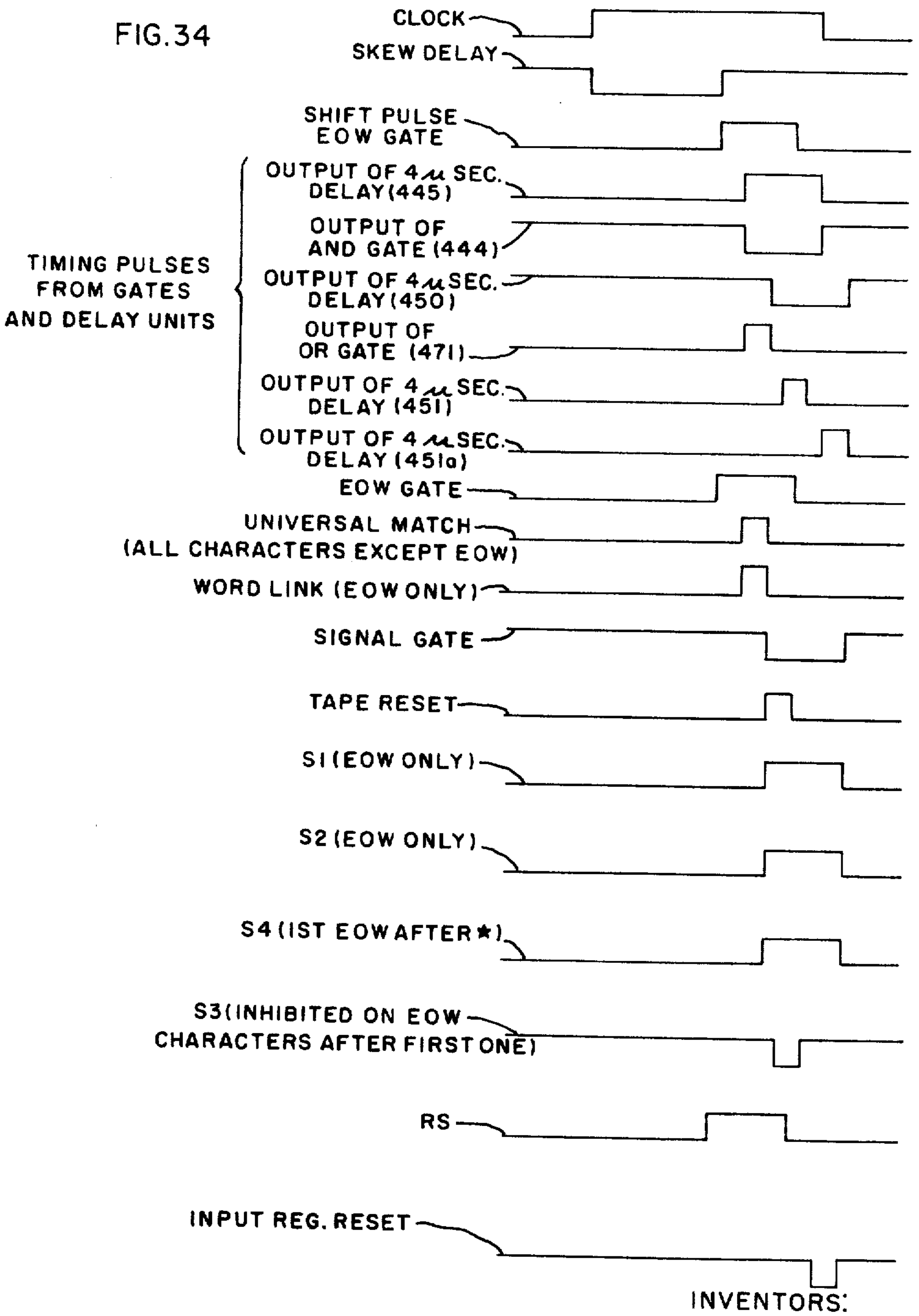
Figure 35:
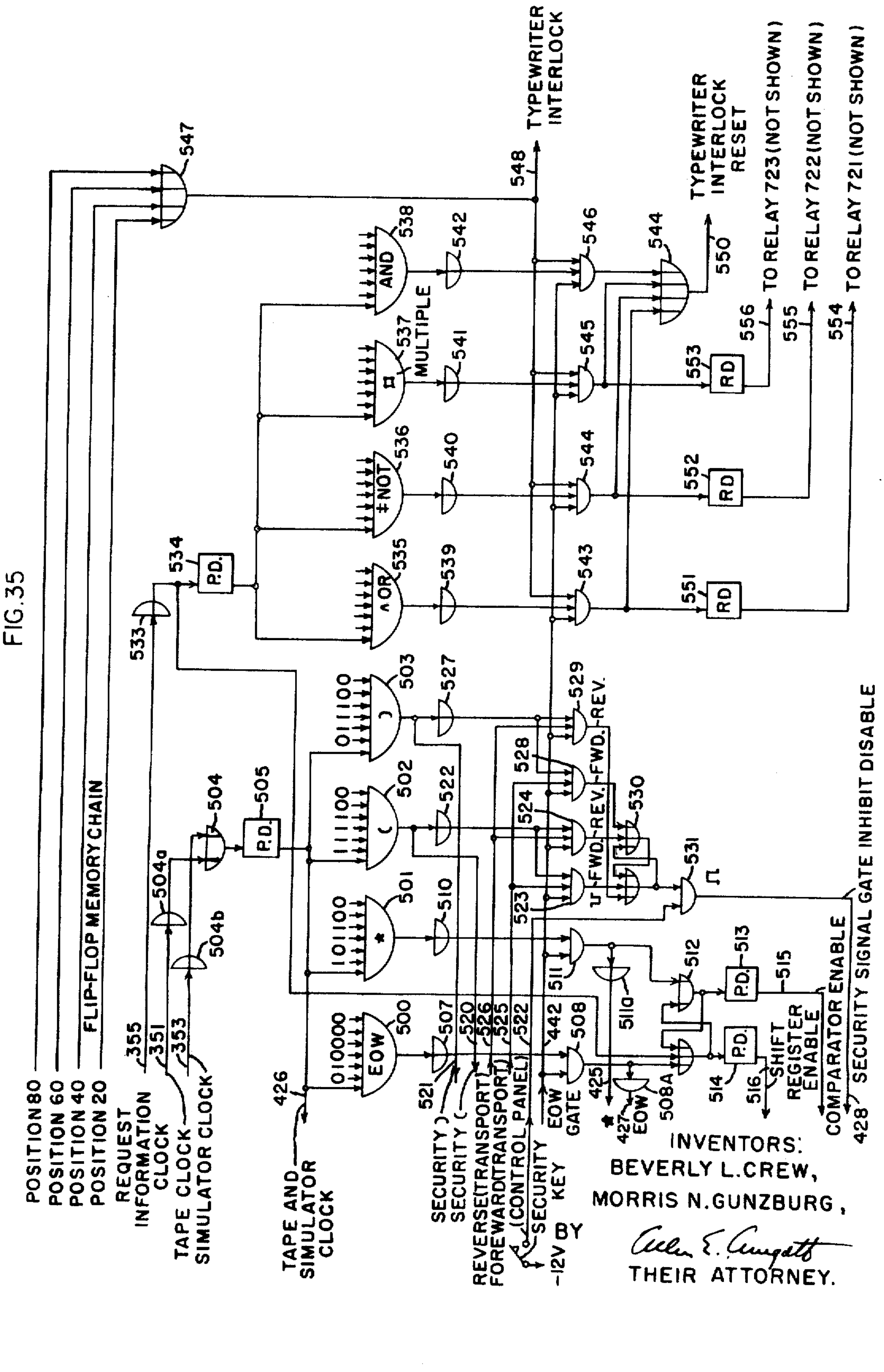
Figure 36:
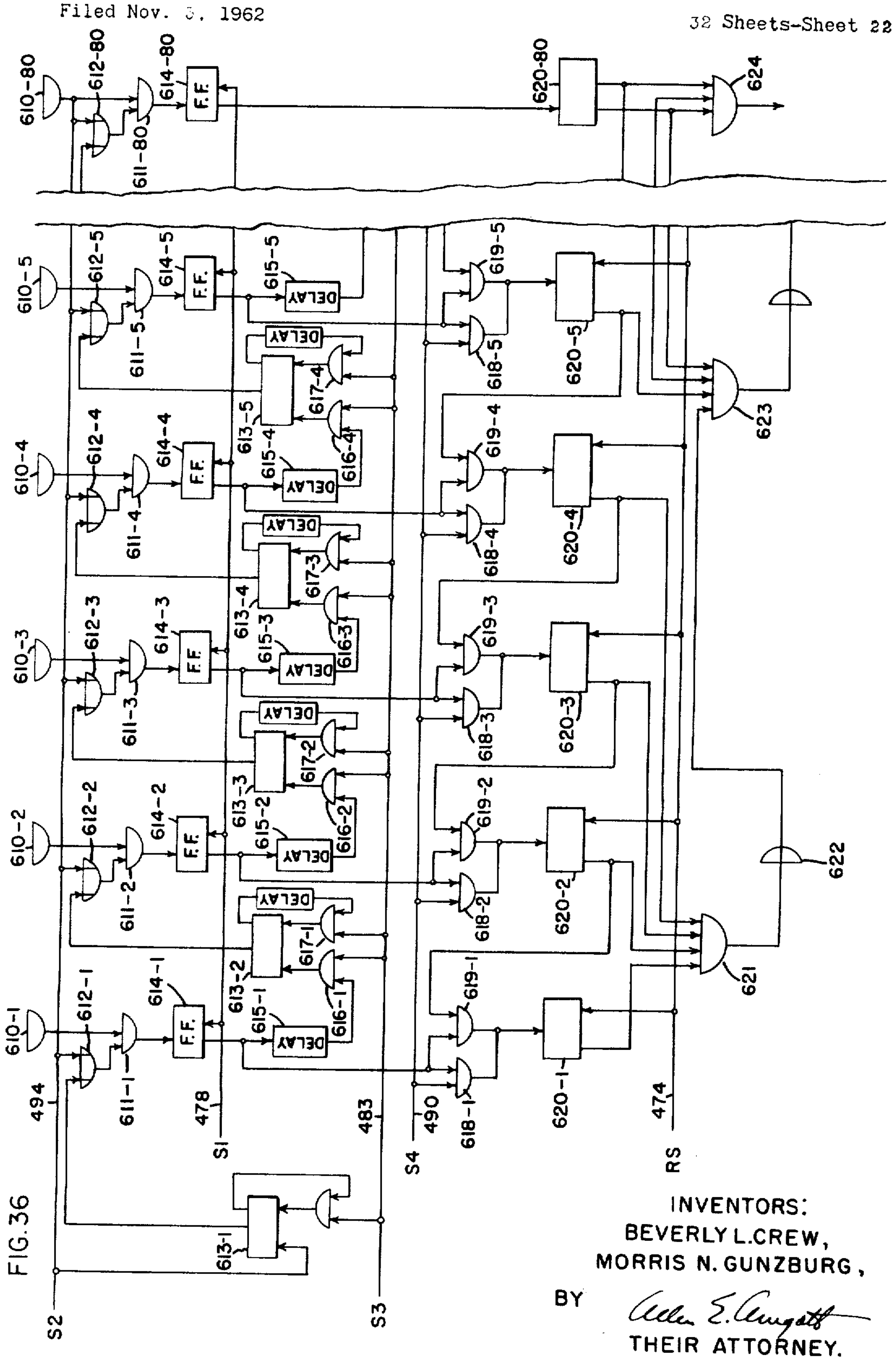
Figure 37:
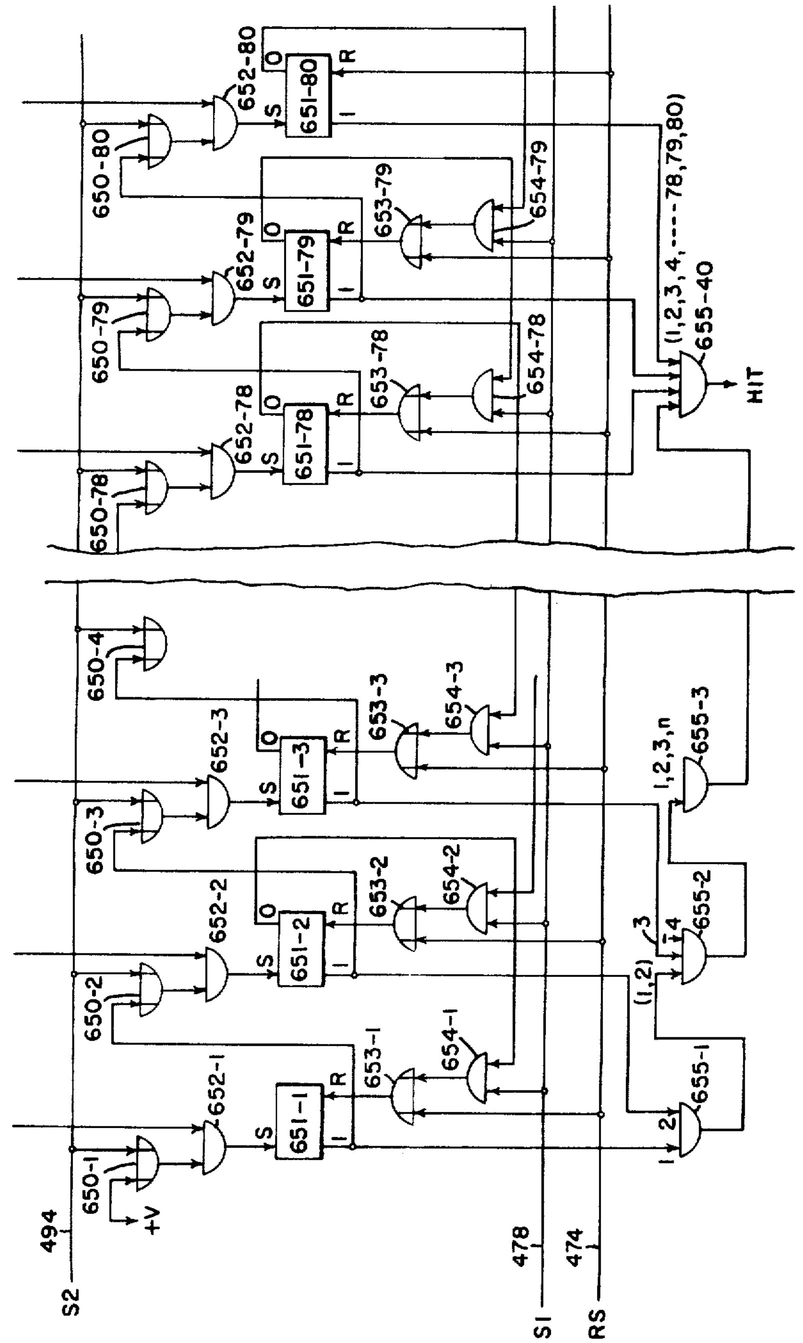
Figure 38:
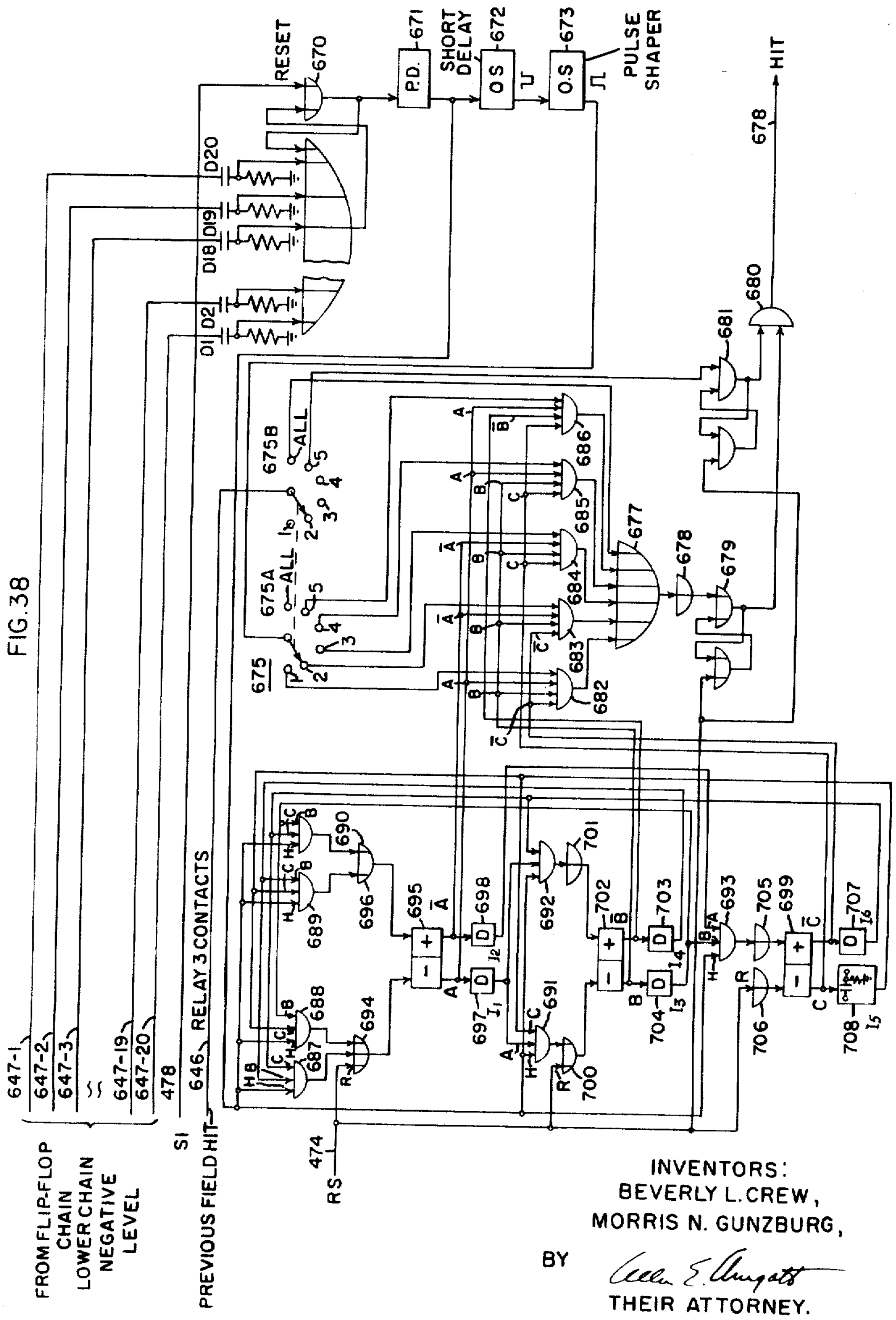
Figure 38A:
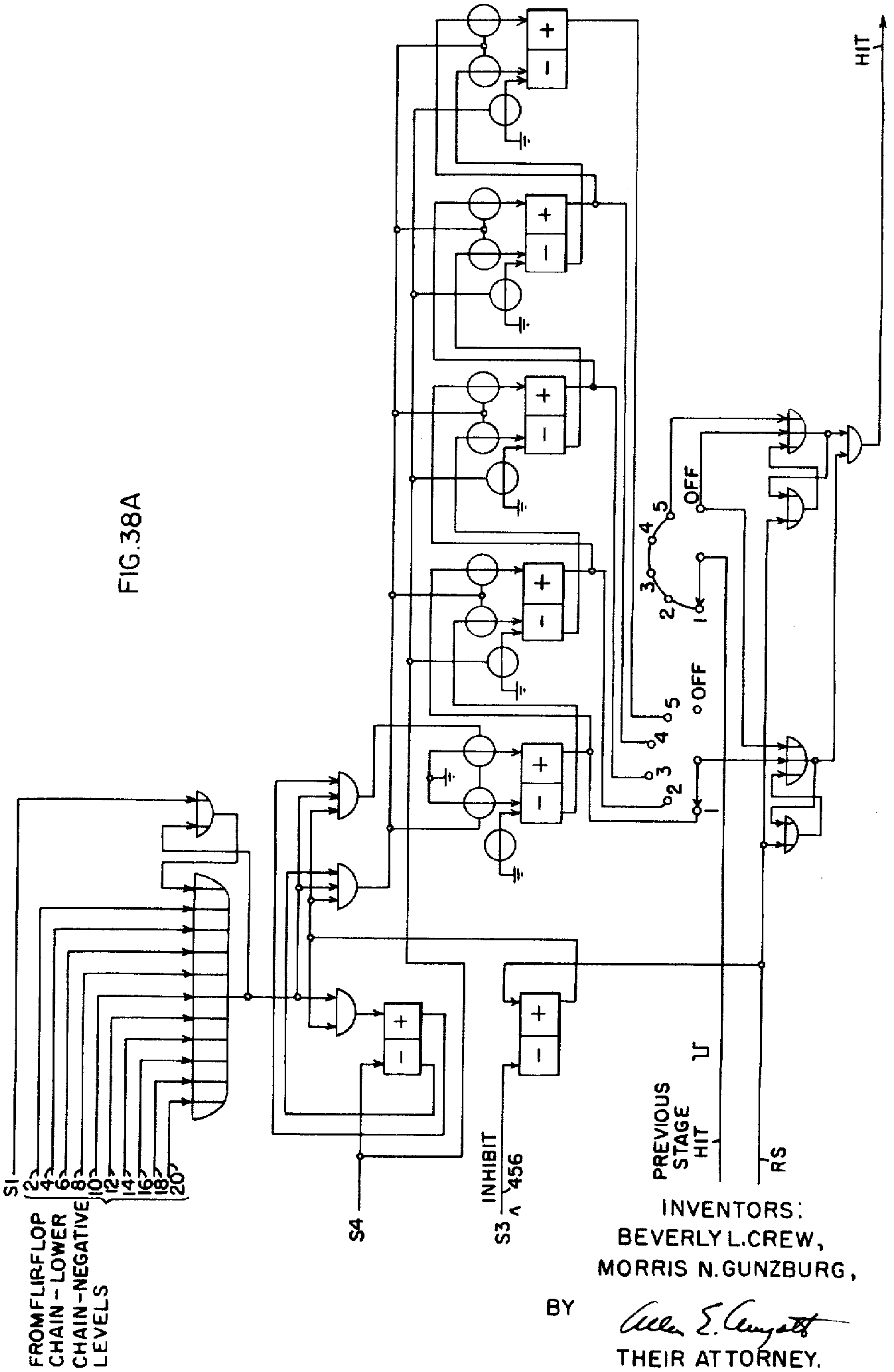
Figure 39:
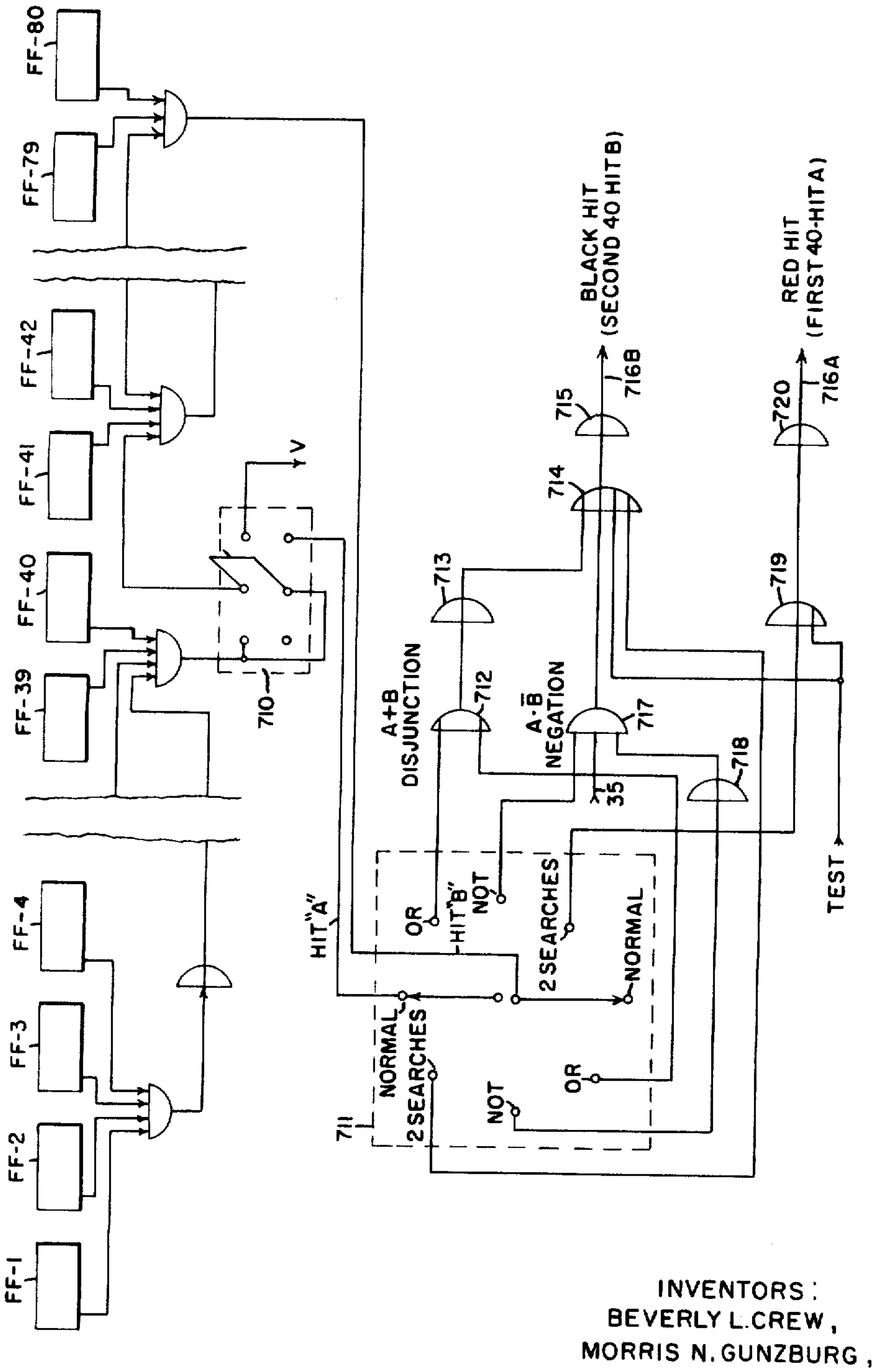
Figure 40:
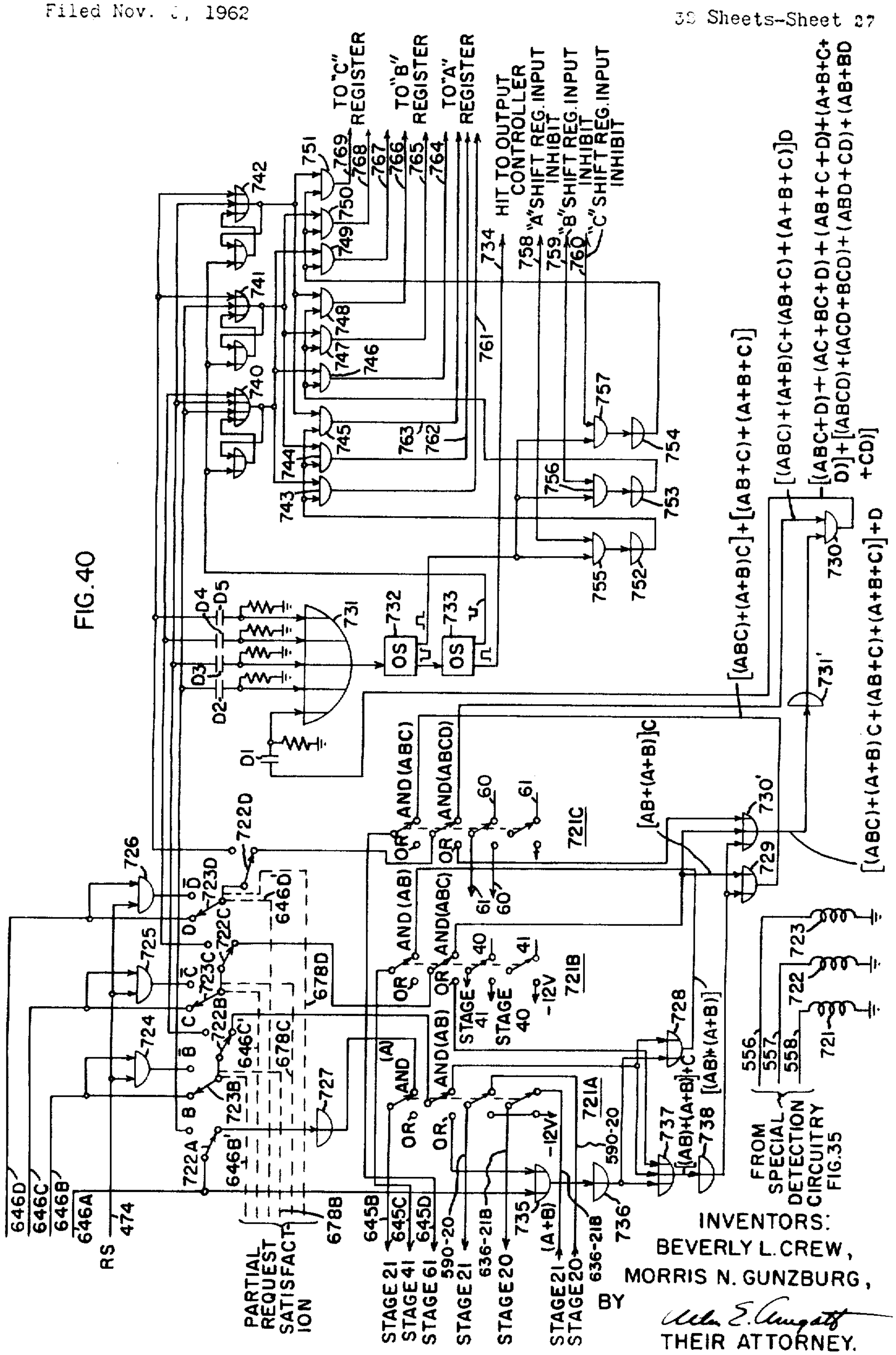
Figure 41A:
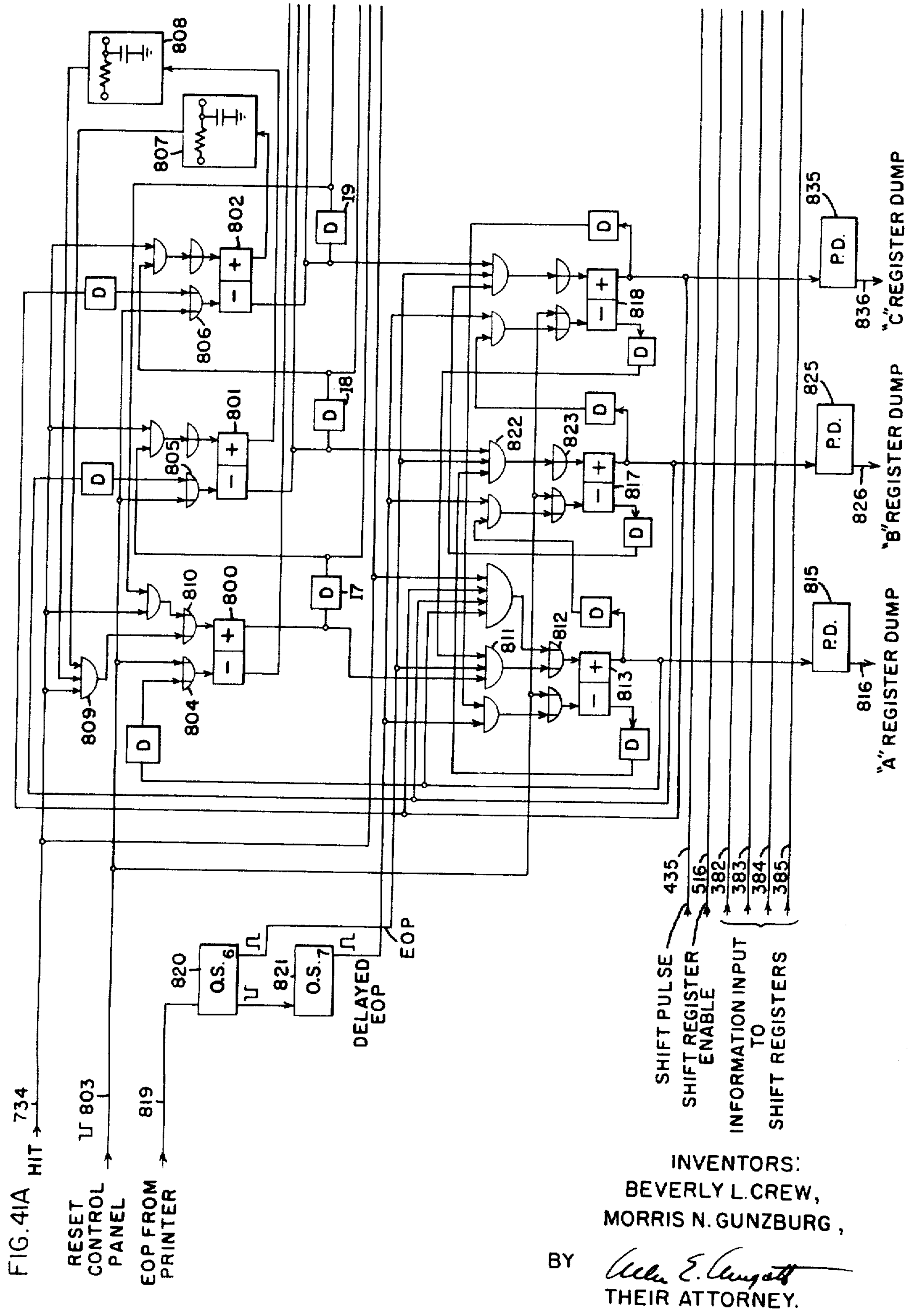
Figures 42, 43:
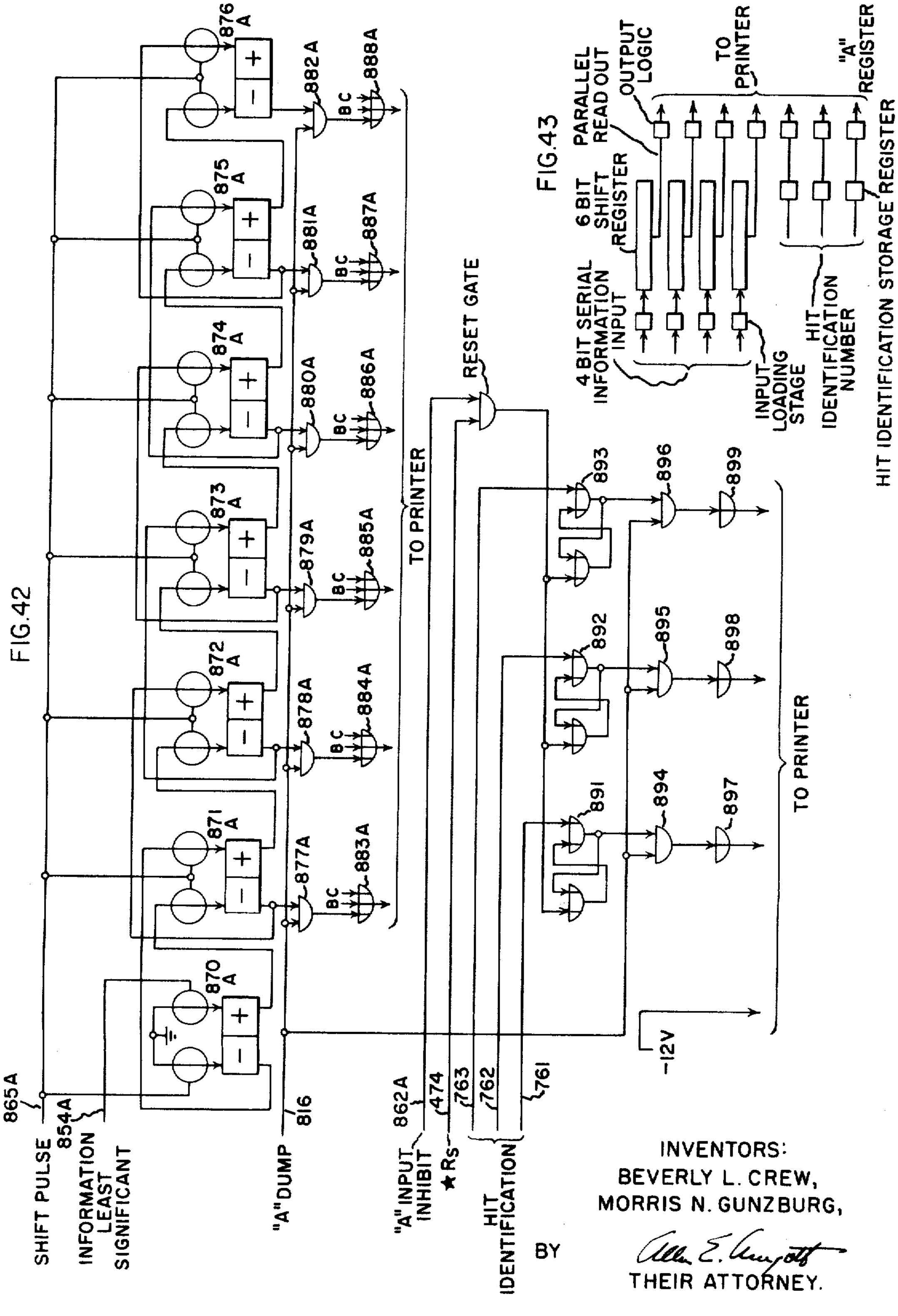
Figure 44:
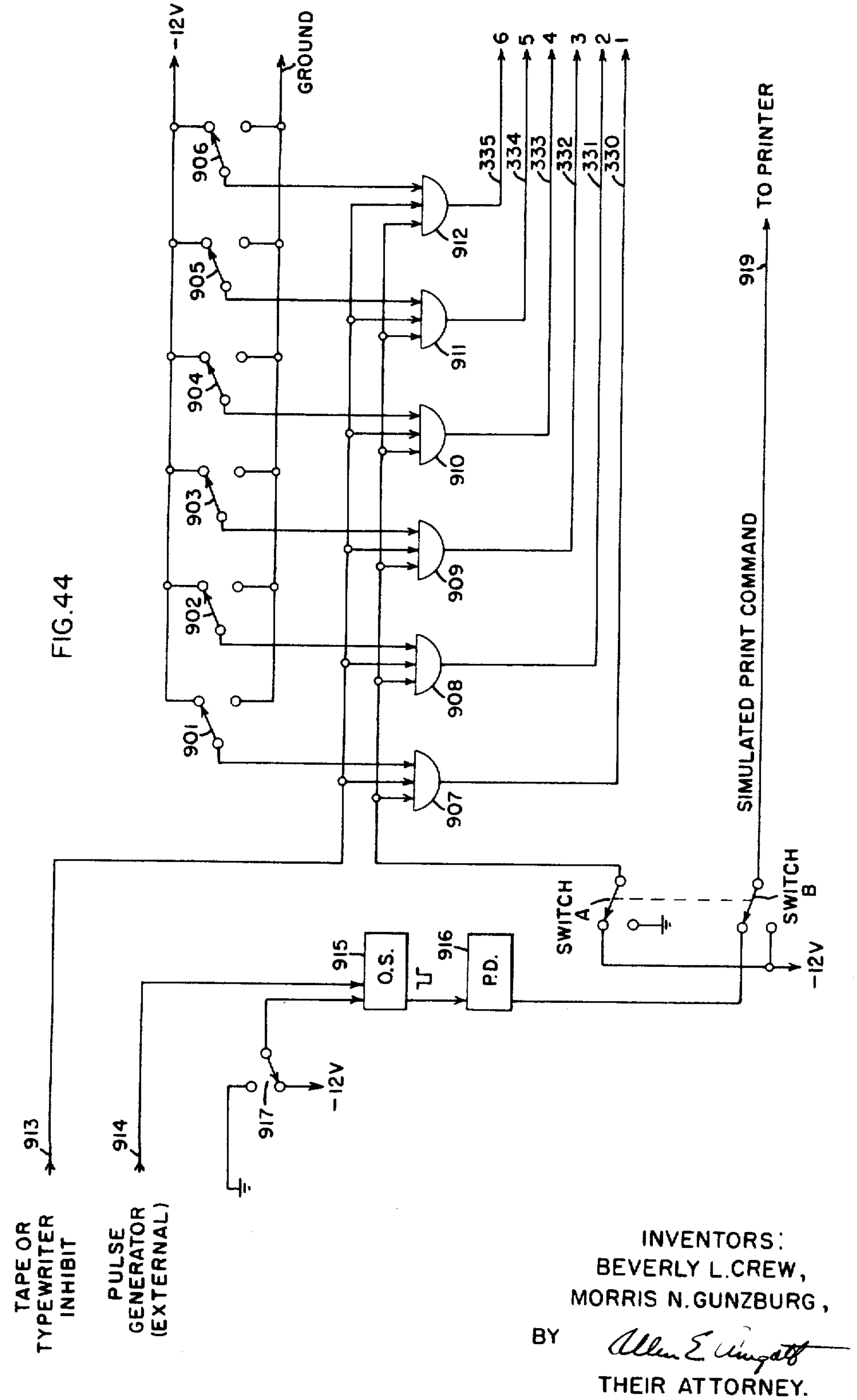

FIGS. 13*a* and 13*b* are block diagram representations of the flip-flop circuit of FIG. 12;

FIG. 14 is a schematic diagram of a flip-flop circuit with an AC trigger input;

FIG. 15 is a block diagram representation of the flip-flop circuit of FIG. 14;

FIG. 16 is a schematic diagram of a one-shot multivibrator circuit;

FIG. 17 is a block diagram representation of the one-shot multivibrator of FIG. 16;

FIG. 18 is a schematic diagram of an AND-OR inverter circuit;

FIG. 19 is a block diagram representation of the AND inverter circuit of FIG. 18;

FIG. 20 is a block diagram representation of the OR inverter circuit of FIG. 18;

FIG. 21 is a schematic diagram of a power driver circuit;

FIG. 22 is a block diagram representation of the power driver of FIG. 21;

FIG. 23 is a schematic representation of a relay or indicator driver circuit;

FIG. 24 is a block diagram representation of the relay driver of FIG. 23;

FIG. 25 is a schematic representation of the card reader and logic matrix;

FIG. 26 is a block diagram representation of the card reader and logic matrix in conjunction with a numerical discriminator;

FIG. 26A is an alternate embodiment of a block diagram representation of the card reader and logic matrix in conjunction with a numerical discriminator;

FIG. 27 is a block diagram representation of the card-switch control circuits for generating reset pulses;

FIG. 28 is a block diagram representation of the card-switch control circuit for generating numeric (no zone) pulses;

FIG. 29 is a general block diagram of the information search and retrieval system incorporating a typewriter input;

FIG. 29A is a general block diagram of the information search and retrieval system incorporating a typewriter input and illustrates the interrogation request loading mode;

FIG. 29B is a general block diagram of the information storage and retrieval system incorporating a typewriter input and illustrates the accession number storage mode;

FIG. 29C is a general block diagram of the information search and retrieval system incorporating a typewriter input and illustrates the comparison mode;

FIGS. 30A and B represent logical block diagrams of the input switching, path selector, and input register circuits;

FIG. 31 is a logical block diagram of the character comparison and request character storage circuit;

FIG. 32 is a logical block diagram of three stages of the flip-flop memory chain and hit indicator circuits used in conjunction with the system illustrated in FIG. 29;

FIGS. 33A and B are logical block diagrams of the timing generator;

FIG. 34 is a timing chart illustrating the time relationship of the generated pulses of the timing generator;

FIG. 35 is a logical block diagram of the special symbol detection circuits;

FIG. 36 is a logical block diagram of the flip-flop memory chain and hit indicator used in conjunction with the system illustrated in FIG. 6;

FIG. 37 is a logical block diagram representation of a flip-flop memory chain and hit indicator used in conjunction with the alternate embodiment of the information search and retrieval system shown in FIG. 7;

FIG. 38 is a logical block diagram representation of the partial request satisfaction circuit;

FIG. 38A is an alternate logical embodiment of the partial request satisfaction circuits shown in FIG. 38;

FIG. 39 is a logical block diagram representation showing a function switch control;

FIG. 40 is a logical block representation of the field logic and hit identification circuits;

FIGS. 41A and B represent logic block diagram representations of the output controller and shift register input circuits;

FIG. 42 is a logic block diagram representation of the shift register illustrating the circuit arrangement for one-bit information input;

FIG. 43 is a block diagram representation of one register illustrating a four-bit serial information input;

FIG. 44 is a logical block diagram representation of the tape simulator; and

Figure 45:
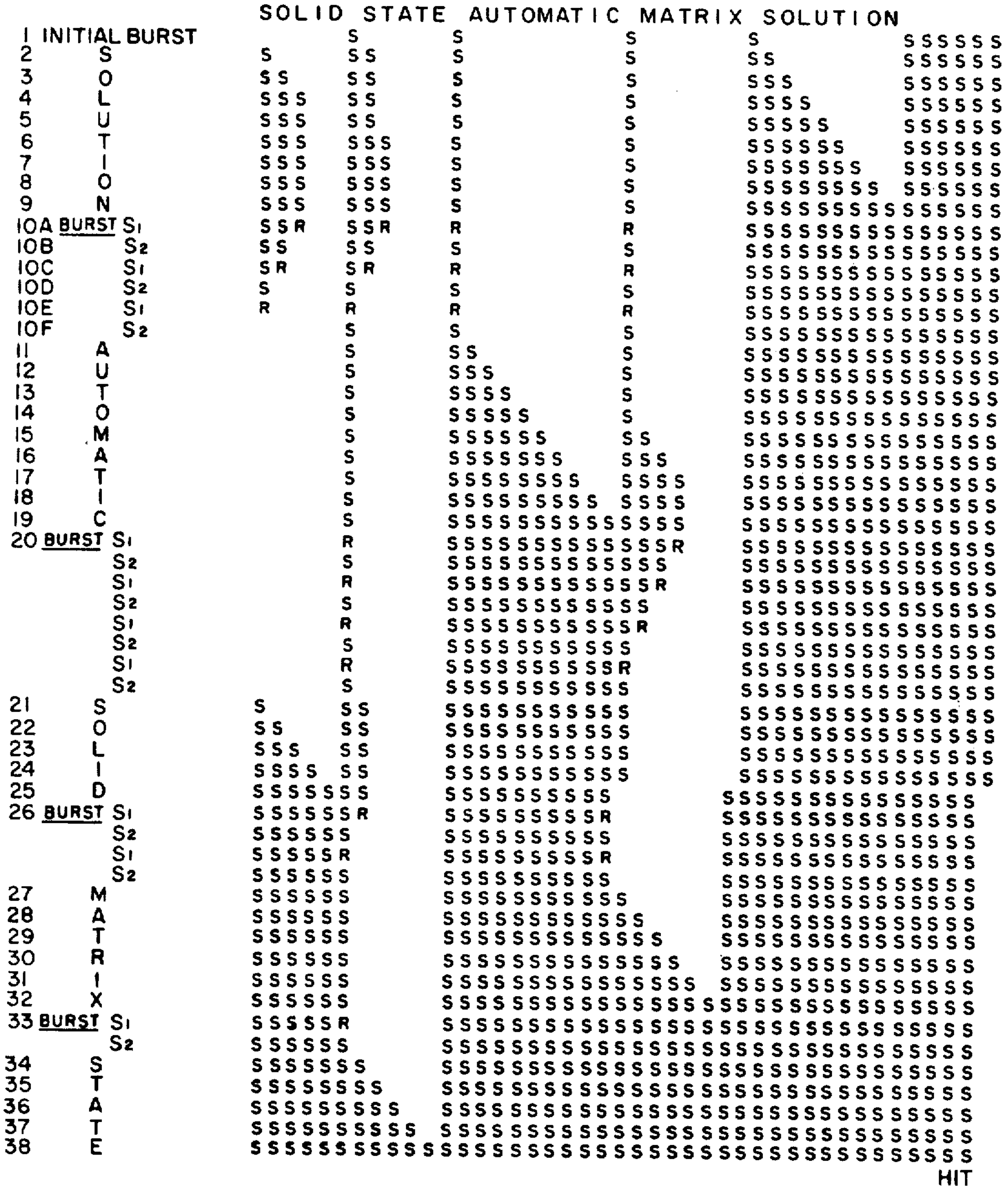

FIG. 45 is a chart illustrating a conjunctive request and the corresponding operation of the flip-flop memory chain and hit indicator which is utilized in the system of FIG. 7.

*Definitions*

Over the course of the years and during the period when the automation of information storage and retrieval was in its embryo stage, there arose the need for a specialized terminology peculiar to the information handling industry. While some of this terminology has been carried over from other branches of the computer industry, others have evolved as a result of the need to identify the peculiar problems with which personnel were confronted in the development of information storage and retrieval systems. The following definitions are helpful in describing the operation of the information storage and retrieval system to be described hereinafter:

(1) *Information file unit record.*—The information file unit record refers to the text, abstract or individual record which is stored on the storage media of the information storage unit. For example, when a magnetic tape is used as a storage media for the information file, the tape will generally comprise a great number of individual file unit records which are assigned identifying characters and stored serially on the tape. The number of individual information file unit records which may be stored on a given length of tape is limited only by the length of the abstract, document or text and the amount of information from the text material which is desired to be stored. Thus, if necessary, the text, document, abstract, etc. may be stored on the tape in its entirety.

(2) *Information storage unit.*—The information storage unit may comprise one or several information files and the necessary apparatus for handling the files. A file comprises the information storage media upon which the individual information file unit records are stored. The information record units, described above, are identified and distinguished from each other by suitable identifying characters such as accession numbers. In addition, there is generally provided other distinctive character operators, identifiers or combinations thereof which upon recognition by the system serve as instructions which result in certain machine operations.

(3) *Variable number element code.*—In a variable number element code, each character, be it an alphabetic character or a numerical character, is represented by one, two, three or more code bits. A well-known representation of the variable number element code is the Hollerith code used with a Hollerith card. A variable number element code is distinguishable from a fixed number element code, such as a two-out-of-twelve code, wherein every character is represented by two code bits.

(4) *Conjunction.*—The case where two or more words must be present within at least one individual information file unit record to satisfy the criteria for a conjunctional type request. To illustrate, if a search is conducted for those documents containing information about magnetic tape storage, the request is formulated as a conjunction—MAGNETIC *and* TAPE *and* STORAGE—to satisfy the request criteria.

(5) *Disjunction.*—The case where either one single descriptor word *or* another single descriptor word must be present within at least one individual information file unit record to satisfy the disjunctional criteria of a request. For example, a search conductor for documents containing information concerning pulse circuits or digital techniques is formulated as a disjunctional request since information about either subject satisfies the request criteria. The request would appear as: PULSE *and* CIRCUITS *or* DIGITAL *and* TECHNIQUES.

(6) *Negation.*—The case where the request criteria specifies negation of one or more descriptor words appearing within at least one individual information file unit record. An example of a search requiring negation is a request for documents containing information about electronic printers *and not* analog plotters. The request is formulated as: ELECTRONIC *and* PRINTER *and not* ANALOG *and* PLOTTERS—specifying negation of the descriptor words ANALOG and PLOTTERS to satisfy the request criteria.

(7) *Variable Suffix.*—The case where a root or a common part of a descriptor word or words appearing within at least one individual information file unit record satisfies a request. For example, if a search is conducted on the descriptor word, TRANSISTOR, the complete word must be matched to satisfy the request criteria. However, the variable suffix search capability enables a search to be conducted solely on the common part, TRANS. Thus, the request criteria is satisfied by *TRANS*ISTOR, *TRANS*IT, *TRANS*FER, *TRANS*FORMER, etc.

(8) *Partial Request Satisfaction.*—The case where, for example, *m out of n* request requirements are present within one individual file unit record where *n* equals the total request criteria and *m* equals the request criteria which would satisfy the request. Illustrative of a search requiring partial satisfaction is a request for documents containing information about one or more of the following subjects: radar, radio, infra-red and computers. Such a request is formulated RADAR *and* RADIO *and* INFRA-RED *and* COMPUTERS. A resistor network and an adjustable level detector may then be utilized to detect when a preset portion of the request is successfully matched. This adjustable level is calibrated in terms of a present portion of the request matched. Another scheme is the utilization of logical detection of complete words matched. Both of the above can be used to satisfy the *m out of n* request criteria.

(9) *Word order.*—The case where a specified group of descriptor words in a given relationship must be present within an individual information file unit record before another group of words may be examined. For example, a search specifying word position or order is a request for documents containing information concerning the use of *computers to monitor nuclear reactors.* To ensure correct word order, the request is formulated COMPUTERS (+) MONITOR (+) NUCLEAR (+) REACTORS with the unique character, which may be a plus symbol (+), inserted into the blank spaces between words. This satisfies the request criteria and at the same time avoids errors in word orders. The sequence in which two or more words must appear to satisfy the request criteria is thus established by providing between the words a unique character or symbol that can only be recognized by a corresponding symbol detector. For example, a request for John Peter Brown would appear in that exact sequence by adding a unique symbol between the words and omitting the blank spaces: JOHN+PETER+BROWN. Specifying word order may be used in the Normal or Conjunctive mode as well as in Disjunction, Negation and Dual or Multiple Search modes.

(10) *Universal match.*—It may often be desired or even required to retrieve information which falls within a certain numerical range. This is achieved in the search comparator by the use of a universal match character. For example, if the information file is to be searched for all data regarding certain events that happened between 1950 and 1959, the search request would be instrumented as 195– with the universal match character being positioned after the first three numerical characters. Thus, all information corresponding to the request which occurred between 1950 and 1959 would be retrieved.

Another use of the universal match character occurs when the particular spelling of a word or formula representations are unknown or not essential. For example, if the information file is to be searched for the name Johnson, and there is some doubt as to whether the name is spelled Johnsen, Johnson or Johnsin, etc., the search request would be formulated JOHNS–N, with the universal match character being positioned in place of the leter in doubt.

(11) *Natural language.*—When referring to the capability of the invention described herein to handle ordinary or natural language, it is meant that the machine has the capability to search a complete text, abstract, document, patent description, etc., which is stored in the information file, and is not handicapped by the fact that when the comparison process is taking place, it will be unable to distinguish blanks between words. In addition, the term natural or ordinary language refers to the capability to recognize individual words, be they numerics, or alphabetics, or combinations such as alpha numerics. Thus, it can readily be seen that the discrimination inherent in the information storage and retrieval system described herein is capable of reading an entire text which contains numerical characters, alphabetical characters or combinations of either and can include as well, formula representation.

A device as complex as the information storage and retrieval system described herein would present a formidable task to one trying to understand its functions, if the circuit schematics were the only graphical aids available. For this reason, reference is first made to block or logical diagrams, while a discussion of circuits within the blocks is reserved to a later section.

Hereinafter, in this specification, whenever reference is made to a circuit terminal, conductor or the like as being raised to a positive value, this does not necessarily mean that the point in question is at a positive or negative potential in an absolute sense, but only more positive or more negative relative to its previous state. This principle also applies to any description wherein positive or negative pulses are referred to.

Before proceeding with a detailed description of the operation of the information search and retrieval system, a general description of the system components such as shown and to be later described in more detail in block diagrams of FIGS. 6 and 7, and a brief description of the electrical circuits making up the individual blocks of the block diagrams will be undertaken.

*System components*

The information storage unit of the search comparator comprises the storage media, a tape transport and associated read amplifiers, and skew correctors. While the preferred embodiment disclosed herein utilizes a magnetic tape, it should be readily apparent that the desired information may be stored on any suitable tape, drum or other storage media and a driving mechanism associated with the particular storage media would be used. The number of stages of skew correction utilized is a function of the characteristics of the transport mechanism. In general, the tape transport unit is conventional, generally well-known in the prior art, and serves as a driving means for the information media.

Figure 1:
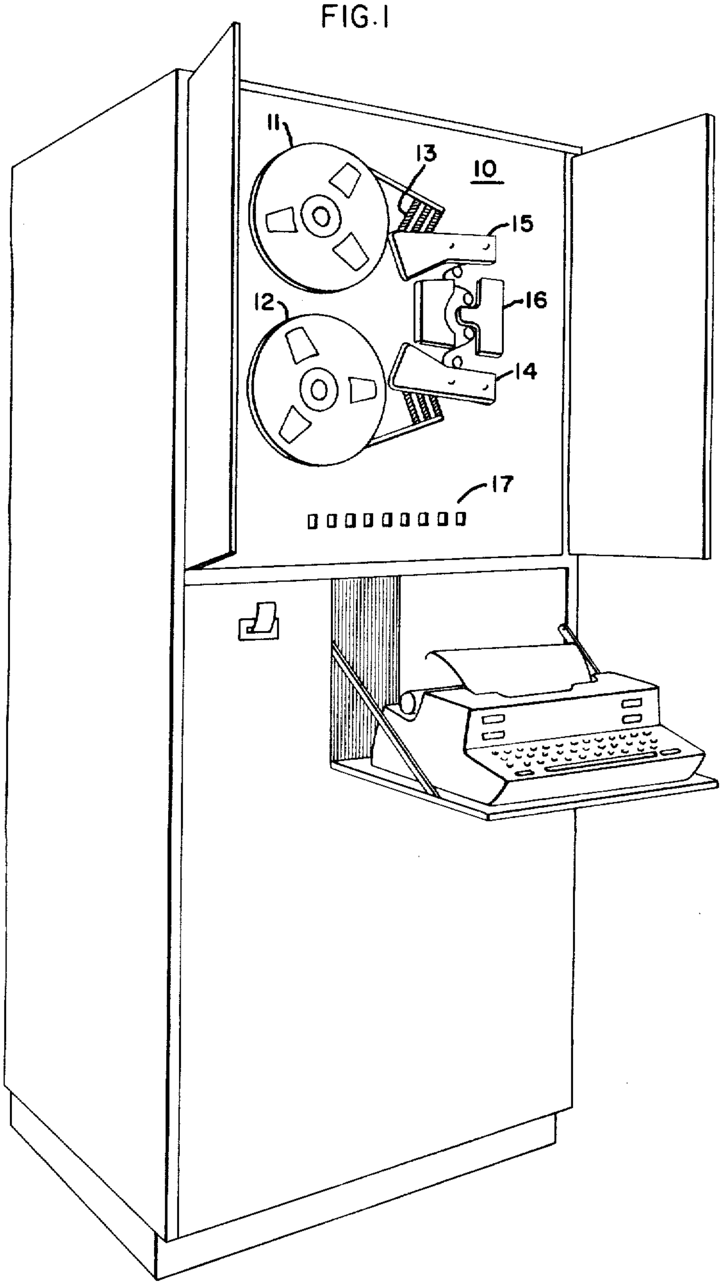
FIG. 1 is a perspective view of the search comparator encased in a suitable housing.
Figure 2:
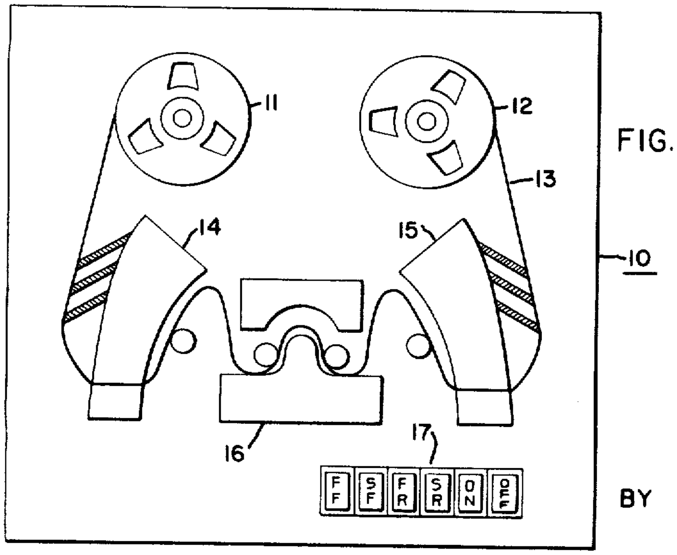
FIG. 2 is a front elevation of the tape transport apparatus.

Referring to FIGS. 1 and 2, the tape transport 10 comprises a pair of tape reels 11 and 12 and is adapted to carry the information file, which may be a magnetic tape 13. Guides 14 and 15 are provided for guiding the tape 13 as it is passed from one reel to the other. A read head 16 is provided through which the tape 13 passes and by which the information from the tape may be read. The tape transport drive controls 17 for the tape drive mechanism includes a forward control and a reverse control for driving the tape in either direction and, in addition, may include variable speed controls. It should be apparent that only a conventional tape transport having the minimum essential control elements has been described, and that any conventional tape transport apparatus may be utilized which fulfills the requirement of driving the tape in either direction, and which has the capability of reading the information from the tape.

The information file comprises the information storage media 13 which, in the preferred embodiment, includes a plurality of reels of magnetic tape. On each reel of tape, selected information file unit records are stored. The information filed unit records are stored in advance on each reel of tape so that the amount of material text, abstracts, etc., which is to be stored in the information file, is controlled only by the practical limitation of the amount of material it is desired to maintain in the information file.

Figure 3:
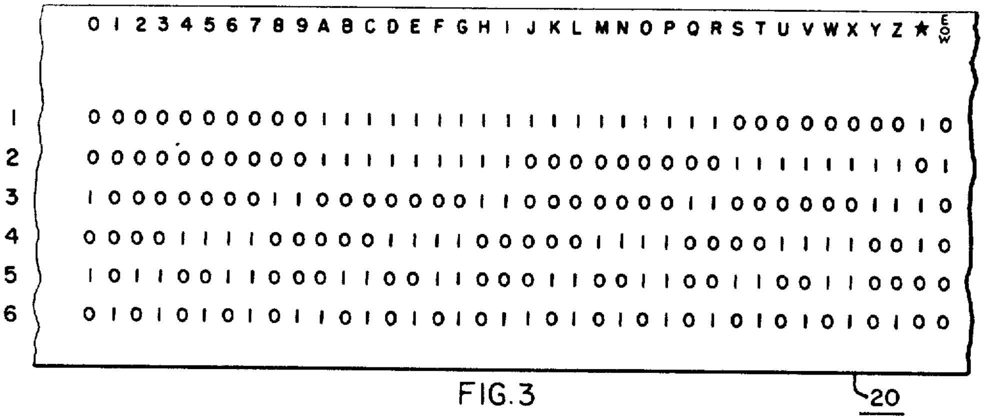
FIG. 3 is an enlarged fragmentary view of the information storage tape illustrating characters represented in a binary decimal code.
Figure 4:
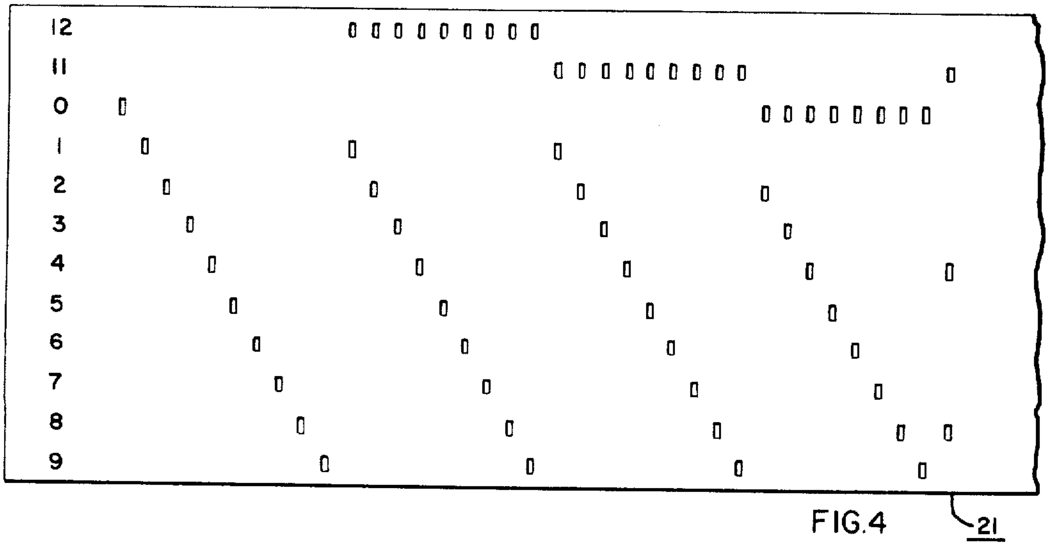
FIG. 4 is a fragmentary view of an interrogation request card showing characters represented in a variable number element code.

In one embodiment of this invention, as shown in FIG. 3, a six-channel, binary coded decimal code BCD is utilized to store the information file unit records on the tape while a variable number element code 21, as shown in FIG. 4, is used to store the information on the interrogation request card. In the binary notation, each character is represented only by two digits, i.e., 0 and 1. The decimal digit 0 is represented by the binary digit 0, while the decimal digit 1 is represented by the binary digit 1. The binary digits are in essence bits of information, and may be simply referred to as binary bits or merely bits. The digital arrangement of the binary number reading from right to left corresponds in value to $2^0$, $2^1$, $2^2$, $2^3$, etc., which is the binary equivalent of the decimal digits 1, 2, 4, 8, etc., respectively. Thus, a binary number 0111 represents the decimal digit 7, while the binary number 0011 represents the decimal digit 3. The decimal digit is determined by the addition of the decimal equivalents whose value is determined by the location in the binary number of each binary digit. Thus, by using binary bits or pulses in groups of 4, any decimal digit from 0 to 9, inclusive, may be represented in binary notation. As shown in FIG. 3, channels three through six are utilized to represent the numeric characters; however, since the information search and retrieval system of this invention is capable of handling alpha-numeric characters, i.e., both alphabetic characters and numeric characters, the remaining channels of the magnetic tape are utilized in combination with the four channels referred to above to provide representation of alphabetics and other special characters. For example, as shown in FIG. 3, A may be represented by the binary number 110001 and Z may be represented by the binary number 011001. Various other combinations of the binary bits may be used, as shown in FIG. 3, to represent the remaining alphabetic characters as well as other special characters.

As indicated in FIG. 3, the storage media for the information file may utilize a multiple channel magnetic tape, and specifically, a section of a six channel magnetic tape 20 is shown. Each character is represented by six bits of information across the tape in the binary code of FIG. 3. Several characters may form a word, and all of the words which form a complete text, abstract, etc., form the information file unit record. Several information file unit records, properly indentified, comprise the information stored on each tape reel and several reels may form the information or library file.

Magnetic storage media have found wide application in the computer industry as a means of storing digital information and it should be readily apparent any of the various forms of magnetic storage devices can be utilized as a storage media. In the preferred embodiment of this invention, the characters are stored on the magnetic tape 20 in the binary code of FIG. 3 and are represented by the presence or absence of pulses corresponding to the binary notation of 1 or 0 hereinbefore described.

The information recorded on the magnetic tape is organized in a grouping, such that, an identifying character or characters, such as an accession number, precedes the individual information unit record, and a unique character symbol such as a star (*) precedes and identifies the accession number. A mirror image of the accession number and the unique character symbol (*) is recorded at the end of the information unit record so as to enable the information stored on the tape to be processed in either direction.

Before processing of the information file is initiated, the interrogation request may be formulated on a standard Hollerith card 21, shown in FIG. 4, in a variable number element code by a listing of a selection of key words and logic instruction symbols. This listing is punched on the Hollerith card, and the interrogation request is then inserted in a card reader unit. When using a single card, the interrogation request is necessarily limited to a maximum of 80 characters; however, if desired, the request size may be expanded in multiples of 80 by using a multiple card interrogation request. This may be accomplished by additional card readers and necessary circuits which would be identical to that used in the invention described herein when a single card request is utilized, except that the additional circuits would correspond to each additional column of information added.

FIG. 5 is a representation of a single column of the data comparator which may comprise a card reader and logic matrix. The complete data comparator includes 80 columns, of the type shown in FIG. 5, appropriately interconnected. A detailed description of the interconnection and operation of the complete data comparator is reserved to a later section of the specification. Referring to FIG. 5, each column 30 comprises switches 31 through 42 each independently connected to input terminals 51 through 62, respectively. The output terminals of switches 31 through 42 are correspondingly connected to one side of asymmetric resistance devices 71 through 82, which in the preferred embodimnet are represented as diodes. The other side of diodes 71 through 82 are joined in common with an additional diode 83 forming a thirteen diode logic matrix. As will be later described in detail, the logic matrix and card reader are appropriately interconnected to form a unit in which all of the characters of the interrogation request may be simultaneously presented to each incoming character of the information storage unit with a comparison match or hit indication being translated through diode 84 to output terminal 85.

FIGS. 6 and 7 show, in block diagram form, the interconnection of the system components, and differ in the timing circuits utilized to achieve system synchronization.

Referring to FIG. 6, the processing of a request through the machine will now be considered. The first step involves the preparation of the interrogation request or input request data 90 which is used as the machine input. This request, which may be in the form of a Hollerith card, is entered into the machine by physically placing the card into the data comparator 94 comprising the card reader 91 and logic matrix 92. This will preset the logic matrix 92 in such a manner that the matrix will get a positive indication every time a character coming into the system from the information storage unit 93 is matched to a character on the Hollerith card. Once the card is placed into the card reader 91, all that remains to start the processing is to start the movable tape which contains the stored information, and to await the result of the retrieval operation.

The information storage unit 93 comprises the information file which may be stored on standard magnetic tape one character across the tape. Words are read from the tape character by character, and the signals are amplified and corrected for skew before entering the data comparator 94. From the information storage unit 93, the characters which enter the data comparator 94 are stored for one character cycle in a memory register 95 and are channeled to four locations, the path selector 96, the star (*) detector 97, the end-of-word (EOW) detector 98, and the security detector 99.

The star detector 97 is a device which will give an output when an identifying character such as an accession number identifier (*) is recognized. The end-of-word detector 98 is a similar device which will give an output when the character denoting the end of a word has been read off the tape. The security detector 99 is also a similar device and gives an output upon the recognition of the special security symbols. Enabling of the security detectors prevents access to predetermined portions of the information file. The path selector 96 comprises an array of AND gates which control whether the information from the information storage unit 93 is to be translated for comparison in the data comparator 94 or translated to the accession number buffer register 100 for storage. The star detector 97 comprises two outputs, one of which is used as a reset for the flip-flop memory chain and hit indicator 101, while the other output is used to switch the output of the memory register 95 through the path selector 96 into the output controller 102. The output controller 102 selects one of the registers of the accession number buffer register 100 to store the accession number. The output controller 102 also controls the feeding of valid accession numbers into the line printer 103.

The arrival of the "EOW" (end-of-word) character at the end of the accession number, switches the output of the memory register 95 through the path selector 96 to the tape-to-card code converter 104. The tape-to-card code converter 104 has as many input lines as there are bits making up a character on the tape code, and comprises 12 output channels, each corresponding to a row in the Hollerith card. The incoming character from the information file which is in the Binary Decimal Code is converted in the tape-to-card code converter 104 to a signal that will correspond to the variable number element code of the input request data. The 12 outputs of the tape-to-card code converter 104 are tied into the card reader 91 of the data comparator 94 and compared to the interrogation request by logic matrix 92, which consists of a 13-diode AND gate for each card column. When a card is inserted in the card reader 91, only those switch circuits corresponding to punchings in the card are closed and those diodes corresponding to the closed switch circuits are enabled. Thus, the logic matrix 92 is conditioned to respond to the particular code configuration that is punched on the interrogation request card.

The logic matrix 92 has a diode corresponding to every possible punch position on the card, which in a Hollerith card is 960, and an additional diode for each card column interconnected to a numerical discriminator circuit. These diodes which are connected to perform as AND gates corresponding with each column of the interrogation request card, are switched in or out depending on the punching on the card. The input to the logic matrix 92 comprises the 12 lines from the card reader 91, and a permissive or inhibit pulse from the numerical discriminator to be hereafter described. The 12 input lines permit each incoming character to be presented to all request characters simultaneously. An indication of whether a character has been successfully matched is translated from the data comparator 94 to the flip-flop memory chain and hit indicator 101 where it is retained.

The flip-flop memory chain and hit indicator comprises a chain of 80 positions of flip-flops with gated set and reset pulses; it is timed by inputs from the timing generator 105 which establishes the basic timing synchronization of the system. The flip-flops are interlaced so that an indication will be retained in memory only if complete request words of the interrogation request are successfully matched against file words, and the output from the timing generator 105 will reset partially matched words. This selective erase feature will prevent artificial word construction and the corresponding false hit indication.

The flip-flop memory chain is electrically interconnected to a selective hit detector whereby a hit indication will appear only when a successful comparison match has been accomplished between the interrogation request and the information file. The comparison match may be preset for a given comparison range, that is, it is possible to retrieve an accession number when a preset percentage or part of the interrogation request is matched to the information unit record of that accession number. The detection of a hit will condition the output controller 102 to close the input of the accession number buffer register 100 containing the accession number corresponding to a comparison match, and it will open that register 100 and translate its contents along with a "start print command" signal to the line printer 103. The output controller 102 receives an indication from the line printer 103 when the print cycle has been completed and reopens the register 100 input which was previously closed on the detection of a hit.

When the last character in the information file is read from the tape, the search is complete. The request card is then removed from the card reader 91 and another card inserted for a different search.

FIG. 7 illustrates an alternate embodiment of the information search and retrieval system utilizing a burst generator to achieve timing synchronization for the system. The burst generator is triggered upon the recognition of an end-of-word symbol to establish a series of S1 and S2 pulses which will reset partially matched words, that is, erase those characters which were accepted, when the succeeding character or characters of the request word were not recognized, and retain completely matched words in the flip-flop memory chain.

ELECTRICAL CIRCUIT DESCRIPTIONS

Before proceeding with a detailed description of the operation of the overall system, the various electrical circuits will be described. The various electrical circuits are illustrated in FIGS. 8 through 25 in conjunction with their block diagram representations.

*Diode gate*

Figure 8:
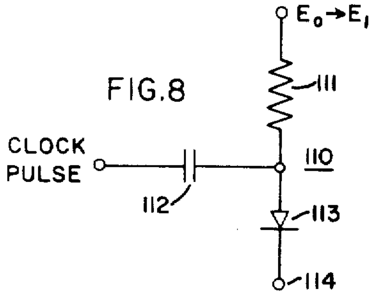
FIG. 8 is a schematic diagram of a gating circuit.

Referring to FIG. 8, a diode gate circuit 110 is shown which performs the function of gating of a pulse-type signal by means of a steady state signal or gating of a steady state signal by means of a pulse-type signal. The gating function of the diode gate circuit 110 may be interpreted in two ways: (1) the information may be considered to be in the pulse signal or (2) the information may be considered to be in the steady state signal. The interpretation given is inconsequential since the functioning of the circuit is the same. In a sense, both signals contain information, regardless of the application, and an output pulse occurs at the time when the two signals are in coincidence.

Figure 9:
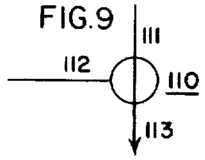
FIG. 9 is a block representation of the gating circuit of FIG. 8.

The diode gate circuit 110, shown in FIG. 8, comprises three elements; resistor 111, capacitor 112, and diode 113. A logical symbol representation of the gate circuit of FIG. 8 is shown in FIG. 9. The gate 110 may be driven by the output of a flip-flop, a one-shot multivibrator, an OR inverter or a power driver. Normally, the resistor 111 is connected to a DC potential of $E_0$ or $E_1$ representing a 0 or 1, respectively. The capacitor 112 is connected to a pulse or clock signal and the output pulse is taken off the cathode terminal 114 of the diode 113. The pulse input through the capacitor 112 normally swings between the limit of $E_0$ and $E_1$, but in the positive direction. With this form of gate, the load circuit must hold the output line to the potential of $E_1$. Then, when the input line to the resistor 111 is at $E_0$, the diode 113 will be connected in a reverse direction and a positive pulse applied to the capacitor 112 input will have no effect on the output provided the amplitude of the pulse is no greater than the difference between $E_0$ and $E_1$. If the input through the resistor 111 is at $E_1$, the positive pulse to the capacitor 112 will pass through the forward direction of the diode 113 to the output line. The current for recharging the capacitor 112 must come through the resistor 111 from the corresponding input line.

*AND gate*

Figure 10:
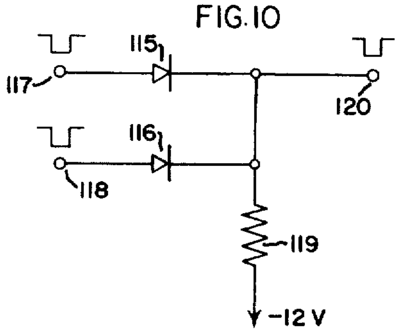
FIG. 10 is a schematic diagram of an AND circuit.
Figure 11:
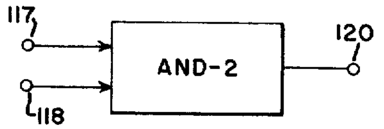
FIG. 11 is a block representation of the AND circuit of FIG. 10.

An AND gate circuit is illustrated in FIG. 10. An AND gate is an arrangement of components whereby two or more input terminals are provided, the simultaneous pulsing of all of which will cause an output pulse from a single output terminal. As shown in FIG. 10, solid-state rectifiers, 115 and 116 which may be germanium diodes, are used. The anode of diode 115 is connected directly to input terminal 117, and the anode of diode 116 is connected directly to input terminal 118. The cathodes of each of diodes 115 and 116 are tied together to the negative twelve-volt supply through resistor 119. The anodes are normally at a higher potential than the cathodes so that the diodes 115, 116 are normally conducting. When a negative pulse of a magnitude greater in the negative direction than the potential of the cathode is fed to one of the input terminals, for example terminal 117, the cathode of diode 115 becomes more positive than its anode and diode 115 ceases to conduct. When both diodes 115 and 116, which are commonly connected at their cathodes, are caused to stop conducting by feeding negative pulses to their anodes, the current flow from the negative 12-volt supply through the resistor 119 and diodes 115, 116 to ground ceases, and the potential at output terminal 120 approaches the level of the negative twelve-volt supply, thereby providing a negative output. It should be readily apparent that the AND circuit of FIG. 10 may comprise two or more diodes, and it is only necessary to stop all diodes from conducting before a negative pulse output will be obtained at the output terminal. FIG. 11 illustrates the logical block diagram representation for the two input terminal diode AND gate and is designated AND–2.

*Flip-flop*

FIG. 12 illustrates a semi-conductor multivibrator circuit. Operation of the multivibrator is conventional and represents a standard flip-flop circuit. The emitters of transistors 130 and 140 are connected to a ground terminal. The collector of transistor 130 is connected through the parallel arrangement of capacitor 131 and resistor 132 to the base of transistor 140. The collector of transistor 140 is coupled through capacitor 133 and resistor 134 to the base of transistor 130. The junction of the base of transistor 130, capacitor 133 and resistor 134 is tied to a positive 12-volt supply through resistor 135. The junction of the base of transistor 140, capacitor 131, and resistor 132 is also tied to the positive 12-volt supply through resistor 136. Output terminal 137 is connected to the collector of transistor 130, while output terminal 138 is connected to the collector of transistor 140. A set terminal 139 is connected to the junction of resistor 136 and the base of transistor 140, and a reset terminal 141 is connected to the junction of resistor 135 and the base of transistor 130.

Assuming initially that transistor 140 is conductive and transistor 130 is non-conductive, the junction then of resistance element 142 and RC element 131 and 132 is thus positive with respect to the junction of resistance element 143 and RC elements 133 and 134. A negative input at terminal 137 would tend to cause transistor 130 to start conduction, thereby tending to lower the potential at the collector terminal of transistor 130. Lowering of the potential at this point tends to decrease conduction of transistor 140 which would then tend to cause the potential at the collector of transistor 140 to rise. This change is coupled through the regenerative network of resistor 134 and capacitor 133 to the base of transistor 130. This tends to drop the potential of the base of transistor 130 causing the transistor to increase in conduction. This, in turn, further lowers the potential at the collector of transistor 130, which lowering of potential is coupled through resistor 132, and capacitor 131, to the base of transistor 140. As a result of this regenerative action, in a very short time transistor 140 is cut off and transistor 130 is conducting, thereby causing a potential at the collector of transistor 140 to become positive with respect to the potential of the collector of transistor 130 and permitting the circuit to execute the second period of the cycle. FIGS. 13*a* and 13*b* are block diagrams of the flip-flop circuit of FIG. 12, either of which may be used to conveniently represent the flip-flop circuit.

*Flip-flop with AC gate*

The flip-flop shown in FIG. 14, is essentially the same flip-flop in FIG. 12 with the addition of an AC trigger circuit which increases the versatility of the circuit.

FIG. 15 is a logical block diagram representation of the flip-flop circuit with an AC gate. When two input lines are tied together to receive a clock pulse, a complementing operation is attained in that a pulse on the common input line will cause the flip-flop to change to its opposite state. Less input power is required and higher speed is obtained if the AC trigger gate circuit is included to direct the input pulse to the proper transistor.

As shown in FIG. 14, the gating circuit for transistor 130 is comprised of diode 145, resistor 146 and capacitor 147 and is essentially the same gating circuit shown and described in connection with FIG. 8. A similar gating circuit comprising diode 148, resistor 149 and capacitor 150 is utilized for transistor 140. When one of the transistors, for example transistor 130, is in a conducting condition, the potential at the corresponding junction of these components is brought to a relatively positive value, and a positive input pulse will pass through the diode 145 to the base of transistor 130.

*One-shot multivibrator*

FIG. 16 is a schematic representation of the one-shot multivibrator circuit, and FIG. 17 is a block diagram representation thereof.

This circuit includes a flip-flop circuit identical to the flip-flop described in connection with FIG. 14 and comprises in addition, an integrator, a discriminator, and an amplifier. After the flip-flop is triggered its output is integrated. When the integrated signal reaches a predetermined level, the discriminator is triggered, and its output is differentiated, amplified and inverted, then differentiated again before being fed back to reset the flip-flop. The circuit can be connected so that it will either turn itself off or be turned off by an external signal before its reset time expires. The output of the one-shot which can be either positive or negative, has the same driving capabilities as that of the flip-flops of FIGS. 12 and 14.

Referring to FIG. 16, the circuit includes a standard flip-flop 151 plus an integrator 152, discriminator 153, and an amplifier 154 in combination. The integrator 152 has a choice of one of several capacitors **155*a*, 155*b*, 155*c*, whose value will depend on the pulse duration desired. The discriminator 153 comprises a multivibrator connected to receive the output of the integrator 152. The output of the integrator is applied at the base of the left-hand transistor 153*a* of discriminator 153, which upon changing its state results in the output from the collector of the right-hand transistor 153*b*. The output is differentiated by the RC network 156, 157 connected to the base of the lower transistor 158 which serves as an amplifier and inverter. The output of the amplifier is taken off the collector and differentiated in a gate circuit, the operation of which was previously described in connection with FIG. 8. This gate circuit comprises an RC network and diode which feeds a signal back to the base of right-hand transistor of the flip-flop 151**, thereby resetting the flip-flop.

AND-OR *inverter*

The four-input AND-OR inverter can perform either an AND function or an OR function. The function which the AND-OR inverter performs is determined by the setting of initial conditions. FIG. 18 is a schematic representation of the AND-OR inverter, and FIGS. 19 and 20 are logic diagram representations; FIG. 19 represents the AND function, and FIG. 20 represents the OR function.

For negative input pulses, the four-input diode gate performs a logical OR function, and for positive input pulses the diode gate performs a logical AND function. The output of the gas is fed into a single-stage transistor amplifier and inverter.

Each AND-OR inverter comprises four input diodes 160, 161, 162, 163 having their anode terminals connected in common. The cathode terminals of diodes 160, 161, 162 and 163 are tied to input terminals 164, 165, 166 and 167 respectively. The common anode terminals of the diodes 160, 161, 162, 163 serve as the input to the base terminal of transistor 168 through the parallel RC elements 169 and 170. The single-stage transistor amplifier 168 is of conventional design with the collector being tied to a suitable bias supply through resistor 171. The emitter of transistor 168 is tied to ground. Resistor 172 is connected from the base terminal of transistor 168 to ground, and the output of the transistor 168 is taken from the collector.

If a negative voltage is assumed to be a binary 1 and a positive voltage a binary zero, then the application of a binary 1 on any input terminal 164, 165, 166 or 167 will result in a positive voltage at the output terminal. In like manner, when a positive voltage is assumed to be a binary 1 and a negative voltage a binary 0, then all inputs must be positive, or binary 1, to obtain a negative output voltage. With the circuit properly connected in series, the function performed by each circuit may be an AND or an OR function.

To perform the AND function, the initial conditions are defined so that the input terminals 164, 165, 166, 167 connected to the input diodes 160, 161, 162, 163, respectively, are normally low, which in the preferred embodiment is minus 12 volts. Whenever a positive going signal appears at input lines 164, 165, 166, 167, that is, a signal that goes from minus 12 to zero volts, or a relatively positive level, the output of the transistor 168 will go from the original zero volts to a minus 12-volts, i.e., for a positive input to the AND gate, the result is a negative output.

To use the same circuit to perform the OR function, the static or initial conditions are set as to have a positive or high level at the input 164, 165, 166, 167 of the diodes 160, 161, 162, 163. This results in a negative level at the output of the transistor. Thus, whenever any one of the input lines is driven negative, for example, by a negative 12-volt signal, the output will rise from negative 12-volts to zero volts. The AND-OR inverter circuit is capable of driving several similar inverter circuits, several flip-flop or several gate circuits, and it should be readily apparent that the number of inputs can be varied to include more or less than the four input lines shown in FIG. 18.

*Power driver*

FIG. 21 illustrates the schematic circuit for the power driver which is used for driving the gate circuits which in turn transfer information from one flip-flop to another or reset additional flip-flops. FIG. 22 is a block diagram representation of the power driver.

Each unit comprises three transistors 176, 177, 178, which, as shown in FIG. 21, may be conventional PNP transistors, having base, emitter and collector terminals. The base terminal of transistor 176 is connected by means of coupling circuit comprising capacitor 179 and resistor 180 to input terminal 181. Resistor 182, connected between the positive twelve-volt supply and base terminal of transistor 176, and resistor 183, connected between negative twelve-volt supply and collector terminal of transistor 176, establish the bias across transistor 176. The emitter terminal of transistor 176 is connected directly to ground, while the collector terminal of transistor 176 is directly connected to the base terminal of transistor 177. The collector terminal of transistor 177 is connected to the negative twelve-volt supply through resistor 184, while the emitter terminal of transistor 177 is connected to ground through transistor 178. Input terminal 181 is connected to the base terminal of transistor 178 by means of capacitor 185 and resistor 186. The base terminal of transistor 178 is connected to the positive twelve-volt supply through resistor 187. The output signal is taken from terminal 188 which is directly connected to the junction of the emitter of transistor 177 and collector of transistor 178.

In operation, transistors 176 and 178 are normally nonconducting while transistor 177 is in its conducting state. Conduction of transistors 176, 177, and 178 is determined by biasing of the circuit and the input voltage at terminal 181. At initial conditions, output terminal 188 is maintained at a high level. The input to terminal 181, which may be a square wave from a flip-flop, is coupled across coupling circuits 179, 180, and 185, 186. The negative going input signal drives the base junctions of transistors 176 and 178 negative, thereby initiating conduction. Upon conduction of transistor 176, the voltage at collector terminal of transistor 176 goes high and is transferred to the base of transistor 177, thereby stopping conduction therein, while transistor 178 which has also been driven into its conducting state by virtue of the signal across capacitor 185 and resistor 186, causes the potential at terminal 188 to increase in a positive direction establishing a positive output.

*Indicator driver*

The output indicator driver comprises a transistorized driving circuit utilized to trigger an output indicator such as an indicator lamp, but which also may be used to drive an electro-mechanical device, such as a relay. As shown in FIG. 23, a single stage of the output indicator driver comprises transistor 190, which may be a conventional PNP transistor, having its emitter terminal directly connected to ground. Biasing is achieved by means of resistor 191 connecting the collector of transistor 190 to the positive twelve-volt supply and resistor 192 connecting the base terminal of transistor 190 to ground. An input signal is applied at input terminal 193 to the base of transistor 190 through the voltage-dropping resistor 194. The output of transistor 190, taken from the collector terminal serves to energize a load device 195, connected to output terminal 196. Although FIG. 23 illustrates the indicator driver as triggering a lamp, it should be readily apparent that any electro-mechanical device, such as a relay, which can be suitably driven by the output signal, can be inserted in place of the lamp. A block diagram representation of the driver circuit is illustrated in FIG. 24.

*Search comparator system operation—card input*

The overall system operation of the search comparator will now be described in detail with reference to the block diagram, using their designated titles, the circuits for which has been described in detail hereinbefore. Reference may be made through the description of the overall system operation to the timing chart shown in FIG. 34, which illustrates the time relationship of the various pulses which give overall system synchronization.

As hereinbefore described, the comparison process is automatically initiated upon insertion of the interrogation request card into the card reader. The card reader is an assembly containing 960 individual switches arranged in 80 columns, each column comprising 12 rows. Each switch corresponds to a unique punch position of a standard 80 column punched card such as the commonly used Hollerith card. An additional microswitch (not shown) is positioned on the card reader to be tripped by insertion of the card into the card reader. The interrogation request cards are prepared in accordance with a predetermined request in a well-known Hollerith Code, as shown in FIG. 4. In the Hollerith Code, the rows designated 12, 11 and 0 are known as zone rows. The rows designated 1 through 9 are designated as digit rows, and by a combination of punchings in the zone and digit positions various symbols may be represented. The decimal digits 0 through 9 are represented by single punches in a corresponding row of the Hollerith card. All alphabetic characters may be indicated by two punches in a single column of the card and special symbols may be indicated by three or more punchings. It should be readily apparent that any grouping of punches may be selected for representing the various characters, the particular coding arrangement being a matter of convenience.

As hereinbefore described, the information stored in the information file is coded in a binary decimal code as shown in FIG. 3. Before this information is passed into the data comparator, the information is translated through the tape-to-card code converter which converts the binary decimal coded stored information into a code which is compatible and corresponds to the variable number element code of the interrogation request for comparison in the data comparator. The tape-to-card converter utilized in this invention is conventional and any commercially available converter can be utilized it only being necessary that the BCD code, upon conversion, correspond to the variable number element code of the interrogation request shown in FIGURE 3, and the individual characters be identified as numerics or alphabetics. To this end, a pair of identification signal conductors are provided which translate the identification signals for numerics or alphabetics to the numerical discriminator for controlling the logic circuits therein in a manner to be hereinafter described. Referring to the chart below, the arrangement of punchings for the interrogation request and the coding of the magnetic tape is illustrated for invention as described herein.

| Character | Hollerith Code (punch in rows) | BCD Magnetic Tape |
|---|---|---|
| 0 | 0 | 001010 |
| 1 | 1 | 000001 |
| 2 | 2 | 000010 |
| 3 | 3 | 000011 |
| 4 | 4 | 000100 |
| 5 | 5 | 000101 |
| 6 | 6 | 000110 |
| 7 | 7 | 000111 |
| 8 | 8 | 001000 |
| 9 | 9 | 001001 |
| A | 12–1 | 110001 |
| B | 12–2 | 110010 |
| C | 12–3 | 110011 |
| D | 12–4 | 110100 |
| E | 12–5 | 110101 |
| F | 12–6 | 110110 |
| G | 12–7 | 110111 |
| H | 12–8 | 111000 |
| I | 12–9 | 111001 |
| J | 11–1 | 100001 |
| K | 11–2 | 100010 |
| L | 11–3 | 100011 |
| M | 11–4 | 100100 |
| N | 11–5 | 100101 |
| O | 11–6 | 100110 |
| P | 11–7 | 100111 |
| Q | 11–8 | 101000 |
| R | 11–9 | 101001 |
| S | 0–2 | 010010 |
| T | 0–3 | 010011 |
| U | 0–4 | 010100 |
| V | 0–5 | 010101 |
| W | 0–6 | 010110 |
| X | 0–7 | 010111 |
| Y | 0–8 | 011000 |
| Z | 0–9 | 011001 |
| + | 12 | 110000 |
| – | 11 | 100000 |
| △ | Blank | 010000 |
| / | 0–1 | 010001 |
| # | 3–8 | 001011 |
| @ | 4–8 | 001100 |
| ⌑ | 12–4–8 | 111100 |
| $ | 11–3–8 | 101011 |
| * | 11–4–8 | 101100 |
| % | 0–4–8 | 011100 |
| ( | 0–5–8 | 111100 |
| ) | 0–6–8 | 011100 |

*Data comparator*

Referring to FIG. 25, the electrical interconnection circuits of the data comparator is illustrated. The data comparator comprises a card reader and logic matrix, each formed of 80 columns of interconnected switches and diodes. A single column of the data comparator has been illustrated and described in connection with FIG. 5. All of the 80 columns are similar, both in physical arrangement and operation, and each of the similar units are identified by suffixes. For example, the 80 switch columns are identified as 260–1, 260–2, 260–3, etc., with the last switch column being identified as 260–80, while the diode columns are identified as 275–1 through 275–80. Each switch column 260–1 through 260–80 includes twelve switch elements forming 12 rows; the switch elements of the first column are identified as 261–1 through 272–1, while the corresponding elements of each succeeding column are identified by the suffix 2 through 80.

Each of the columns is identical, and for simplification, the discussion will be limited to the first column.

One end of each switch element 261–1 through 272–1 in each row is connected to the cathode end of a related diode 277–1 through 288–1 in a respective row. The other end of each switch element 261–1 through 272–1 is connected to the input terminals 291–1 through 302–1 which are connected to the output of the tape-to-card code converter and adapted to receive the information from the information file, character-by-character after each character, originally coded in a BCD form, has been converted to a variable number element code by the tape-to-card code converter. Each row of the input terminals 291–1 through 302–1 is connected in common to a corresponding row of the succeeding column. The anode terminals of diodes 277–1 through 288–1 are commonly connected to each other and to the junction of diodes 276–1 and 289–1. Load resistor 274–1 is connected to a positive bias supply and serves to bias the junction of diodes 276–1 and 289–1 and the common terminals of the anodes of diodes 277–1 through 288–1. The cathode terminal of diode 276–1 is tied to input terminal 290–1 which receives an input enabling or inhibiting signal from a numeric discriminator circuit to be later described. The cathode terminals of diodes 277–1, 278–1 279–1 are connected respectively to output terminals 304–1, 305–1, 306–1 which serve as zone signal inputs to the aforementioned numeric discriminator when one of switches 261–1, 262–1, 263–1 is closed by virtue of a zone punching in the corresponding position of an interrogation request card.

Operation of the data comparator of FIG. 25 will now be discussed in connection with the numeric discriminator, shown in FIG. 26, which includes the necessary gating circuits connected to the card reader and logic matrix that renders the data comparator capable of distinguishing alpha-numeric characters coded in variable number elements code. The numeric discriminator circuit serves to prevent a match from being registered whenever an alphabetic character from the information file unit record is being compared to a numeric character on the interrogation request.

Twelve outputs of the tape-to-card code converter represents the input from the information file unit record to the data comparator and are applied at terminals 291–1 through 302–1. The card reader is an arrangement of switch units comprising 960 contact elements arranged in 80 columns 260–1 through 260–80 of twelve rows each. The switch unit of column 1 is designated 261–1 through 272–1 and corresponds to one column of the interrogation request card. The twelve contact elements 261–1 through 272–1 of each of the eighty columns have common connecting lines electrically interconnecting each row 260–1 through 260–80 whereby each character of the information file unit record, represented by an electric pulsing of one or more of the lines 291–1 through 302–1, is simultaneously presented to every character of the interrogation request. Inserting the interrogation request into the card reader produces the effect of closing a fixed number of switches or contact elements corresponding to the number of punchings of the card, and a corresponding number of diodes 277–1 through 288–1 are enabled. An output pulse on any of the output lines of the tape-to-card code converter appears on the corresponding input lines 291–1 through 302–1 of the card reader, driving the pulsed lines high. If any of the positions in a column of the request card are punched, the pulse appearing at the input lines 291–1 through 302–1 will be transferred to the corresponding diode elements 277–1 through 288–1.

As hereinbefore mentioned, certain ambiguities may arise introducing errors into the system. For example when a numeric stored in the interrogation request is presented and compared to an alphabetic coming from the information file unit record an output hit indication may be recorded. The numeric discriminator circuit of FIGURE 26 serves to prevent the aforementioned erroneous indication.

Referring to FIGS. 25 and 26 for example, whenever an A is detected in the information file tape, zone row 12 and digit row 1, designated 291–1 and 294–1, respectively, are driven high. If a column of the interrogation request is correspondingly punched for an A character, thereby closing switches 261–1 and 264–1, a correct comparison match is indicated and the gate 275–1 opens, it only being necessary that an enable pulse from the numeric discriminator is received at terminal 290–1 to permit a hit output at terminal 303–1. If the numeric "1" is punched in the interrogation request and a character A is read from the tape, switch 264–1 would be closed, while input terminals 291–1 and 294–1 would be driven high thus giving rise to a possible ambiguity.

The provision of diode 276–1 forming a 13th leg of the character column AND gate prevents the erroneous indication in conjunction with the numeric discriminator, which provides an inhibit pulse at line 290–1 during the latter condition.

The circuit operates as follows: When the star (*) pulse is detected, a reset pulse is generated, in a manner to be later described, and appears at terminal 309–1, resetting flip-flop 310–1. The output at 311–1 of the flip-flop 310–1 causes the input line to OR gate 313–1 to go high. The signal present at the input of OR gate 313–1 is inverted and is applied to terminal 290–1 connected to the cathode terminal of diode 276–1, thus inhibiting the thirteen-legged AND gate.

After the accession number is loaded into the shift register and the first EOW character of a record is detected, zone lines 291–1, 292–1, 293–1 (12, 11 and 0) are driven negative. If the interrogation request is coded for the reception of a character which is designated by a zone punching, one of the contact elements 261–1, 262–1, 263–1 will be closed, driving one of the inputs of OR gate 307–1 negative, thus setting flip-flop 310–1 and removing the inhibit from terminal 290–1. Accordingly, if no zone is punched on the interrogation request card, the character in the given position must be a numeric, and the flip-flop 310–1 will remain reset until such time as numeric character is recognized on the information file unit record resulting in the pulsing of terminal 312–1 whereby the inhibit from the thirteen-legged AND gate is removed, thus enabling the comparison to take place and a match to be recorded.

While a possible ambiguous condition and its manner of correction has been described with reference to a comparison of a numeric character on the interrogation request and an alphabetic character from the information file, it should be readily apparent that other conditions exist where ambiguities might arise; for example, when a zero numeric character on the interrogation request is compared to an alphabetic character from the information file, where by virtue of its coding drives the zero zone line high. The possible ambiguities will exist whenever the characters of the interrogation request designated by a particular arrangement of punchings are matched by output from the tape-to-card converter appearing on the corresponding lines 291–1 through 302–1 of the card reader.

When using a code configuration having a maximum of two punchings designating any alpha-numeric character and not utilizing a zero as a numeric, the numeric discriminator circuit of FIGURE 26 is sufficient to prevent the occurrence of any ambiguities. However, when using a code configuration corresponding to a variable number element code, and it is desired to utilize a zero character as a numeric, the numeric discriminator circuit of FIGURE 26A incorporates the additional logic circuits which prevent the ambiguities for incorrect character-matching from occurring.

Referring to FIGURE 26A, switch terminals 264–1 through 270–1 and 272–1 are connected to the input legs of OR gate 308–1. The output of OR gate 308–1 is applied through OR gate 308–1A to one input leg of OR gate 308–1B. The other input leg of OR gate 308–1B is taken from switch terminal 271–1. The output of OR gate 308–1B is applied to one input leg of AND gate 308–1C. A second input to AND gate 308–1C is taken through OR gate 308–1D from terminal 306–1. Switch line terminal 271–1 is also connected to OR gate 308–1E whose output serves as one input leg of AND gate 308–1F. The second input leg of AND gate 308–1F is taken from OR gate 308–1. The output of AND gate 308–1F is applied through OR gate 308–1G to one input leg of AND gate 307–1A. The second input leg of AND gate 307–1A is taken from OR gate 307–1, and the output of AND gate 307–1A is applied through OR gate 307–1B to the set terminal of flip-flop 310–1. In addition to the end-of-word or numeric signal applied at terminal 312–1, provision is made for applying an alphabetic signal from the tape-to-card code converter.

Operation of the circuit can best be described by an example of a character comparison. Assuming the first column of the input request card to be punched for the letter Y, switch contacts 263–1 and 271–1 corresponding to the 0 and 8 punchings will be closed. If the alphabetic Y is being compared to a closed parenthesis character having the code designation 0–5–8 line terminals 293–1, 298–1, and 301–1 will be driven high. The coincidence of pulses at line terminals 293–1 and 301–1 and the closing of switch contacts 263–1 and 271–1 result in AND gate 308–1C being energized, the output of which energizes one input leg of AND gate 307–1A through OR gate 307–1. However, the other input leg of AND gate 307–1A will only be present on the energization of AND gate 308–1F. One input leg of AND gate 308–1F is energized when switch 271–1 is closed and line terminal 301–1 driven high. The other input leg of AND gate 308–1F is energized when any of the other switch terminals corresponding to the code positions of 1 through 7 and 9 are closed and one of the line terminals corresponding to code positions 1 through 7 and 9 are driven high. In the specific example, the second input leg of AND gate 308–1F is not energized and flip-flop 310–1 is not set, thereby maintaining the inhibit and preventing an output from occurring at line terminal 303–1. It should be readily apparent that although FIGURE 26A illustrates a code discriminator to eliminate ambiguities arising when the input request is coded with a 1, 2 or 3 hole punching, the circuit can be expanded to include the conditions when more than 3 punchings are used in the code for the interrogation request.

A separate numeric discriminator is independently associated with each of the eighty columns of the card reader and logic matrix. The inputs of OR gate 307–1 are connected to zone lines 291–1, 292–1 and 293–2, at line terminals 304–1, 305–1, 306–1, respectively, between asymetric resistance devices 277–1, 278–1, 279–1 and corresponding contact elements 261–1, 262–2, 263–3. The output of OR gate 307–1 is connected via conductor 308–1 to the set terminal of flip-flop 310–1. The reset input 309–1 of flip-flop 310–1 may be received from one of two locations.

One reset input of flip-flop 310–1 (see FIG. 26) occurs when the interrogation request card is inserted into the card reader. Referring to FIG. 27, the physical insertion of the card trips microswitch 200. In its normal position microswitch 200 is connected to a negative twelve-volt supply, thus maintaining the input of one-shot multivibrator 201 low. The tripping of the microswitch 200 by the insertion of the interrogation request card switches the microswitch 200 to ground, thus driving the input of one-shot multivibrator 201 high, resulting in a reset pulse being applied to the power (pulse) drivers 202, 203, 204, and 205, the output of which is taken from terminals 206, 207, 208 and 209, respectively. The second condition for generating a reset pulse occurs when a star (*) symbol from the information file record unit is detected, and is derived from the timing generator in a manner to be hereinafter described. A reset pulse appearing at line terminal 309–1 (see FIG. 26) causes the output of flip-flop 310–1 to be maintained at a high level resulting in an inhibit pulse being applied at terminal 290–1 and diode 276–1 of FIG. 25, thereby inhibiting the thirteen-legged diode AND gate.

An arrangement for generating and distributing a No Zone pulse in response to the recognition of a numeric character or an end-of-word (EOW) on the information file unit, record is shown in FIG. 28. The numeric or EOW may be translated directly to line terminal 216 to develop one output. Other outputs are taken at line terminals 217, 218 and 219 which are connected to receive the outputs of power drivers 220, 221 and 222, respectively, which in turn are energized from OR gate 223.

While the invention heretofore described shows an embodiment using a Hollerith card as a means for storing the interrogation request information, it should be readily apparent that the information search and retrieval system described herein can be readily adapted to utilize any conventional punched card or other means of interrogation request storage. For example, the interrogation request may be in the form of a direct input, such as that of typewriter. When using a typewriter input for the request information, the input may be directly coded in conventional-type typewriter encoding mechanism to a binary coded decimal code compatible to the BCD code used in the information file unit record.

*Search comparator system operation—typewriter input*

Referring to FIG. 29, a system incorporating a direct typewriter input is illustrated. A comparison of the block diagram of FIG. 29 to the block diagrams of FIGS. 6 and 7 should make it readily apparent that the systems are basically similar in operation; however, in a system utilizing a direct typewriter input the interrogation request information is presented automatically in a code compatible with, and in the preferred embodiment identical to, that of the information file unit record. Utilization of an identical code, such as a BCD code, for both the interrogation request and information file unit record obviates the need for the data comparator circuits described in connection with FIGURES 25 and 26, because the Hollerith card request storage media is replaced by electronic storage registers to be hereinafter described.

While FIGURE 29 illustrates the overall operation of the system in a block diagram format, the operation of the search comparator may be more easily described by dividing the operation into three modes of operation. These modes are: (1) the request loading mode, (2) the accession number storage mode, and (3) the comparison mode. FIGURES 29A, 29B and 29C illustrate the individual modes of operation, and include only those blocks which are in the active state in each mode, the remaining inactive blocks in dotted form being left blank to indicate an inactive state.

(1) *The request loading mode* (*FIGURE 29A*).—Referring to FIGURE 29A, the request information is presented as a direct input; for example, it may be typed from an input typewriter, encoded in a typewriter mechanism, and channeled into the input switching circuits. A hard copy print out of the information entered into the machine is provided. The input switching circuits channel the information to the clock generator, clock logic and special symbol detection circuits for the generation of the control pulses, and also to the input register and request storage registers for comparison.

The clock pulse, together with the control information from the special symbol detection and clock logic circuits, are fed into the timing generator where the required control pulses are generated. The information is fed to the request storage register and through the path selector to the input register. The information from both registers is then compared in the comparison circuits and the result of the comparison, always successful, used as an input to the flip-flop memory chain which in this mode is being used as an input counter. Input position indication is channeled from the input counter to the request storage register where it serves as a stage enabling signal and also to the input position interlock circuit controlling the field connection logic. When the end of a field is reached (20th, 40th, 60th positions), the interrogation request is interlocked (when using a typewriter, the keyboard is interlocked), and the type of field connection that is required for the given request has to be entered into the machine by the operator. At the end of the last character of the request, the input switch is placed in the tape position and the machine is ready to start processing.

(2) *Accession number storage mode* (*FIGURE 29B*).—Processing of the information through the machine is initiated by the start of the magnetic tape. Information read from the tape is fed to the clock generator and the special symbol detector for the generation of timing and control signals. In addition, the information is also channeled through the path selector. The first significant character recognized from the tape in the special symbol detection circuit is an accession number identifier (*). The recognition of this symbol generates control signals which enable an information flow path from the path selector to the shift register input gates and at the same time inhibit the comparison circuits. The shift register input gates are controlled by the input inhibit control circuit which selects the particular shift register to be loaded. This selection is dependent on the state of the output controller.

After recognition of the accession number identifier, a predetermined number of numeric symbols are read off the tape and are loaded into the shift registers. Following the accession number, and end-of-wood (EOW) symbol is detected. The recognition of this symbol generates the control signals required to set up the machine in its third mode of operation, that is, the comparison mode.

(3) *Comparison mode* (*FIG. 29C*).—The detection of the end-of-word symbol causes the path selector to switch the information channel from the shift register input gates to the comparison circuits. In the comparison circuits the information entering from the tape is compared to the request information stored in the request storage registers. It is important to note that each character read off the tape is compared to the entire request simultaneously. If a successful match is found, the indication of this match is then fed from the comparison circuits to the flip-flop memory chain. The flip-flop memory chain provides the sequential, as well as the timing discrimination required for operation of the information search and retrieval system.

Successful matches can be detected both in the normal hit indicator or in the partial request satisfaction circuit. In the former, a complete match between the file information from the tape and the stored information of the request is required. In the latter, a prespecified number of words in a given field have to be matched for a hit indication to be registered. This hit indication (either normal or partial) is channeled to the hit logic circuit where the request logic criteria are stored. If satisfaction of these criteria is determined, the hit indication is then channeled to the output controller which, through the input gates, closes the input to the appropriate shift register (containing the valid accession number) and, through the output dump control gates opens the output dump gates from that register causing a number to be printed on the output line printer.

Referring to FIG. 29, the interrogation request is established at typewriter 315 and encoded in BCD code format in a conventional typewriter encoding mechanism 316. Provision is made for simultaneously typing out a permanent hard copy of the interrogation request 317 to enable a permanent record to be maintained. The information storage unit 318 comprises the magnetic tape transport, read amplifiers and skew correctors described in connection with FIG. 6, and is identical to the information storage unit 93. Provision is made for a simulator test panel 319 which enables the operator to check the system components to insure correct operation. The outputs of the information storage unit 318, the simulator test panel 319, and the typewriter encoder mechanism 316 are fed to an input selection switch 320 for manual selection of the desired input.

The processing of the request through the information search and retrieval system of FIG. 29 is substantially similar to this described in connection with FIG. 6, with the exception that the interrogation request information is stored in request storage register 321 in anticipation of comparison in comparison circuit 322 with the information file unit record, while in the search retrieval system of FIG. 6, the interrogation request is stored in a Hollerith card and the processing of the request is initiated by inserting the card into the card reader.

Referring to FIGS. 30A and B, the six-channel BCD tape information is received at line terminals 330 through 335 while the simulator information input, that is, information from the simulator test panel (also in a BCD code), is received at line terminals 336 through 341. The interrogation request input from the typewriter encoding mechanism 316 is received in a BCD code at line terminals 342 through 347. Each of the separate six-channel information inputs is translated to a corresponding one of the six-input OR gates 350, 352, 354, for generation of separate clock pulses corresponding to the individual information inputs. The tape information is translated to OR gate 350 whose output at line terminal 351 represents the tape clock signal. The simulator information input is translated to OR gate 352 whose output at line terminal 353 represents the simulator clock signal. The interrogation request information input is translated to OR gate 354 whose output at line terminal 55 represents the typewriter clock signal.

The information input switching is accomplished by rotary multi-position switch 325 having six mechanically ganged sections **325*a* through 325*f*. Each section 325*a* through 325*f* of switch 325 includes three fixed contacts X, Y, and Z, and main movable contact K. The X contacts of sections 325*a* through 325*f*, inclusive, are respectively connected to interrogation request information input lines 342 through 347, and the Y contacts of sections 325*a* through 325*f* are respectively connected to the simulator information input lines 336 through 341. The Z terminals of sections 325*a* through 325*f* of switch 325 are respectively connected to the information file unit record input lines 330 through 335**.

A particular input may be selected by the positioning of switch 325 in either the type (X), test (Y), or tape (Z) positions. The outputs of the switch taken from movable contact K are applied to the set terminal of flip-flops **356*a* through 356*f* through OR gates 326*a* through 326*f* and AND gates 327*a* through 327*f*, respectively. An input register reset pulse developed in the timing generator is applied at line terminal 438 from the timing generator to actuate reset positions of flip-flops 356*a* through 356*f*. The set and reset outputs of flip-flops 356*a* through 356*f* are translated to an array of AND gates 359*a*, 360*a*, 361*a* through 359*f*, 360*f*, 361*f* which are controlled by enable pulses from the special symbol detection circuit appearing at line terminals 515, 516. The enable pulses control whether the information from the information file unit record input lines 330 through 335 is to be translated for comparison in the comparison circuits or translated to the accession number shift registers for storage. Each of the flip-flops 356*a* through 356*f* operates in connection with three AND gates 359*a*, 360*a*, 361*a* through 359*f*, 360*f*, 361*f* of the AND gate array which are driven by power drivers 357*a*, 358*a* through 357*f* and 358*f*. The outputs of AND gates 359*a*, 360*a* through 359*f*, 360*f* are translated through corresponding pulse drivers 362*a*, 363*a* and through 362*f*, 363*f* to the character comparison circuit through AND gates 359*g*, 360*g* through 359*l*, 360*l* and line terminals 370 through 381, respectively while the output of AND gates 361*a* through 361*f* are translated directly to the input loading stage of the shift register through line terminals 382 through 387**.

The operation corresponding to one channel of the information input line will now be discussed, it being understood that the operation of the remaining channels is similar. Assuming line 330 to be pulsed in accordance with the presence of a bit of information in the corresponding channel of the information bearing tape, the set input of flip-flop **356*a* will be driven high after AND gate 327*a* has been enabled by a tape gate signal appearing at line terminal 437. The set output of flip-flop 356*a* is translated to one input leg of AND gate 360*a* through pulse drive 358*a* while the reset output is connected to one input leg AND gates 359*a*, 361*a* through pulse driver 357*a*. The other input legs of AND gates 359*a*, 360*a* include the comparator enable pulse and signal gate pulse appearing at line terminals 515, 453, respectively, while the input legs of AND gate 361*a* include the shaft register enable pulse and signal gate pulse appearing at line terminals 516, 495, respectively. Thus, AND gates 359*a*, 360*a* are controlled by the comparator enable pulse to transfer the input information to line terminals 370, 371. Upon the presence of a shift register enable pulse at line terminal 516, the information is transferred to the input loading stage of the accession number shift registers through line terminal 382**.

Provision is made for a parity check of the stored information input. The outputs of power drivers **357*a*, 385*b* through 357*f* through 358*f* are translated directly to the parity checking circuits and compared to a parity check pulse from the stored information tape appearing at line terminal 328. When an indication is given that an error is present, a forcing pulse is translated from the parity circuit output terminal 329*a* to OR gates 359*g*, 360*g* through 359*l*, 360*l* forcing the signal, thereby resulting in an output at all terminals 370 through 381**.

The interrogation request information input from the typewriter encoding mechanism applied at terminals 342 through 347 is translated to OR gates 392 through 397, the outputs of which serve as one of the inputs for three-input AND gates 402 through 407, respectively. The second input of AND gates 402 through 407 occurs when an EOW gate pulse is applied at line terminal 442 and the third input occurs when the typewriter enable level is present thereby providing an output from each AND gate 402 through 407 to the request storage register. The outputs are translated to corresponding power drivers 412 through 417, respectively, the output of which represents the interrogation request information at line terminals 418 through 423 and which is further translated to the request storage circuits of FIGURE 31.

The interrogation request input, when utilizing a direct information input, such as the typewriter input described herein, is also translated through a second path. One path permits gating of the OR gates 392, 393, 394, 395, 396 and 397 as previously described, while the second path the request input is to the input register flip-flops **356*a* through 356*f* through the X contacts of input switch 325**. The provision of two paths for the interrogation request input allows for comparison of the request characters stored in the request storage registers to the same character stored in the input register. The result of this comparison, always successful, is then used as an input to the flip-flop memory chin (FIG. 32) which in this made is being used as an input counter.

To accomplish reverse reading, referring to FIGURE 31, the output pulses appearing at line terminals 418 through 423, and corresponding to the interrogation request input, are translated to one input leg of two-legged AND gates 572, 573, 574, 575, 576, 577. The second input to AND gates 572 through 577 is received from OR gate 578, which is driven by one of two AND gates 579, 580 which provide an enable pulse for either a reverse or forward reading condition. One input of AND gate 579 may be applied at line terminal 581 as a reverse reading condition indicator signal from the tape transport mechanism. Line terminal 582 provides a position B enable pulse from the flip-flop memory chain shown in FIGURE 32. AND gate 580 also includes two inputs, one at line terminal 583 providing a forward reading condition indicator signal from the transport mechanism and one at line terminal 584 providing a position A enable pulse. In position A enable, the loading of the request storage registers (FIG. 31) is achieved in sequence from column 1 to column 80, while in position B enable, the loading sequence is from column 80 to column 1. This is accomplished in the reverse reading mode by enabling position 80 at the same time as position 1 would be enabled for the forward mode: enabling of position 2 corresponds to enabling position 79, etc., as illustrated in the chart below.

| Position A | Position B |
|---|---|
| Position **1** | Position **80** |
| Position **2** | Position **79** |
| Position **3** | Position **78** |
| Position **79** | Position **2** |
| Position **80** | Position **1** |

Enabling is achieved in the second flip-flop stage of the flip-flop memory chain shown in FIGURE 32. The second flip-flop stage serves as a position enabling counter during the request loading mode, and the reset output of the second flip-flop stage provides an input indication for the character comparison circuit. A separate position indication line terminal is provided from the second flip-flop of each position, thus, by using a reverse or forward enable pulse from the tape transport in conjunction with the position A or position B enable, loading can be achieved from columns 1 to 80 or 80 to 1, to achieve a forward or reverse reading as desired.

Assuming that reading is being accomplished in a forward direction, the line terminal 583 is driven low, and upon the presence of a position A enable pulse (low level) at line terminal 584, the output of AND gate 580 is low. OR gate 578 inverts and translates the signal to one input leg of the two-legged AND gates 572 through 577, thus loading the request storage register in accordance with the pulsing of line terminals 418 through 423 from the interrogation request.

A discussion of the manner of operation for correcting erroneous interrogation requests is reversed to a later section in connection with a discussion of the operation of the flip-flop memory chain of FIG. 32; however, the manner of comparison of the interrogation request and the information file, and the manner of conditioning the flip-flop memory chain for correction of interrogation request errors will now be discussed.

*Comparison circuits*

Figure 30B:
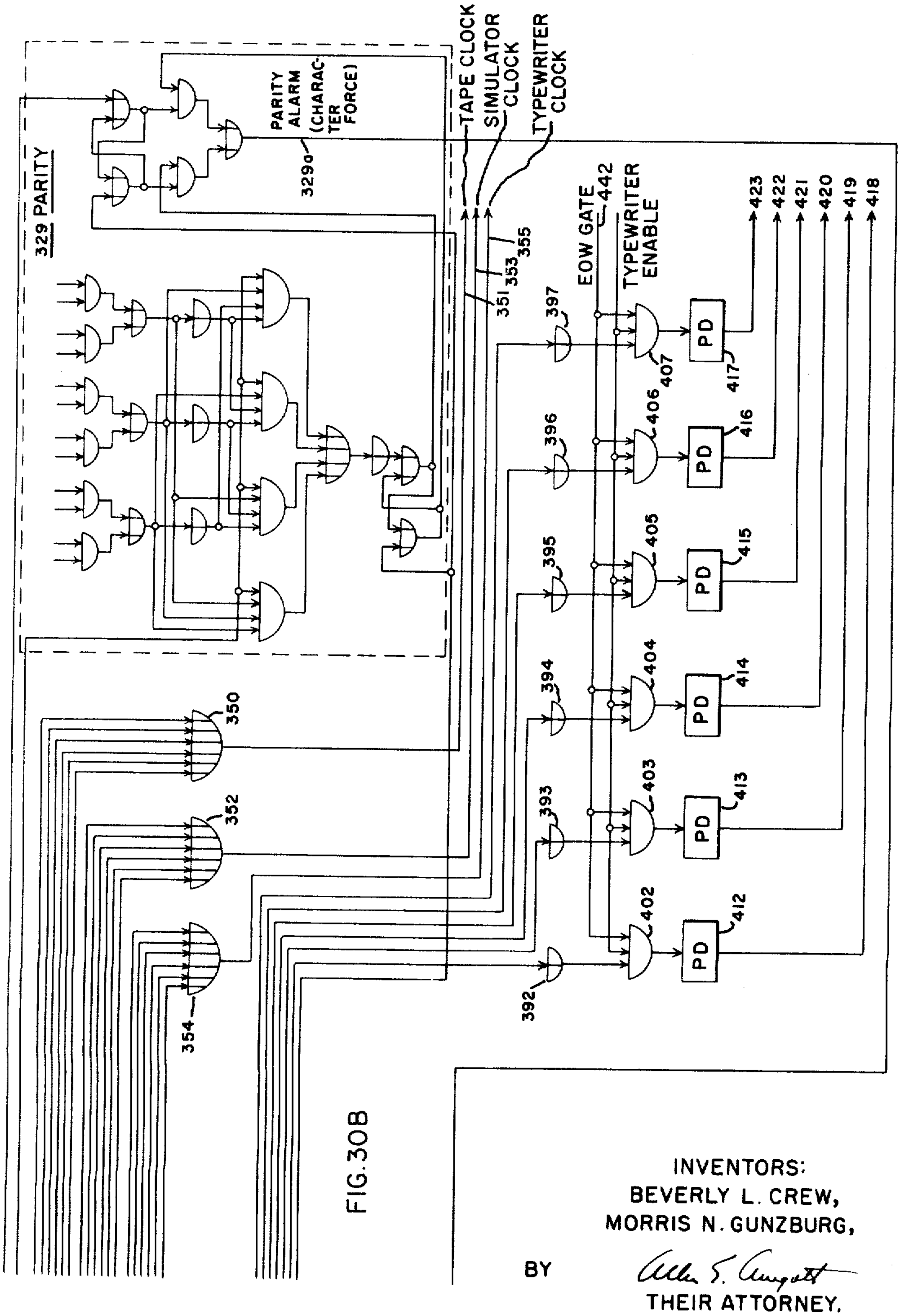

Referring to FIGS. 30 and 31, with the input switch 325 set in the X position, the interrogation request input, applied to line terminals 342 through 347, loads the flip-flop **356*a* through 356*f*. In the "type" mode, the comparator enable is always present thereby energizing line terminal 515. The information input appearing at output line terminals 370 through 381 is identical to the input at line terminals 418 through 423; that is, the same characters are stored in the request loading flip-flops 592, 593, 594, 595, 596, 597 as are received at line terminals 370 through 381. The result is a successful comparison, and an output indication or hit will be translated to the flip-flop memory chain from hit indicator AND gate 610. The set and reset outputs of flip-flops 592 through 597 are translated to AND gates 598*a* and 598*b* through 603*a* through 603*b* for comparison with the information input arriving at line terminals 370 through 381**. A comparison match at either the *a* or *b* AND gates 598 through 603 results in an output translated through OR gates 604 through 609 to hit indicator AND gate 610. The enabling pulse for AND gate 610 is the preceding state enable signal translated through line terminal 590 and OR gate 591 from the reset output of the second stage flip-flop of the flip-flop memory chain. While the character comparison circuit shown in FIG. 31 illustrates a single character comparison, it should be readily apparent that the hit indicator 610 includes 80 stages, 610-1 through 610-80, one for each position of the flip-flop memory chain. Flip-flops 592 through 597 store an indication for a blank in the reset condition. This is accomplished by switching the set and reset outputs of flip-flop 596 with respect to the five other flip-flops. When reset, flip-flops 592, 593, 594, 595 and 597 are in a zero state and flip-flop 596 is in a one state. This is required in order to obviate the need to type in blanks in the unused portions of the request.

*Timing generator*

FIGS. 33A and B illustrate the timing circuits which furnish the overall synchronization of the system; FIG. 34 illustrates the timing chart for the timing pulses used throughout the system.

The inputs to the timing generator are applied at input lines 355, 425, 426, 427, 428, 515, 516, 520, 521, 430, and 431. A clock signal from the information file record unit applied at terminal 426 drives one of the input legs of OR gate 432 negative. A positive-going synchronizing clock pulse from the interrogation request applied at line terminal 355 drives one-shot multivibrator (hereinafter referred to as one-shot) 433 which delays and inverts the signal and translates it to the second input leg of OR gate 432. The positive-going output of OR gate 432 is applied successively to one-shots 433 and 434. One output of one-shot 434 is applied to power driver 436, the output of which is translated to terminal 437 as a tape gate pulse. A second output of one-shot 434 is applied through one-shot 438 to power driver 439 which furnishes a positive-going tape reset pulse for the tape transport at terminal 456.

The second negative output of one-shot 438 is applied to one-shot 440 where it is inverted and translated to one input leg of AND gate 441. The other input leg of AND gate 441 comprises the security disable pulse at line terminal 428 (positive level for enable). The output of AND gate 441 is translated through power driver 443 which furnishes the positive-going end-of-word gate at line terminal 442.

The positive-going reset pulse appearing at line terminal 474 is initiated when AND gate 444 is fired. One input leg of AND gate 444 is enabled by the presence of a star pulse at line terminal 425. The other input leg of AND gate 444 is energized by the positive-going output of pulse driver 439 through the two microsecond delay 445. The ouput of AND gate 444 is applied successively through power drivers 446 and 447 to output terminal 474 as a positive-going reset pulse.

One output of delay 445 is further translated successively through two microsecond delays 450 and 451. The output of delay 451 is applied to one leg of AND gate 452. AND gate 452 is enabled on the presence of an EOW pulse at line terminal 427. The output of AND gate 452 is applied through OR gate 457 and through power driver 458 which develops the negative-going exact ending pulse at line terminal 459.

A second output of delay 450 is applied to one input leg of AND gate 464, the other input leg of which is enabled by the EOW pulse from line terminal 427 through OR gate 465. The negative-going output of AND gate 464 is inverted in OR gate 466 and translated through power drivers 467, 468 which establish the positive-going universal match pulse or signal at line terminal 462.

The positive-going word link pulse or signal appearing at line terminal 463 is conditioned upon the firing of three-legged AND gate 469. One input leg of AND gate 469 is tied to the EOW pulse line terminal 427. The input for the second input leg comprises one of the positive-going outputs of delay 450, while the third input is taken from the reset terminal of flip-flop 470. The output of AND gate 469 is inverted in OR gate 471 and applied successively to power drivers 472, 473 whose output is taken at line terminal 463.

The S1 pulse at line terminal 478 is present upon a positive-going output from OR gate 457 which is present upon the firing of AND gate 452. The output of OR gate 457 is translated successively through power drivers 476 and 477, thereby establishing a positive-going S1 pulse at line terminal 478.

The signal gate inhibit pulses appearing at line terminals 430 and 431 are applied to two input legs of AND gate 479. The third input of AND gate 479 is taken from delay 451 through one-shot 480. The output of AND gate 479 is applied successively through power drivers 481, 482, thereby developing a negative-going signal gate C pulse at line terminal 453. A second output of pulse driver 481 is applied to one input leg of AND gate 483, the other input of which is taken from the EOW line terminal 427. The output of AND gate 483 is applied through OR gate 484, the output of which is a positive-going pulse applied successively through power drivers 485 and 486, thereby developing a positive-going S2 pulse at line terminal 494.

A second positive output of OR gate 484 is applied to one input leg of AND gate 487, the other input leg of which is energized from the set output of flip-flop 470. The negative-going output of AND gate 487 is inverted in OR gate 488 and applied successively to pulse drivers 491, 489 to form a positive-going S4 pulse at line terminal 490.

Positive-going signal gate A at line terminal 493 is taken from the output of pulse driver 492 which is driven from the output of AND gate 495. AND gate 495 is a two-legged input, one input of which is taken from the positive-going output of one-shot 480, while the other input is the signal gate inhibit pulse appearing at line terminal 430.

The shift pulse at line terminal 435 is developed upon the firing of AND gate 496 whose output is applied to pulse driver 497. AND gate 496 is a two-legged AND gate having one input leg enabled by the shift register enable pulse appearing at line terminal 516. The other input of AND gate 496 is taken from the output of power driver 498 through OR gate 499. Power driver 498 is driven by the positive-going output pulse from power driver 439 which is translated successively through delays 445, 450, 451, 451*a* and 451*b*. The output of OR gate 499 is translated to one input leg of AND gate 470*a* the other input leg of which is the comparator enable pulse appearing at line terminal 515. The output of AND gate 470*a* is applied to the reset terminal of flip-flop 470. Flip-flop 470 is set upon the appearance of the star pulse (*). A second output of pulse driver 498 establishes the negative-going input reset pulse at line terminal 448.

The positive-going S3 pulse at line terminal 482 is established on the firing of AND gate 482*a*, the output of which is applied through OR gate 482*b* and power drivers 482*c*, 482*d* to line terminal 483. AND gate 482*a* is a four-legged AND gate, two inputs of which are formed by the security open and security close pulses appearing at line terminals 520 and 521, respectively. A third input leg is energized from the output of delay 451*a*, while the fourth input leg is energized from the reset terminal of flip-flop 449. The set input of flip-flop 449 is established by the firing of two-legged AND gate 455 which also establishes the negative-going S3 inhibit pulse at line terminal 456. Flip-flop 449 is reset upon the firing of AND gate 454 which comprises a two-legged input, one of which is established on the presence of an EOW pulse at line terminal 427 inverted in OR gate 465. The other input is taken from the output of delay 445.

*Special symbol detection*

Referring to FIGURE 35, the unique special symbol detectors are illustrated. The special symbol detectors include a series of AND gates which result in an output upon the recognition of a special coded pulsing arrangement of the BCD code corresponding to the individual symbol or character stored on the library tape and the presence of a clock pulse.

Figure 33B:
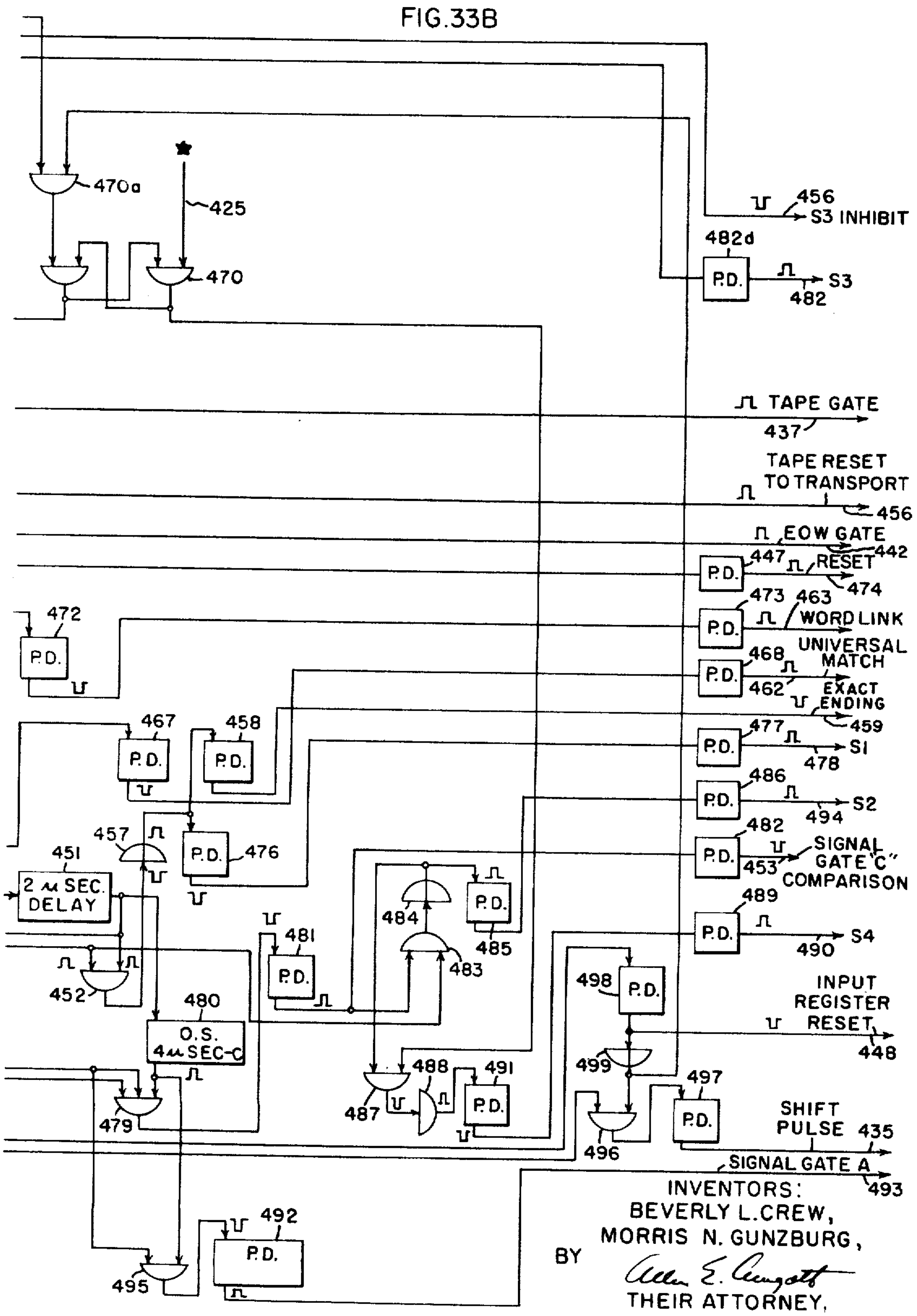

The EOW detector 500, a star detector 501, security open 502 and security close 503 AND gates are similar in operation and are energized upon the presence of pulses in a particular code configuration as illustrated in FIGURE 35 in combination with a tape or simulator clock pulse appearing respectively at line terminals 351, 353. The tape clock pulse originating at the information file unit record is applied at terminal 351 and translated through OR gates 504*a* and 504 to power driver 505 which serves to establish the clock pulse for the special symbol detectors 500, 501, 502, 503. A simulator clock pulse is made available at terminal 353 and applied as a second input through OR gate 504*b* to OR gate 504 in conjunction with test equipment associated with the search information retrieval and comparison system of this invention that enables the operator to check and determine if the system is operating correctly. The output of pulse driver 505 is also translated to the timing generator through line terminal 426 (not shown), heretofore described in connection with FIGURE 33, as a tape and simulator clock signal. The output of EOW detector 500 is applied through OR gate 507 to two-input AND gate 508. Upon the simultaneous presence of an EOW gate signal at line terminal 442, initiated in the timing generator, shown in FIGURE 33, the output of AND gate 508 develops a positive-going EOW signal at line terminal 427 through OR gate 508*a* which is translated to the timing generator. The output of star detector 501, initiated upon recognition of the specific code configuration and the presence of a clock pulse, is applied through OR gate 510 to AND gate 511. The second input of gate 511 is present on the occurrence of an EOW gate signal at line terminal 442. The output of gate 511 establishes the star pulse signal through OR gate 511*a* at line terminal 425 which is applied to the timing generator as herebefore described. The output of AND gate 508 is applied to the reset terminal of flip-flop 512; the outputs of flip-flop 512 which serve as inputs to power drivers 513, 514, thereby establishing a comparator enable pulse at line terminal 515 and a shift register enable pulse at line terminal 516.

The recognition of the special symbols in the special symbol detectors generate control signals which serve as instructions throughout the information search and retrieval system of this invention. Referring to FIGURE 35, the first significant character recognized from the information file in the special symbol detection circuit is an accession number identifier (*). The recognition of this symbol generates a shift register enable pulse at line terminal 516 which enables an information flow path to be established from the path selector to the shift register input gates, and at the same time inhibit the comparison circuits. After recognition of the accession number identifier, a predetermined number of numerical symbols which may represent the accession number are read off the tape and are loaded into the shift registers. At the end of the accession number, an end of word (EOW) symbol is detected by the EOW symbol detector 500. The recognition of this symbol generates a comparator enable pulse at line terminal 515 whereby the machine is prepared for information comparison.

Upon recognition of a star symbol (*) the output of gate 511 is driven low thereby driving the input to power driver 513 through flip-flop 512 high. The signal is then inverted and drives line terminal 515 low thereby inhibiting the comparator enable terminal 515. The output from the reset side of flip-flop 512 establishes a low input at pulse driver 514 thereby driving line terminal 516 high, establishing a shift register enable pulse. The reception of the end-of-word (EOW) symbol, reverses the outputs of flip-flop 512 establishing an inhibit at the shift register enable terminal 516 and a comparator enable pulse at line terminal 515.

Operation of the security symbol detectors 502, 503 is similar to that of the end-of-word and star symbol detectors. Recognition of the special code configuration and a clock pulse at the inputs of gate 502 establishes the security open pulse which may be designated by an open parenthesis symbol "(" at line terminal 520 while a security close pulse, developed at gate 503 may be designated by a close parenthesis symbol ")", appears when present on line terminal 521. It should be readily apparent that any unique symbol may be utilized to establish the security pulses and additional levels of security logic may be provided by providing a separate security key for each pair of security symbols or levels of logic. Normally, the low output of gate 502 is translated and inverted through OR gate 522 and applied to the inputs of AND gates 523 and 524. Other inputs to gates 523 and 524 comprise the end-of-word gate signals appearing at line terminal 442 and pulses corresponding to the direction of movement of the tape reels in a tape transport system; i.e., a forward or reverse pulse from the tape transport mechanism applied at line terminals 525 and 526. Gate 523 is adapted to be enabled by the presence of a signal pulse at line terminal 525 indicating the tape is driven in the forward direction, while gate 524 is enabled when a reverse reading of the tape is being effected.

The output of the security close gate 503 is similar in operation and the output is translated through OR gate 527 to AND gates 528 and 529. Gate 528 is enabled in the forward reading condition, and gate 529 is enabled in the reverse reading condition of the tape transport system. This is accomplished by connecting the forward reading pulses from line terminal 525 as one input of AND gate 528 and by connecting the reverse reading pulse from line terminal 526 as one input of AND gate 529. The outputs of AND gates 523, 524, 528, 529 drive flip-flop 530, whose output drives one input leg of AND gate 531. The other input leg to gate 531 is taken at line terminal 522 which may be pulsed in accordance with the position of the security key switch SK controlled by the operator. When the security key switch SK is closed, one input leg of gate 531 is tied to a negative 12-volt line thus establishing a high output at line terminal 428, and one input leg of gate 436 of the timing generator shown in FIGURE 33. This permits the clock pulse to establish the EOW gate signal at line terminal 442. Opening of the security key switch transfers control of the input to gate 531 to the security symbol detectors 502, 503.

The security key switch thus provides controlled access to the information stored in the information file unit records. The information file is originally coded so that any information which may be considered of private, proprietory or security value is enclosed with the special symbols of the security detector; for example, an open and closed parenthesis, so that the information contained within the parenthesis is subject to the control circuits. When complete access to a file is not desired, the security key switch, which is located on the control panel and manually operated by the operator, is maintained in the off position. Thus, line terminal 522 is open and the security symbol detectors control access to the information file by developing security control signals in response to the recognition of security symbols appearing at line terminals 520 and 521. The security symbols will also control the signal S3 at line terminal 483 of the timing generator, shown in FIGURE 33, which resets the middle chain of flip-flops of the flip-flop memory chain, the operation of which is discussed in connection with FIGURES 32 and 36. Access to the information which appears within the security symbols is thereby prevented.

*Logical symbol detectors*

In one embodiment of the invention which utilizes a card input, special symbols for the logical connectives are punched into the Hollerith card. When utilizing, for example, a direct input for the interrogation request having an electronic storage register for storing the interrogation request, such as a typewritten input, the special symbols for logical connectives must be separately stored and recognized. Referring to FIGURE 35, the lgoical symbol detectors 535, 536, 537, 538, are illustrated. Operation is similar to that of detectors 500, 501, 502, 503 hereinbefore described. Upon recognition of the particular code configuration corresponding to a special symbol and a clock pulse from the request information unit appearing at line terminal 355, the clock pulse is translated through OR gate 533 and power driver 534 to the special symbol detectors 535, 536, 537, 538. The output of OR gate 533 is also used to reset flip-flop 512 hereinbefore described. An output is developed at a corresponding special symbol detector, and is translated through the corresponding OR gates 539, 540, 541, 542 connected respectively to one input leg of AND gates 543, 544, 545, 546, respectively. Each of the AND gates 543 through 546 comprises three input legs. A second input is derived from line terminal 442 upon the presence of an end-of-word gate signal. The third input is developed from OR gate 547, whose output locks the typewriter input and indicates that a logical connective character must be present.

The requests are normally presented as words, numbers of alphanumeric character groups separated by one or more spaces. This permits variable word length within a request field which in one embodiment of the invention comprises a 20-character request. When two adjacent request fields are coupled in the AND mode, they become effectively one larger field. After typing in a field composed of 20 characters (and blank spaces), an indication is given that a logical connective must be selective. No additional characters will be entered until one key of the typewriter is depressed to indicate the logical connective between fields. Thus, the request words and logical field connectives are recorded on the input request. The input to OR gate 547 may be initiated from the 20th, 40th, 60th, or 80th positions (every 20 characters) of the flip-flop chain.

The presence of the output signal at OR gate 547 establishes a typewriter interlock pulse at line terminal 548 which prevents additional characters from being entered into the request. An output at any of the AND gates 543, 544, 545, 546 is translated through OR gate 549 thereby establishing a typewriter interlock reset pulse at line terminal 550 which permits the request input to be continued. When one of the AND gates 543, 544, 545, is switched, the output is applied to the corresponding one of relay drivers 551, 552, 553 to establish the hit determination logic through line terminals 554, 555, 556. If more than one level of hit logic is required, additional relay drivers and relays may be provided with the necessary activation logic. This would consist of AND gates activated by positions 20, 40, 60, and 80 of the flip-flop memory chain and the logical connective symbol detectors 535, 536, 537, and 538.

*Flip-flop memory chain*

FIGURES 32, 36 and 37 illustrate alternative embodiments of logic circuit representations of flip-flop memory chains. The three circuit representations are similar in operation. FIGURES 32 and 36 consists of three chains of flip-flops arranged in eighty positions, each position comprising three stages, appropriately gated both on the set and reset side of each flip-flop to create a state of interlaced conditioning. This is the state where only those flip-flops can be turned on whose preceding stage is in the set position, and conversely, only those flip-flops will remain on whose succeeding stage is in the set position. The upper chain of flip-flops is used for temporary storage, while the middle chain is the sequencing chain. Flip-flops in the middle chain are simultaneously set through differentiator networks with those in the upper chain; however, the middle flip-flops are reset after one character time. The lower flip-flop chain is that part of the memory which stores an indication of completely matched words. This chain is reset once a record. The operation of each position of the flip-flop memory chain is similar, and similar elements of each position are similarly identified with the addition of a numerical suffix to indicate in which of the eighty positions or columns the element is located. For example, those elements appearing in position 1 are identified as 630–1, 631–1, and so forth, while those elements appearing in position 80 are identified as 630–80, and so forth.

Referring to FIGURE 36, the output of each AND gate 610–1 through 610–80 of the comparison circuitis translated to one input leg of the setting AND gates 611–1 through 611–80. The other input of setting AND gates 611–1 through 611–80 is taken from the two-leg OR gates 612–1 through 612–80 whose inputs are the normally high side of the preceding second stage flip-flops 613–2 through 613–79, and the S2 pulse appearing at line terminal 494. It should be noted that the input of OR gate 612–1, which would normally correspond to the high side of the preceding second stage flip-flop is kept high by connecting the input leg to an additional middle stage flip-flop, which is provided preceding the first character position. This middle stage flip-flop is turned ON by the S2 pulse and OFF by the normal S3 pulse, thus conditioning the setting gate 611–1 to be swtiched upon a hit indication from AND gate 610–1 for the first character of each term read off the tape.

Reset of the upper chain is accomplished by the S–1 pulse appearing at line terminal 478. Switching of AND gates 611–1 through 611–80 sets the flip-flops 614–1 through 614–80 of the upper flip-flop chain. The set outputs of flip-flops 614–1 through 614–80 are passed through delay networks 615–1 through 615–79 to one leg of the two-leg gates 616–1 through 616–79 of the succeeding stage. The other input of gates 616–1 through 616–79 occurs on the presence of an S3 pulse at line terminal 483. The normally low side of the middle chain of flip-flops 613–2 through 613–79 is translated to one input leg of gates 617–1 through 617–79 whose other input is the S3 pulse at line terminal 483. The output of gates 617–1 through 617–79 serve to reset the middle flip-flop chain. The set output of the upper flip-flops 614–1 through 614–80 is translated to one input leg of the two leg AND gates 618–1 through 618–79 and 619–1 through 619–79. The other input to AND gates 618–1 through 618–79 is the S4 pulse at line terminal 490. The second input of AND gates 619–1 through 619–79 is the set output of the succeeding flip-flops 620–2 through 620–80 of the lower flip-flop chain. The lower chain flip-flops 620–1 through 620–80 are reset by a reset pulse at line terminal 474. All of the timing pulses used for setting and resetting the flip-flop memory chain are developed in the timing generator as herebefore described.

Operation of all the positions of the flip-flop memory chain are similar with the exception of the first and last. In the first position, the OR gate 612–1 input which would normally correspond to the low side of the second stage flip-flop is tied to an additional middle chain flip-flop preceding the first character position in a manner hereinbefore described, and in the last position, the set output of flip-flop 614–80 is translated directly to the lower chain flip-flop 620–80. The set outputs of the lower chain flip-flops 620–1, 620–2, 620–3, 620–4 establish the inputs for the four-leg AND gate 621, the output of which is inverted through OR gate 622 and passed to one leg of the four-leg input AND gate hit indicator 623. The other inputs of AND gate hit indicator 623 are derived from the outputs of flip-flops 620–5, 620–6, 620–7 of the lower flip-flop chain. The sequencing is continued until a match is indicated by an output from AND gate hit indicator 624.

The operation of the device can best be explained in terms of the step-by-step processing of a character through the flip-flop memory chain.

The first character entering the invention is the star (*) symbol which serves as the accession number identifier. The arrival of the star symbol will generate, after a short delay, an end-of-record pulse (S5), and sometime later a general reset pulse (RS). This reset pulse (RS) is used to reset the lower chain. Sometime after the RS pulse, S3 (the delayed trigger) is generated and resets the middle chain. Occurrence of the star symbol conditions the timing circuits for generation of the S4 pulse. Data following the star symbol does not effect the operation of the flip-flop chains, since it is diverted to the shift registers. The next symbol affecting the flip-flop chain is the end-of-word (EOW) character which appears on the tape immediately following the accession number. This symbol generates the S1 pulse appearing at line terminal 478 which, in turn, resets the upper chain. At the end of the S1 pulse, pulse S2 is generated. Pulse S2 sets all flip-flops in the upper chain that correspond to blank positions on the interrogation request. The set output of the upper chain flip-flops is used to set the corresponding flip-flops in the middle chain. The set output of these flip-flops is delayed by a resistor capacitor network then returned to the reset gates. By using this delay network, delay trigger pulse (S3) does not reset the stage on the first "*a*" cycle; it resets on the second cycle. This resistor capacitor network is also used to delay the set output "*b*" in order to insure that only one stage is changed each time. This pulse delay is essential to accommodate words containing double letters.

The S4 pulse occurs at the same time as the S2 pulse. Pulse S4 is the transfer pulse that sets the lower chain flip-flops corresponding to blank positions of the interrogation request and occurs only one time per record. The next character read from the tape is the first character of the first word of a given record which is presented simultaneously to all eighty stages of the flip-flop chain, whereby the sequencing of the memory chain is initiated.

Referring to FIGURE 32, the flip-flop memory chain for three positions (40, 41, 42) is illustrated as adapted for use with a direct input of the interrogation request, such as a typewriter input. The flip-flop memory chain performs two major functions in the operation of the search comparator. The flip-flop memory serves as a stage enabling counter during the request loading mode, and also as the machine memory at all other times.

Operation of the circuits of FIGURE 32 is similar to that of the flip-flop memory of FIGURE 36 and will be described in terms of the step-by-step processing of a character in one position of the flip-flop memory chain.

The first character normally read from the file tape is an accession number identifier. This special symbol (*) initiates a reset pulse appearing at line terminal 474 which is used as a reset for the lower flip-flop memory chain 636 (the third stage of each flip-flop chain). The star symbol (*) is followed by the document accession number which is stored in the accession number buffer registers. The accession number is followed by an end-of-word (EOW) symbol. This unique symbol generates the S1 pulse appearing at line terminal 478 which resets the upper chain of flip-flops 630. The S2 pulse appearing at line terminal 494 enables comparison gates 610–1 through 610–80, hereinbefore described in connection with FIG- URE 36, and the S3 pulse appearing at line terminal 483 resets the middle chain of flip-flops 631.

In addition, the first EOW symbol which appears immediately following the accession number generates the S4 pulse at line terminal 490. This pulse provides an enabling pulse for AND gate 632 through OR gate 633. An enabling pulse may also be derived by the other input of OR gate 633 from the third stage flip-flop 636 of the succeeding position. Since an output will be present from AND comparison gate 610 on all positions of the interrogation request containing spaces, and since hit indicator 610 is enabled by the S2 pulse appearing at line terminal 494, the upper chain flip-flop 630 will be set for all the request stages containing blanks. The setting of flip-flop 630 sets flip-flop 631, and since AND gate 632 is enabled by the presence of S4 pulse at line terminal 478, the third stage flip-flop 636 will also be set. The set side of flip-flop 631 is tied back through an RC integrator delay 634 to AND gate 635. The second leg of AND gate 635 is connected to line terminal 483 which receives the S3 pulse approximately two microseconds after gate 610 fires. The integrator in effect acts as a delay keeping AND gate 635 disabled when the S3 pulse occurs until the output of the set side of flip-flop 631 builds up to a sufficient value. The reset side of flip-flop 631 is coupled to OR gate 580, shown in conjunction with the character comparison circuits of FIGURE 31, to enable the hit indicator gate 610 of the succeeding stage.

Position 1 of the flip-flop memory chain differs from the standard stages in that an additional middle chain flip-flop (not shown) is provided for this stage. This flip-flop is similar to the other flip-flops of the middle chain in all except one respect. Rather than being driven to the set state by the setting of flip-flop 630, this condition is achieved by using the S2 pulse at line terminal 494 as the setting pulse.

Referring to FIGURE 32, the condition existing after the first EOW character succeeding the accession number is: for all positions in the request containing blanks, flip-flops 630, 631, and 636 are set, and all positions succeeding the blanks, that is, the first characters of each request word, are enabled. In addition, position 1 is also enabled by the additional flip-flop preceding this stage. The memory is now conditioned to accept the first character of every word. If the character read off the tape matches the character stored in a given stage, the appropriate AND gate 610 fires, setting flip-flop 630, which in turn sets flip-flop 631. The succeeding stage is enabled and the middle chain flip-flop 631 of the preceding stage is reset by the S3 pulse. This process continues until either the last character in the request word is matched or a mismatch is encountered. If a successful match is registered, the setting of the flip-flop 630 of the upper chain in the last character position causes gate 632, shown in FIGURE 32, to fire, since the second leg of gate 632 has been enabled by the setting in of the blank by the previous end of the word. Gate 632 firing sets flip-flop 636 which in turn fires gate 632 of the preceding stage, thus transferring the indication of a completely matched word into the lower chain. If the comparison fails, that is, a mismatch is encountered, S3 following the character failing to match will reset the middle chain of flip-flops and stop the comparison for the duration of the word. This cycle is repeated for every word.

A problem may arise, if while preparing the interrogation request, the operator makes an error. In the situation where a Hollerith card interrogation request input is utilized, an error is easily rectified by preparing a new interrogation request. However, in the case of a direct interrogation request input, such as a typewriter input, the electronic storage system necessitates that the error be erased electronically. Assuming a request to be in the preparation stage, and the operator has made an error after several characters have been presented, an additional gate 637 is provided in each position of the flip-flop memory chain and may be enabled by a back space key of the typewriter which initiates a back space pulse translated through line terminal 638, thereby erasing the erroneous character which has been stored.

AND gate 637 is a three-legged input gate in which one input is the output taken from the set side of the flip-flop 630 of the same stage. A second input is taken from the reset side of flip-flop 630 of the succeeding stage, and the third input is from the typewriter encoding mechanism where a backspace is coded as a unique signal representing the third input.

The output of gate 637 is applied to the reset side of flip-flop 630 of the same stage, and the reset side of flip-flop 631 of the same stage and the set side of flip-flop 631 of the preceding stage. When an error is committed in keying in the request, the erasure is instrumented by depressing the backspace key on the input typewriter. This key in addition to backspacing the character, generates an enable voltage from line 638. Gate 637 corresponding to the last character entered into the machine, i.e. the one in error, will open and its negative output will reset flip-flops 630 and 631 of the same stage. It will also set flip-flop 631 of the previous stage establishing in the counter the condition that existed before the error was committed. In addition, the output of gate 637 is fed back through line 586 to reset flip-flops 592, 593, 594, 595, 596, and 597 of the stage in error (see FIG. 31). The output of the flip-flop memory chain is sequenced through AND gates 638, 639, 640, 641 and OR gates 642, 643, 644 in the manner similar to that as shown in FIG. 36, except that provision is made for dividing the request into a plurality of fields. In the preferred embodiment, the 80 character request is divided into four 20 character fields by providing an input enable pulse to the sequencing AND gates at the 21st position, 41st position and 61st position from the field determining logic switch. Referring to FIG. 32, the sequencing AND gates 638, 639, 640, 641 are shown for a 20 character field. Enabling pulse for position 41 is applied at line terminal 645 and the output indication from position 60 is taken at the output of AND gate 641 and applied through terminal 646 to the field connection logic circuit of FIG. 40.

FIG. 37 illustrates an alternate embodiment of the flip-flop memory chain and hit indicator wherein the timing synchronization is achieved through a burst generator. The overall system block diagram using the alternate embodiment for the flip-flop memory chain and hit indicator is illustrated in FIG. 7. The flip-flop memory chain is similar in operation to the flip-flop memory chains illustrated and described heretofore in connection with FIGS. 32 and 36, and consists of a chain of 80 flip-flops appropriately gated on both the set and reset side to establish a state of interlaced conditioning. In this condition, only those flip-flops whose preceding stage is in a set position can be turned on; conversely, only those flip-flops whose succeeding stage is in the set position will remain on. The flip-flop chain operates in conjunction with a burst generator which is triggered by the EOW signal, and provides a train of alternating reset (S1) and set (S2) pulses. Each position of the flip-flop chain with the exception of the first and last positions is identical. All positions in the chain with the exception of the last position have their normally low output connected to the preceding position reset gate. (The normal condition is defined as the one where the flip-flop is in a reset condition.)

The gating of the set side of the first stage of each position of the flip-flop memory chain consists of a two-legged OR gate 650, whose inputs are the normally low side of the preceding stage flip-flop 651 and the S2 pulse appearing at line terminal 494. The output of OR gate 650 together with the output of AND gate hit indicators of the data comparator circuit form the two input legs of setting AND gate 652. The gating on the reset side of flip-flop 651, consists of an OR gate 653 whose input legs are the RS pulse at line terminal 474, and the output of the two-legged AND gate 654. The inputs to AND gate 654 consist of the S1 pulse at line terminal 478 and the normally high side of the succeeding position flip-flop 651. The outputs of flip-flop 651 of the memory chain are sequenced to a series of flip-flop indicator AND gates 655, resulting in an output when a match has been established at all positions.

As with the previously described memory chains of FIGS. 32 and 36, the operation of the alternate embodiment can best be described in terms of the step-by-step processing of a unit record in the information search and retrieval system. The first item to be read off the tape of any information file unit record is the accession number identifier (*). Referring to FIG. 7, the recognition of this character in the N detector generates a reset pulse (RS) which is brought through the reset OR gate 653 from line terminal 474 to every position of the flip-flop chain, and will reset all flip-flops. The next character read off the tape, to affect the operation of the flip-flop chain, is the EOW character. The output from the EOW detector, triggers the burst generator resulting in a stream of S1 pulses, alternating with S2 pulses, to be sent respectively to the reset gates 654 and input gates 650 through line terminals 478 and 494 respectively. Since this is the first burst after the accession number, the first S1 pulse will have no effect. The arrival of the first S2 pulse will set all flip-flops corresponding to blanks in the requests. Since the burst occurs during the EOW character, and the EOW character read off the tape is equivalent to a blank position in the interrogation request, all outputs from the data comparison circuits corresponding to blanks on the interrogation requests will be high, and those flip-flops associated with these blanks will become set. The next pulse of the train is another S1 pulse, and this time it will reset all the EOW indicators that were set with the preceding pulse.

This process will continue till the end of the burst at which time, since the S2 pulse is the last one to occur, all EOW indicators will be left in the set condition.

Immediately following the burst train, the data comparison circuits will receive the first character of the first word in the particular information file unit record being processed. Since all EOW characters are in the set position, the indicator chain is now primed to record an indication of all first characters of every request word where a match is detected. The first character of the first request word is always in a primed condition; that is, the first character of the first word will always set on a match. The character read off the tape is presented to all 80 request characters simultaneously. It will, however, only affect those positions directly primed by the setting of the stage preceding it, in this case only the first character of the request words. Any of these being set will prime the next stage. It should, however, be noted that if the first character were not set, the position corresponding to this character would remain in a primed condition, and could be set by any of the succeeding characters, and not necessarily only by those arriving sequentially.

At the end of any given word, recognized in the data comparator circuits by the arrival of the EOW character, the indications corresponding to any one of the request words may be in three possible conditions. The first is the condition when none of the indicators are set. This would be when none of the characters of the file word corresponds to the first character of the request word. The second is the possibility of having a number of the indicators of a given request word in the set condition. This is caused by a number of the request characters being matched by some of the characters of the information file record unit word. Then finally, there is the condition where a request word was completely contained in the information file unit word and an indication of a successful match is present, in the indicator chain. A closer examination of the latter condition reveals that the basic difference between it and the two former cases is that all the flip-flops corresponding to characters of this word are in the set condition; that is, all flop-flops between the two EOW positions are set.

The detection of the EOW character following the processed word will affect the three conditions described above in a different manner. In the first case where none of the characters were set, the S1 and S2 pulse train will alternately reset and set the EOW indicator at both ends of the request word. In the second case, where the word was partially matched and a number of the indicators, but not all of them are in the set position, the arrival of the first S1 pulse will reset the EOW indicator at the end of the request word, and will also reset the last character indicator that had been turned on. This occurs because of the conditioning of the reset gating. The AND gate on the reset side is primed for every stage where the succeeding stage is not in a set position; hence the resetting of the last indicator that had been turned on. The arrival of the S2 pulse will reset the EOW indicator but will not affect any of the other positions. The next S1 pulse will reset the EOW indicator in addition to the character indicator preceding the one that was reset, etc. In effect, a ratchet type reset has been instrumented for partially set words. In the final situation, where all characters of a request word are set, the only effect the burst will have is of alternately setting and resetting the EOW indicator to the end of the matched request word.

*Partial request satisfaction*

Referring to FIG. 38, the logic circuits utilized in this invention to accomplish a partial request satisfaction is shown. When all stages of the lower flip-flop chain are set, the flip-flop hit detectors, consisting of an interlaced network of AND gates will give a hit indication. In the operation of the information search retrieval system of the preferred embodiment of the invention described herein, a hit or comparison match is recorded when the entire interrogation request compared to the information of the information file unit record is satisfied.

In many situations, is is desirable to provide a hit indication when a preset part or percentage of the interrogation request is satisfied. Illustrative of the search requiring partial request satisfaction is a request for documents containing information about electrical engineers with experience in any three out of four or 75% of the described subjects of the request i.e., radio, radar, infrared, and computers. Such a request is formulated in ELECTRICAL *and* ENGINEERS *and* RADIO *and* RADAR *and* INFRA-RED *and* COMPUTERS. A resistor network in an adjustable level detector may then be utilized to detect when a preset percentage, for example, three out of four words of the request, is successfully matched. The adjustable level may be calibrated in terms of the preset fraction of the entire request matched, and upon reaching this preset fraction, a hit output indication is given.

Another scheme for accomplishing the partial request satisfaction is the utilization of logical detection of complete words matched. Referring to FIG. 38, the low level output from the lower flip-flop memory chain appearing at line terminals 647–1 through 647–20 (one field) are applied to an RC differentiating circuit as the set input of flip-flop 670. The reset input of flip-flop 670 is the S1 pulse applied at line terminal 478. The output of flip-flop 670 is translated through power driver 671 to one-shot 672 where it is given a short delay. The output of one-shot 672 drives one-shot 673, which serves to shape the pulse and apply it to the movable contact of sections 675A of switch 675.

Switch 675 consists of a two-section, six-position rotary switch which may be preset at the control panel to select the number of request terms which have to be satisfied. The movable contact sections 675B of switch 675 is connected to line terminal 646 which receives the normal hit indication from the flip-flop hit indicators (as shown in FIG. 32). It should be noted that when switch 675 is set in the 6th or completely matched position, the output of one-shot 673 is terminated at switch section 675A, while the output corresponding to a previous field hit indication is applied at terminal 646 and translated through switch 675B to OR gate 677. This setting corresponds to a complete match condition and results in an output only if the interrogation request is completely satisfied. The previous stage hit indication input to OR gate 677 is translated through OR gate 678 and to the set side of flip-flop 679, the output of which serves as one-input of AND gate 680. AND gate 680 is enabled by the presence of the reset pulse appearing at line terminal 474 and applied to the reset side of flip-flop 681. The output of AND gate 680 is translated to the hit line terminal 678 which serves as an input to the movable contact of switch 722B in FIG. 40.

When operating in the partial request satisfaction mode, switch 675 is positioned to select a hit output on a preset level of a comparison match. The adjustable level is determined by positions 1 through 6 of switch 675 which are in turn calibrated in number of terms of the request words matched. It should be noted that the logic circuit arrangement shown in FIG. 38 represents a partial request satisfaction for one field, that is, a 20-character search. Each field may be interconnected so that a partial request may be selected for one field and total satisfaction for another field.

In operation, the positioning of section 675A switch 675 translates the output of one-shot 673 to a selected one of AND gates 682, 683, 684, 685, 686, corresponding to the position of section 675A of switch 675. The output of the previous field hit at line terminal 646 is brought into switch section 675B. To permit partial satisfaction in the first field, the previous stage hit line terminal 646 is always maintained high.

The output of power driver 671 serves as one input for AND gates 687, 688, 689, 690, the first stage of a three-stage Gray code counter, AND gates 691, 692, and AND gate 693, the second and third stages of the Gray code counter.

The Gray code is well known and represents a form of cyclic code. As the number represented by the Gray code changes by one unit, only one of the bits in the Gray code will change. Referring to the chart below, the relationship of the Gray code counter and switch input are illustrated.

| No. of hit | Gray Code Counter (3 stages) | Output |
|---|---|---|
| 0 | 000 | |
| 1 | 001 | |
| 2 | 011 | 1 |
| 3 | 010 | 2 |
| 4 | 110 | 3 |
| 5 | 111 | 4 |
| 6 | 101 | 5 |
| 7 | 100 | |

The left-hand column of the above chart indicates the number of complete words matched, the center column illustrates the Gray code arrangement, and the right-hand column the output to AND gates 682, 683, 684, 685, 686. The first hit corresponds to the setting of blanks in the flip-flop memory chain and no output is taken from the counter since no word match has occurred. As the words are matched, the counter is advanced and compared to the setting of switch 675. When the count present in the Gray counter coincides with the setting of switch 675, the corresponding AND gates 682, 683, 684, 685 and 686 are switched and an output is taken through OR gate 677 and flip-flop 679. The output of flip-flop 679 is compared with the output of flip-flop 681 through AND gate 680 to determine if the previous stage hit is present and allow the comparison to go on. With the presence of a previous stage hit, AND gate 680 is enabled and an output hit is indicated at line terminal 678.

The first stage of the Gray code counter includes four AND gates 687, 688, 689, 690 whose inputs are the output of power driver 671 and the set and reset outputs of the flip-flops 699 and 702 of the succeeding stages taken through the corresponding delay networks. The outputs of AND gates 687, 688 are translated through OR gate 694 to the reset side of flip-flop 695, while the outputs of AND gates 687, 688 are translated through OR gate the set side of flip-flop 695. The reset output of flip-flop 695 serves as one input for AND gates 682, 685, 686 and is also translated through an RC delay network 697 to AND gates 691, 692 of the second stage. The set output of flip-flop 695 serves as one input for AND gates 683, 684, and is also translated through RC delay network 698 to AND gate 693 of the third stage. The third input of AND gates 691, 692 are the reset and set outputs respectively of flip-flop 699 of the third stage taken through corresponding delay networks 708 and 707 respectively. The outputs of second stage AND gates 691, 692 are applied respectively through OR gates 700, 701 to the reset and set terminals of the second stage flip-flop 702. The set output of flip-flop 702 serves as one input for AND gate 686 and is also translated through delay network 703 to the input of AND gate 687. The reset output is fed to comparison AND gates 682, 683, 684, 685 and through delay 704 to AND gate 693, the output of which is applied through OR gate 705 to the set side of third stage flip-flop 699.

A reset pulse for resetting the flip-flop of all stages may be introduced at line terminal 474 through OR gates 694, 700, 706 to reset flip-flops 695, 702, 699 respectively. The set and reset outputs of flip-flop 699 are fed back, through delay networks 707, 708, respectively, to the inputs of AND gates 692, 688, 689 and AND gates 691, 690, 687, respectively. The set output of flip-flop 699 is also connected to the input of AND gates 682, 683 while the reset output of flip-flop 699 is connected to AND gates 684, 685, 686, thereby conditioning the circuits to record a hit in response to the setting of partial request hit satisfaction switch 675. FIGURE 38A shows an alternate embodiment of the partial request satisfaction circuit whose overall theory of operation is similar to that of FIGURE 38, but replaces the Gray code counter and AND gate array with a ring counter arrangement.

*Function selector*

Part of the hit detection network is the function selector which provides the capability to perform multi-level logic operations. For the simplest case of a two-level logic circuit, this operation can be accomplished by breaking the entire field of 80 positions into two fields of 40 positions each, thus providing the capability of two searches, one in each of the fields. Field one comprises stage 1 through 40, and field two comprises stages 41 through 80. The two individual fields of search may be represented as a red hit and a black hit, the red hit denoting a match in the first 40 positions, the black hit denoting a match in the second 40 positions. The field may also be alternately identified as A and B. Thus, if more than two fields were used, subsequent fields could be identified by succeeding letters, each letter corresponding to the number of positions for each field. For example, in a 20 character field, 4 fields are possible and would be identified as field A, field B, field C and field D.

As shown in FIG. 39, the detection chain is interrupted at some arbitray point, for example, between 40 and 41 by switch 710. This results in two separate and distinct hit signals, one for stages 1 through 40 and the other for positions 41 through 80. These hit signals are brought into a function switch 711 which consists of a double-pole, 4-position rotary switch. The normal position provides a conjunctive type search and is used with the chain in; i.e., switch 710 is maintained in its left-hand position and a hit in the first 40 positions, is indicated conjunctively with a hit in the last 40 positions.

The OR position of switch 711 (Disjunction) brings the two hit signals from each of the 40 positions, which represent two separate fields, into OR gate 712. The output of OR gate 712 is translated successively through OR gates 713, 714, 715 to line terminal 716B as a black hit indication and translated to the output controller when either one of the two hit signals is present.

The not position (Negation) brings hit A from position 1 through 40 to AND gate 717. The second hit from the second field is inverted in OR gate 718, and brought to the lower input leg of AND gate 717. The third input leg of AND gate 717 consists of the end of record pulse. An output at AND gate 717 will be present and result in a hit being sent to the output controlled through OR gates 714, 715 when the end of record pulse is coincident with a hit from A and the absence of a hit from B.

The last position of the function switch provides two independent searches, the B field hit passes through OR gates 714, 715 indicating a B field hit while the A field hit is translated through OR gates 719, 720 to output terminal 716A. The two field search is similar to the OR function except that the B hit triggers a mark generator which identifies the particular accession number as being matched by the B request. The visual indication can be a special character, a red print or any other convenient identifier.

*Field connection logic*

FIG. 40 illustrates the field connection logic circuits for an alternate embodiment of the function switch utilizing a four-field input. Function relays 721, 722, 723, are energized by relay drivers 551, 552, 553, shown in FIG. 35, in correspondence to the recognition of the logical connective symbols in the special symbol detection circuit. The normal hit outputs appearing at line terminals 646A, 646B, 646C, 646D, representing a hit from one or more of the four fields, are translated to the left-hand contacts of relay contacts 722A, 723B, 723C, 723D, respectively. (When operating in a partial request satisfaction mode, the line connections between the movable contacts of relays 722B, 722C, 722D and 723B, 723C, 723D respectively, are broken. A field hit indication is then applied from the movable contacts of relay 723 to the partial request satisfaction circuits, through line terminals 646B', 646C', 646D'. The output from the partial request satisfaction circuits is returned to the movable contacts of the relay 722.) The normal hit outputs of fields B, C, and D are also translated through AND gates 724, 725, 726 to the right-hand side of relay contacts 723B, 723C, 723D. AND gates 724, 725, 726, receive a second input from the reset line terminal 474 and serve to invert the input signals of fields B, C, D, to represent a negation condition, that is not B (B), not C (C), and not D (D) when the movable contact is switched to the right-hand position.

The operation of the field connection logic can best be explained in terms of the step-by-step processing a field hit indication through the field connection logic circuits. Relays 721, 722, 723 are shown energized for a conjunctive-type request position. An input pulse appearing at line terminal 646A, indicating a hit in field A, is translated through OR gate 727 and the upper AND contacts of relay contacts 721A to the sequencing AND hit indicator of position 21 of the flip-flop memory chain. The output of the flip-flop memory chain hit indicators, indicating a hit in field B, is applied at line terminal 646B through relay contacts 723B to the AND (AB) contacts of relay contacts 721A. The AND (AB) contacts of 721A are connected to one input leg of OR gate 728, the output of which is translated through the upper AND contacts of relay contacts 721B to position 41 of the flip-flop memory hit indicators through line terminal 645C. An output indicating a hit in field C appears at line terminal 646C and is applied through the left-hand contacts of relay contacts 723C to the AND contacts (ABC) of relay contacts 721B. The AND contacts (ABC) at relay 721B serve to connect the output to one input leg of OR gate 729, the output of which is translated through the upper AND contacts (ABC) of relay contacts 721C to the flip-flop contacts (ABC) of relay contacts 721C to the flip-flop hit indicators of position 61. An output indication in field D appearing at line terminal 646D is translated through the left-hand contacts of relay contacts 723D and the (ABCD) contacts of relay contacts 721C to OR gate 730. The output of OR gate 730 is applied across a conventional integrator to one input leg of OR gate 731. The output of OR gate 731 is then translated successively through one shots 732, 733, driving line terminal 734 high, thereby resulting in an output hit indication to the output controller. In addition, the flip-flop memory chain must be conditioned in such a manner that the first and last character position of each field, when required, be identical with the first and last character of the machine as described hereinabove. This is accomplished by tying lines 590 and 636 to relay 721 as shown in FIG. 40. The reset output of flip-flop 630 is removed as an input to flip-flop 631 for the stage corresponding to the first field character and is replaced by S2 (not shown). In the preferred embodiment of the invention, field sizes are 20 characters. By the addition of relays and the additional circuit wiring described, it will be obvious to those skilled in the art that any field size can be obtained.

A disjunctive-type request can be similarly traced through the circuit. Relay driver 551 (see FIG. 35) is energized, thus switching relay contacts 721A, 721B, 721C to establish connection with the left-hand OR contacts. An input at line terminal 646A, indicating a match in field A, is translated through OR gates 735, 736, 737. With relay 721 energized for a disjunctive request, the input of field B at line terminal 646B is translated through the OR contacts of relay contacts 721A to the second input leg or OR gate 735. Thus, the left-hand input of OR gate 737 may be energized by an A or B ($A+B$) input. Similarly, a C field hit indication appearing at line terminal 646C is translated through the OR contact of relay contacts 721B to the right-hand input leg of gate 737. The third input leg of OR gate 737 is taken from the A and B (AB) contact of relay contacts 721A; however, in the disjunctive-type request, relay 721 is energized and relay contacts 721A, 721B, and 721C are switched to the left-hand position, thus breaking the (AB) contact connection. The output of OR gate 737 is translated through OR gate 738 to OR gate 729 and OR gate 730'. The output of OR gate 729, which is the conjunctive request, is applied though the upper contacts of relay contact 721C is now broken, and the output of OR gate 738 is applied through OR gate 730' together with the output indication of fields B, C and D to OR gate 731', giving an output indicative of satisfaction of an A OR B OR C OR D request to line terminal 734 as herebefore described.

In accordance with the energization of relay 721, several combinations of logical searches can be effected which satisfy the final equation, appearing, as an output at gate 730, $$[(ABC+D)+(AC+BC+D)+(AB+C+D)+(A+B+C+D)]+[(ABCD)+(ACD+BCD)+(ABD+CD)+(AB+BD+CD)]$$

Upon detection of a successful match in the normal hit detector or in the partial request satisfaction circuits, the hit indication from the logic circuits is channeled to the output controller which controls the shift register in which the accession number identifiers corresponding to the information file unit record are stored.

When utilizing a multiple search mode, relay 722 is energized upon recognition of the proper logical connective symbol and switches the hits of fields A, B, C, and D to the hit identification circuits which comprises a counter that generates a hit identification number corresponding to a successful match. The counter comprises flip-flops 740, 741, and 742. The set input of flip-flop 740 includes the output hit indications of fields A, B, and C; the set input of flip-flop 741 includes the output hit indications of field A and B; and the set input of flip-flop 742 includes the output hit indications of field B and D. The outputs of flip-flops 740, 741, 742 are selectively applied to one input leg of an array of two-legged input AND gates 743 through 751 arranged to give a hit identification number or count corresponding to each successful match of the interrogation request. Each identification number is the complement of the number to be printed by the output printer.

The hit identification circuits comprises three channels which are similar to operation and correspond to an associated register. If operation of the associated register is not inhibited, AND gates 755, 756, or 757 receive an enable pulse from the corresponding line-terminals 758, 759, or 760. An output hit indication from one-shot 732 is applied to the second input leg of AND gates 755, 756 and 757 resulting in an output from the enabled AND gates 755, 756, or 757 applied to OR gates 752, 753, 754, respectively. The output of OR gate 752 is translated to the second input leg of A register AND gates 743, 744, 745, the output of OR gate 753 is translated to the second input leg of B register AND gates 746, 747, 748 and the output of OR gate 754 is translated to the second input leg of the C register AND gates 749, 750, 751.

In operation, if a particular shift register is not inhibited, for example the A register, an output hit indication from one-shot 732 causes gates 743, 744 and 745 to be enabled by virtue of the output pulses taken from OR gates 752. An output from flip-flop 740, 741, 742 corresponding to successful matches in fields A, B, C, D is switched through AND gates 743, 744 and 745 to set up the hit identification numbers for each of the individual fields. The output is applied to the A register through line terminals 761, 762 and 763 corresponding to the A register.

*Shift register*

Multiple register buffering is used in this invention to provide the capability to store any document accession numbers which may occur during the printing time for a preceding hit. The circuit configuration for the output controller when using three registers is shown in FIG. 41. It should be readily apparent, however, that more or less than three registers can be utilized. The operating principle would be the same for all register configurations, the addition of each additional register permitting the retention of an additional hit indication for printout, and the removal of each additional register reducing the storage capabilities of the machine.

Referring to FIGS. 41A and B, operation of the circuit is such that all flip-flops 800, 801, 802 of the output controller are in the reset condition by virtue of the reset signal appearing at line terminal 803 and translated through OR gates 804, 805, 806, respectively. When using a punched card input, the reset pulse is developed by tripping the micro-switch 200 upon insertion of the punched card in the card reader as shown and herebefore described in connection with FIG. 27. When using a direct input, such as a typewriter input, the micro-switch is replaced by a conventional push-button switch (not shown) located on the control panel and is manually operated. The set outputs of flip-flops 801, 802 are fed back through conventional RC delay networks 807, 808 to two input legs of AND gate 809. The third input leg of AND gate 809 consists of the output hit indication arriving at line terminal 734 from the field connection logic circuits.

Assuming at initial conditions that no hits or successful matches have been recorded, the first hit pulse appearing at line terminal 734 switches AND gate 809 and is translated through OR gate 810 to fire flip-flop 800 by applying the output of gate 810 to the set terminal of flip-flop 800. The setting of flip-flop 800 results in a pulse applied through AND gate 811 and OR gate 812 to the set terminal of flip-flop 813. The reset output of flip-flop 800 is translated through pulse driver 814 and inhibits the A register input, while the set output of flip-flop 813 is applied through pulse driver 815 to initiate an A register dump signal; i.e., opens the output of the A register to the printer, at line terminal 816.

Each of the A, B, and C registers have their own controlling chains of flip-flops which operate in a similar fashion. Flip-flops 800, 813 are associated with the A register; flip-flops 801, 817 are associated with the B register; flip-flops 802, 818 are associated with the C register. Each pair of flip-flops will remain in the set condition until an end-of-print (EOP) signal is received from the printer. The first EOP signal arriving at line terminal 819 fires one-shot 820 the output of which is applied to one-shot 821. Both EOP outputs are high; however, the EOP output from one-shot 821 is delayed a few microseconds to permit the flip-flops of each register to operate sequentially to take care of the situation where more than one hit is being recorded during a single print cycle.

Assuming the printing operation is incomplete and a second hit is recorded, the second hit will be stored in the B register flip-flop 801 since A register flip-flop 800 remains set until the delayed EOP signal is received. The second hit, stored in flip-flop 801, will not be passed to flip-flop 817 until the printing is complete. The EOP signal from one-shot 820 sets flip-flop 817 through AND gate 822 and OR gate 823 if flip-flop 801 has been set by the reception of a second hit. A short time later, the delayed EOP signal from one-shot 821 resets flip-flop 813 which in turn resets flip-flop 800. The reset output of flip-flop 801 establishes the B register input inhibit pulse through power driver 824 and also opens the output of register B to the printer through power driver 825 and B register dump line terminal 826. The C register flip-flops 802, 818 operate in a similar fashion to establish a C register input inhibit signal through power driver 834, and also a C register dump signal through power driver 835, the output of which appears at line terminal 836.

The flip-flops are operated in sequence, and with no hits stored, the first hit will be stored in A register flip-flops 800, 813. The provision of two additional registers i.e., the B and C registers allows storing of two additional hits or successful comparisons while printing out the accession number corresponding to the first hit, and each register will be "dumped" or read out individually and in sequence.

Upon the presence of more hits than there are registers for storing the hits while a printout is taking place, i.e., before the arrival of an EOP signal, a visual indicator is actuated to signal the operator that machine overload conditions exist. When all flip-flops 800, 801, 802 have been set, AND gate 837 is fired thus setting alarm flip-flop 838 which drives an indicator light 839 located on the control panel. This overload indicator light 839 remains ON during the remainder of the search. A count may be maintained of the number of hits (accession numbers) which are not printed out due to overload conditions. To retrieve the missed accession number, a second comparison run is made either by searching the tape in reverse or by searching a back-up (spare) tape which is ordered by a different scheme. The overload condition interlocks the tape transport mechanism so that, before another search can be made, it is necessary to manually operate a reset switch on the control panel which provides a reset pulse at line terminal 840 applied to the reset side of flip-flop 838, thereby inactivating the overload indicator 839.

Figure 41B:
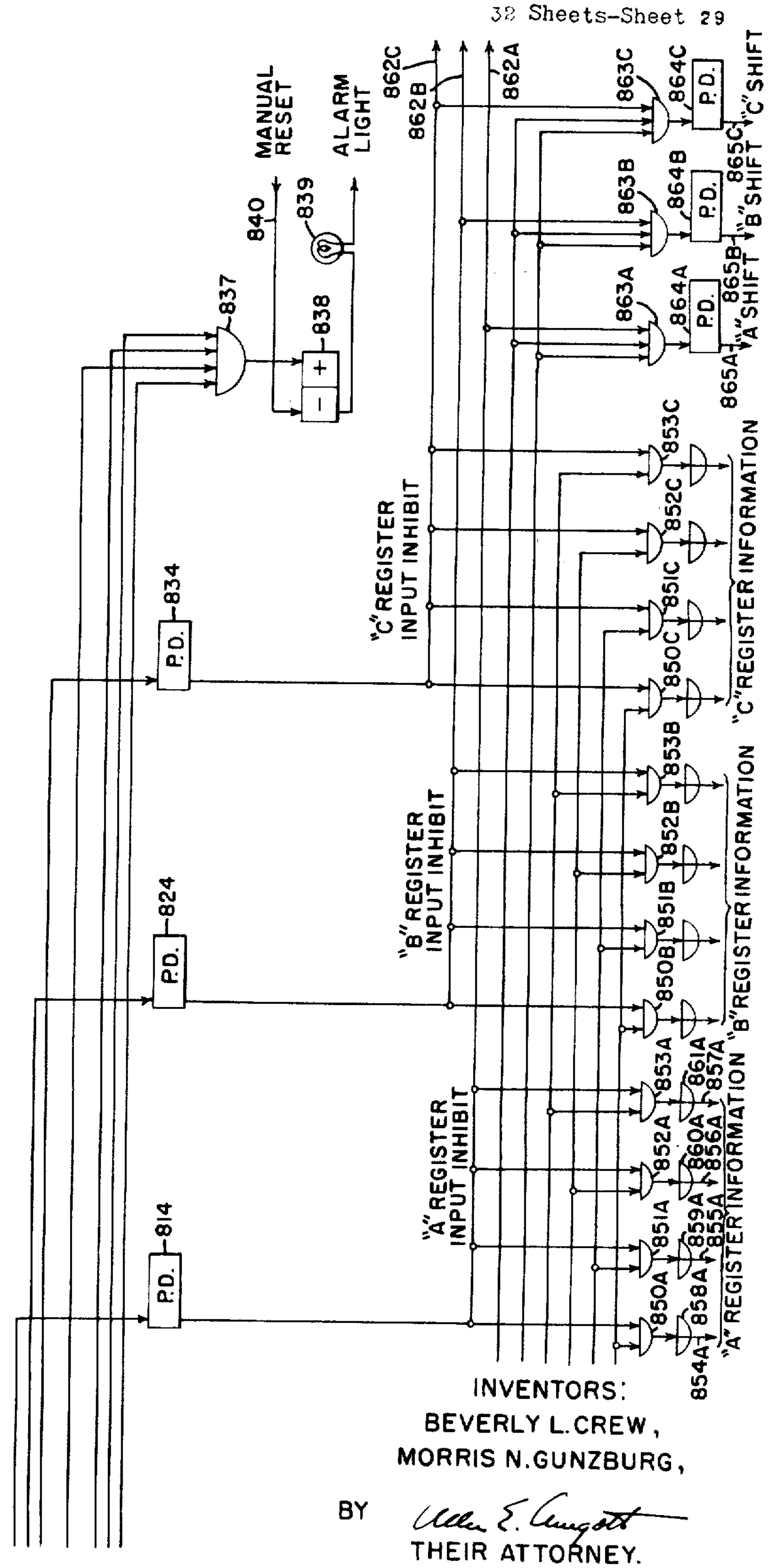

The control signals for retrieving the accession numbers or information identifiers are developed in the shift register input circuits shown in FIG. 41B. Each register has associated therewith separate input circuits; however, since the operation of the individual circuits associated with the A, B, and C registers are identical, only the A register will be described.

An enable pulse from power driver 814 of the output controller is translated to one input leg of AND gates 850A, 851A, 852A, 583A. The other input leg includes the information input from the path selector to the shift register appearing at line terminals 382, 383, 384, 385. In the preferred embodiment of this invention, the identifying characters consist of a numerical sequence, and consequently only a four-bit information input is required. However, it should be readily apparent that if an alpha-numeric listing is utilized for the accession numbers, it is only necessary to expand the four-bit input to a six-bit input by adding two additional input stages identical to the stages utilized for four-bit information input. The accession number information switched through AND gates 850A, 851A, 852A, 853A, is translated to line terminals 854A, 855A, 856A, 857A through corresponding OR gates 858A, 859A, 860A, 861A.

The outputs of power drivers 814, 824, 834 are translated through line terminals 862A, 862B, 862C, respectively, to enable the corresponding hit identification register and permit identification of the hits recorded.

The outputs of power drivers 814, 824, 834 are also translated to one input leg of AND gates 863A, 863B, 863C, respectively, to develop a shift pulse for the corresponding buffer registers. The other inputs to AND gates 863A, 863B, 863C include the timing shift pulse appearing at line terminal 435, and the shift register enable pulse appearing at line terminal 516. The outputs of AND gates 863A, 863B, 863C are applied to the shift register through corresponding power drivers 864A, 864B, 864C, whose outputs in turn appear at line terminals 865A, 865B, 865C.

Referring to FIG. 42, the accession number buffer register for one stage or one-bit information input is shown. In the preferred embodiment of this invention, a four-bit information input is utilized and it should be readily apparent that four such stages would constitute a complete register. For a six-bit input, six stages would be necessary. FIG. 43 illustrates a block diagram of the A register for a four-bit information input.

The accession number information input appearing at line terminal 854A is stored in a series of AC gated flip-flops 870 through 876A, which are shifted by a shift pulse appearing at line terminal 865A. The set output of each flip-flop is tied to the reset input of each succeeding flip-flop for sequentially storing the information input. The outputs of the shift register flip-flops 871A through 876A are applied to one input leg of corresponding AND gates 877A through 882A whose other input leg receives the "Dump" signal from line terminal 816. Upon enabling of AND gates 877A through 882A, the accession number information is translated through OR gates 883A through 888A to the output printer for print out.

The other information to the printer includes the output of the hit identification register. The three-bit identification information appearing at line terminals 761, 762, 763, is applied to the set input of flip-flops 891, 892, 893. The reset input is taken from AND gate 894 which is energized upon the presence of a reset pulse at line terminal 474 and a register inhibit pulse at line terminal 862A. The set outputs of flip-flops 891, 892, 893, serve as one input to AND gates 894, 895, 896, respectively. The other input to AND gates 894, 895, 896 is the "dump" signal appearing at line terminal 816 which enables the AND gates 894, 895, 896 which translate the information to the output printer through OR gates 897, 898, 899.

*Line Printer*

The line printer may be of standard design, such as the Model 1961 Scanning Printer commercially available from Clary Corporation. It need only be required to print electronically-controlled data from binary-coded decimal sources. The printer operates directly from the voltage output (logical levels) of the shift registers and directly prints out the accession numbers on command. In its basic operation the line printer utilizes a parallel entry mechanism which has been integrated with an electronic decoding matrix and appropriate controls to convert binary-coded decimal data into decimal printing on paper tape. The mechanical operation of printing consists of positioning print wheels by means of moving racks which are stopped or digitized at positions corresponding to the desired digits. The digitizing of each rack is accomplished by energizing a solenoid operated rack stop from a thyratron as the rack moves through the digits from "zero" to "nine." The firing of the individual thyratrons is timed by either one of two mechanical commutators which fires each thyratron when the digit position of its associated rack correspond to the input information.

With the initiation of a print cycle, a mechanical clutch is energized which places the printing mechanism in motion. All racks start from "zero" position and move through the digits to the "nine" position. In printing the digit "zero," the thyratron is fired immediately, thus retaining the rack in the home position. Successive digits will permit the racks to travel a greater distance in the absence of the entry of a specific digit, a "nine" will be printed, corresponding to the maximum travel of the rack. With the completion of the travel of all racks, the racks and print wheels are latched in position and mechanical printing occurs simultaneously for all digits. The printing motion is controlled by cams in a machine which cause the print wheels to impact against the print ribbon, thus printing on the paper tape. After the printing impact, the print wheels return to mesh and all racks are returned to the "zero" position, thus completing the print cycle.

*Tape simulator*

Referring to FIG. 44 a tape simulator and print command simulator are illustrated by which the information search and retrieval system may be tested for correct operation. Single-pole, double-throw switches 901 through 906 are individually set for selection of any desired pulse configuration corresponding to a BCD code. The upper contacts of the switches are connected to a negative twelve-volt line and represent a low input, while the lower contacts connect to ground representing a high input. The movable contacts of the switches are tied to one of the input legs of AND gates 907 through 912. The second input leg of AND gates 907 through 912 comprises a tape or typewriter inhibit pulse appearing at line terminal 913 indicating that the information file or the interrogation requests is not in operation. The third input leg is connected to an external pulse generator whose output is applied at line terminal 914. The external pulse signal is applied through one-shot 915 and power driver 916. The outputs of AND gates 907 through 912 are switched in accordance with the arrangement of switches 901 through 906 and the coincidence of pulses at the other input legs to develop the tape simulator input signals at line terminals 330 through 335 connected to the input switching circuits described in connection with FIG. 30. An alternate means of driving one-shot 915 is provided by switch 917 which furnishes a high or low input for one-shot 915 as desired. The output of one shot 915 translated through power driver 916 can alternately be used to establish a simulated print command signal applied to the printer through line terminal 919.

*Search request examples*

An example of a conjunctive request is illustrated in FIG. 45. The request is made up of five terms, SOLID STATE AUTOMATIC MATRIX SOLUTION, and all five terms have to be present in a particular information file unit record for a hit to be registered. After the comparison of the information requests to the information unit record is initiated, and after the accession number is stored in the buffer register, the recognition of the end-of-word character following the accession number results in an initial burst of pulses from the burst generator which sets all blanks corresponding to the information request. The setting of blanks is indicated in FIG. 45 line 1 by the letter S in the corresponding column. Once the blanks have been set, the machine is conditioned to accept the first character of each of the request words. Since S is the first character of three of the request words, the recognition of the letter S will set the indicators associated with the first character of these words, that is, the words: SOLID, STATE, and SOLUTION. These characters being set, conditions the flip-flop chain to accept the second letter of these three words if a correct character match is encountered. It should be noted that the first character of the words AUTOMATIC and MATRIX remain in a primed state, that is, so that if either an A or a M were to be recognized, they would become set. The second character recognized on the tape is the letter O. This will set the indicator associated with this letter in the correct position (first or second character of the request words). In this case, the second character of the words SOLID and SOLUTION will become set as shown in FIG. 45, line 3. Similarly, the next L will set the third character of these words. The next character from the tape is the letter U. This sets the indicator on the fourth character of the word SOLUTION, and tends to set the indicator associated with the letter U in the word AUTOMATIC. However, since the first character of this word A is not set, the U will also not be set. The next character is the letter T. This sets the fifth character of the word SOLUTION; and also sets the second character of the word STATE, since the first character of this word was set when the letter A as shown in FIG. 45, line 2 was read off the tape. The process continues until the end-of-word character is recognized.

At this time, the burst generator is gated, and a stream of S–1 and S–2 pulses is initiated. The S–1 pulses are reset pulses which will reset all indicators where the succeeding stage is not in a set position. Referring to FIG. 45, line 10A, the indicators associated with the letter L in SOLID, T in STATE, the space between words between STATE and AUTOMATIC, the space between the words AUTOMATIC and MATRIX are all reset by the first S–1 pulse. This pulse is followed by an S–2 pulse which is the setting pulse, and it will reset all Space-Between-Word-Indicators. The next pulse to arrive from the burst generator is another S–1 pulse. This again is the resetting pulse (FIG. 45, line 10C), and will reset the letter O in SOLID in S in STATE. In addition, it will also reset all the Space-Between-Word-Indicators whose succeeding stage has not been set. The burst continues and, in effect is instrumenting a ratchet-type reset in the machine.

The stream of S–1 and S–2 pulses will alternately reset all pulses whose succeeding stages have not been set. In case of a complete word, that is, one where the first character of the word succeeds a space between words, and the last character of the word is followed by a space between words, the space between words following the word will be alternately reset by the S–1 and S–2 pulses, yet the indication of the word match is retained in the memory. In the case of a partially matched word, a ratchet-type erase will be implemented by the burst generator, and the indication of the partially matched word will be erased. The reset of a partially matched word is clearly illustrated in FIG. 45, lines 10A through 10F for the words SOLID and STATE.

FIG. 45 also illustrates a "hit" condition in line 38. The hit condition occurs after all indicators are set. It is, however, possible through circuits included in the machine to enable the operator to choose the percentage of request satisfaction required. If it is desired to get a hit indication when less than all of the request words are matched by the unit record, a predetermined setting by the machine operator in accordance with the desired percentage, will result in a hit when the correct percentage is reached.

The aforedescribed example illustrates the operation of the information search and retrieval system with a card-type input interrogation request and the flip-flop memory chain of FIG. 37. The following is an example of a search request using the preferred embodiment of the invention, i.e., a direct or typewriter input and the flip-flop memory chain of FIG. 32. At initial conditions, the tape is in a rewound position, and it is assumed that a four-field machine (80 characters) is utilized. The search is to be performed on a personnel file to locate two individuals. The first must fit the requirements of an ELECTRICAL ENGINEER with experience in either RADAR or INFRA-RED, who is NOT a SUPERVISOR, and the second individual must meet the requirements of a RADAR REPAIR MAN who is SINGLE.

The request would be entered into the machine in the following manner: The forward request processing key indicating the tape is to be read in a forward direction is depressed. The term ELECTRICAL is then keyed, followed by a blank, and then the term ENGINEER followed by another blank. Since this completes the first field (19 characters) the typewriter interlocks and indicates to the operator that a field connector must be entered into the request. In this case, the conjunctive connection is keyed in. This in effect connects field A to B. The terms RADAR and INFRA-RED are then entered, separated by a blank. The partial request switch for field B is set to 1 and the typewriter is then advanced to the fortieth character position at which time the *NOT* connection key is depressed. Then the term SUPERVISOR is keyed in. The typewriter is then advanced to the sixtieth character position and after the machine interlocks, the SEPARATE key is depressed and the term SINGLE is entered. A blank follows the term SINGLE and immediately precedes the word RADAR. Since in this case, a repair man rather than a designer or engineer is required, the word-link symbol (+) is keyed into the typewriter and finally the term REPAIR is added. This completes the interrogation request entry.

Examining the machine operation during this request storage mode, the following has transpired: The depression of the forward process key actuated the request character enable so that the first character would be entered into character position 1, the second into character position 2, etc. It also insured that the machine would remain in the comparator enable stage. Keying in the first character E transfers this character to the request storage register for position 1. It also stores the character in the input register. Control signals from the timing generator then compare the two registers. Since these will always be the same, a successful match is obtained.

The flip-flop chain has been conditioned by the setting of the operation mode switch to "type." This is required before the request entry is started so that only stage 1 is enabled. Achieving a successful match in stage 1 sets the upper and middle chain flip-flops of the stage and resets the middle chain flip-flop enabling stage 1. This setting of the middle chain for stage 1 enables the reception of a successful match in stage 2.

Entering the second character L into the typewriter, stores this character in position 2 and sets the flip-flop so as to enable stage 3, etc. When the twentieth character (in this case a blank) has been entered (note that the request storage registers are normally reset in a configuration representing a blank stored in that position), the conjunctive key is depressed. This actuates the proper relay which links stage 20 with 21 as an integral part of the chain. The second field is then entered in the same manner. Setting the partial request key sets field 2 in such a manner that, depending on the detection of a hit in field A and a recognition of any one of the terms in field B, would indicate to field C that the previous request conditions have been satisfied. Keying the *NOT* in position 40 switches the input in field C so as to enable the inverter gate which will result in an output if A and B and not C are satisfied together with the end-of-the-record pulse. The term or terms for field C are then keyed in. Upon arriving at the machine interlock position for position 60 the SEPARATE key is depressed. This insures that any hit for fields A, B, and C will be flagged and identified in the print-out with a number 1, and any hit for field D with a number 2.

The second request is then entered into field D. After completion of the request entry, the mode switch is moved from "type" to "tape" and the tape transport is started. This initiates processing. Again the first significant character read off the tape is the star symbol (*). This causes the machine to load the information following the star into the output register. The arrival of the first EOW signal after the star, shifts the comparator into the compare mode. The star (*) generates an RS pulse which resets the lower flip-flop chain. The first EOW signal after the accession number generates first an S1 pulse which resets the upper chain and then an S2 pulse which sets all stages corresponding to blanks in the request. At the same time, the character (the first EOW after the accession number) also generates an S4 pulse. The S4 pulse sets the flip-flops in the lower chain corresponding to blanks. This effectively frames the request terms in the lower chain for the duration of the record (since the bottom flip-flops will not be reset until the arrival of the next star signal or pulse). The S4 pulse is followed by an S3 pulse which will reset any stages of the middle chains set in the previous character, in this case none. The final control pulse affecting the operation of the flip-flop that will be generated will be the S3 inhibit pulse which will insure that no S3 pulses will be generated if the character following the first EOW pulse is also a blank. This is required in order to insure that the middle chain flip-flops will remain set until after the first character other than an EOW pulse is read off the tape.

Assuming now that the first term of the tape is the word single, and since this term in the request is the first character of the last field, the field switching controlling the enable pulse for this character is such that the STAGE 60 middle flip-flop (631) is set by the S2 pulse rather than the setting of the top flip-flop of that stage. This enables stage 61 at every EOW, even if a character other than an EOW is stored in stage 60. Stage 61 is then enabled as are, stage 1 corresponding to the first E (electrical), stage 12 corresponding to the second E (engineer), stage 21 corresponding to R (radar), stage 37 corresponding to I (infra-red), stage 41 corresponding to the S of supervisor, stage 68 corresponding to the R in radar and stage 74 corresponding to the R in repair. Recognition of the S will set the flip-flops of the top and middle chain of stages 41 and 61. The S3 generated after the recognition pulse will reset the flip-flops of the middle chain enabling stages 1, 12, 21, 27, 41, 61 and 68. The setting of stages 41 and 61 enables stages 42 and 62. It should be noted that the comparison of all terms where a mismatch has occurred has ceased until the recognition of the next EOW symbol, i.e., until the next word off the tape. Recognition of an I then will set the top and middle flip-flops of stage 62 enabling stage 63. Then the middle chain flip-flops enabling stages 62 and 42 will reset. This process will now continue until the last character of a correctly matched word is recognized, namely the E in SINGLE. Since the character succeeding the E is a blank, and since the blank was framed in the lower chain at the time the S4 pulse occurred during the first end-of-word after the accession number character cycle, the setting of stage 66 enables a ratchet chain action setting the lower flip-flop chain corresponding to a word SINGLE. Recognition of the end-of-word character after a term initiates control pulses S1 resetting the top chain, S2 again framing the blanks in the top chain, S3 resetting all middle chain flip-flops set in a previous character cycle, and an S3 inhibit pulse insuring that the new enable stages (or first character of each request term) remain on until a character other than an end-of-word is recognized. The pulse matching proceeds as above until the complete request criteria is satisfied or the end of the record appears. In the latter case, all match indications are erased and the process is started again. If a complete match is recorded, the hit recognition circuit is activated causing the record number to be printed out.

During normal comparison, the signal activation pulse is preceded by a forcing pulse causing the stages corresponding to universal match character, when any pulse except the EOW character is recognized, to force a match if the previous stage was set. In the case of the EOW characters, those request positions storing a word link will be forced again only if the previous stage was set.

Although the invention and its operation have been described with reference to specific embodiments, it is intended that the invention is not limited to the particular details shown or described which may be varied without departing from the spirit and scope of the invention in the appended claims.

What is claimed as new and desired to be secured by Letters Patent of the United States is:

1. An information search and retrieval system for processing (1) request data and (2) information data including data characters and identification characters, comprising;

(a) means for providing and reading said identification characters and at least a portion of said data characters from the information data, (b) means for providing and reading the request data, (c) processing means for comparing the request data and the data characters, (d) first means connecting the first reading means to said processing means, (e) second means connecting the second reading means to said processing means, (f) storage means connected to said first means for storing said identification characters, (g) said first means including switching means for translating said identification characters to said storage means and said data characters to said processing means, (h) memory means connected to said processing means for storing an indication of a comparison match of said request data and said data character, and (i) output means connected to said memory means and said storage means for retrieving the stored identification characters from said storage means upon a comparison match of the request data and the data characters.

2. An information retrieval system comprising;

(a) input means for providing input information comprising library information, machine operators and identification characters for said library information in a preselected code, means for reading said input information, (b) interrogation request means for interrogating said library information, (c) data comparing means connected to said interrogation request means for comparing the interrogation request to said library information, (d) means connecting said data comparing means to said input means for translating said input information to a plurality of locations within the system, said library information being translated to said data comparing means at a first location, said identification characters being translated to a second location, (e) a memory unit connected to said data comparing means for storing a comparison indication from said comparing means, (f) timing means interconnecting said connecting means and said memory unit for providing timing synchronization for the system, (g) a storage register at said second location for storing said identification characters for said library information and, (h) means responsive to a comparison match of said library information and said interrogation request for retrieving said identification characters.

3. The information retrieval system as set forth in claim 2 wherein:

(a) said interrogation request means comprises a typewriter and typewriter encoding mechanism for interrogating said input information with an interrogation request coded in the identical code of the input information.

4. An information retrieval system comprising;

(a) input means for providing input information comprising library information, machine operators and identification characters for said library information in a first preselected code, means for reading said input information, (b) a code converter for converting said library information from said first preselected code to a second preselected code, (c) first means connecting said code converter to said input means including means for translating said input information to a plurality of locations within the system, said library information being translated to a first location, said identification characters being translated to a second location, (d) interrogation request means containing data coded in said second preselected code, (e) data comparing means interconnecting said code converter at said first location and said interrogation request for comparing the library information to said interrogation request, (f) a memory unit connected to said data comparing means for storing a comparison indication from said data comparing means, (g) timing means interconnecting said first means and said memory unit for providing timing synchronization for the system, (h) a storage register at said second location for storing said identification characters for said library information, and (i) means responsive to a comparison match of said library information and said interrogation request for retrieving said identification characters.

5. An information retrieval system comprising;

(a) a tape storage unit including a continuously movable tape for storing information, said information comprising library information, machine operators and identification characters for said library information stored in a first preselected code, means for driving said tape in a forward or reverse direction, means for reading the stored information of said tape in either direction, (b) a code converter for converting said library information stored in said first preselected code to a second preselected code, (c) first means connecting said code converter to said tape storage unit including means for translating said stored information from said tape as it is driven in either direction to a plurality of locations within the system, said library information being translated to a first location, said identification characters being translated to a second location, (d) interrogation request means containing data coded in said second preselected code, (e) data comparing means interconnecting said code converter at said first location and said interrogation request for comparing the library information character by character and simultaneously to all characters of the interrogation request, (f) a memory unit connected to said data comparing means for storing a comparison indication from said data comparing means, (g) timing means interconnecting said first means and said memory unit for providing timing synchronization for the system, (h) a storage register at said second location for storing said identification characters for said library information, and (i) means responsive to a comparison match of said library information and said interrogation request for retrieving said identification characters.

6. An information retrieval system comprising;

(a) input means for providing input information in a binary-decimal code representing (1) data information and (2) identification characters for the stored information, means for reading said input information, (b) an input information-to-card code converter for converting the input information from a binary-decimal code to a variable number element code, (c) first means connecting the input information-to-card code converter to said input means, (d) an interrogation request card containing interrogation data coded in a variable number element code for interrogating the retrieval system, (e) a card reader for receiving and reading the interrogation request, (f) a logic matrix connected to said card reader and said input information-to-card code converter for comparing the input information and interrogation request, (g) timing means for providing synchronization for the system, said timing means connected to said first means, (h) a memory unit connected to said timing means, (i) second means connecting said memory unit to the logic matrix and adapted to stored data information in said memory unit, (j) register means connected to the memory means for storing said identification characters from said input means, and (k) a printer connected to said register means for printing information stored in said register means upon a comparison match of the data information and the interrogation request.

References Cited

UNITED STATES PATENTS

| | | | |
|---|---|---|---|
| 3,107,343 | 10/1963 | Poole | 340—172.5 |
| 3,136,979 | 6/1964 | Perotto | 340—172.5 |
| 2,877,445 | 3/1959 | Chilik | 340—146.2 |
| 2,876,433 | 3/1959 | Feissel | 340—146.2 |
| 3,075,178 | 1/1963 | James | 340—172.5 |
| 3,017,610 | 1/1962 | Auerbach | 340—172.5 |
| 2,721,990 | 10/1955 | McNaney | 340—172.5 |
| 3,030,609 | 4/1962 | Albrecht | 340—172.5 |
| 3,260,999 | 7/1966 | Grommer | 340—172.5 |
| 3,302,186 | 1/1967 | Raser et al. | 340—172.5 |
| 3,307,153 | 2/1967 | Bauer | 340—172.5 |

PAUL J. HENON, *Primary Examiner.*

P. L. BERGER, *Assistant Examiner.*